(12) United States Patent
Babiarz et al.

(10) Patent No.: US 9,077,655 B2
(45) Date of Patent: Jul. 7, 2015

(54) TRAFFIC MANAGEMENT IN DISTRIBUTED WIRELESS NETWORKS

(75) Inventors: Jozef Babiarz, Kanata (CA); Marvin Krym, Nepean (CA)

(73) Assignee: 3inova Networks Inc., Kanata, Ontario (CA)

( * ) Notice: Subject to any disclaimer, the term of this patent is extended or adjusted under 35 U.S.C. 154(b) by 646 days.

(21) Appl. No.: 13/038,624

(22) Filed: Mar. 2, 2011

(65) Prior Publication Data
US 2012/0224481 A1    Sep. 6, 2012

(51) Int. Cl.
| | | |
|---|---|---|
| H04W 72/04 | (2009.01) |
| H04B 7/005 | (2006.01) |
| H04W 24/00 | (2009.01) |
| H04L 12/823 | (2013.01) |
| H04L 12/26 | (2006.01) |
| H04L 12/803 | (2013.01) |
| H04L 12/851 | (2013.01) |
| H04W 28/02 | (2009.01) |
| H04L 12/24 | (2006.01) |
| H04L 12/863 | (2013.01) |
| H04W 40/12 | (2009.01) |

(52) U.S. Cl.
CPC ............ *H04L 47/32* (2013.01); *H04L 43/0876* (2013.01); *H04L 47/125* (2013.01); *H04L 47/2408* (2013.01); *H04L 47/6215* (2013.01); *H04W 28/0205* (2013.01); *H04W 40/12* (2013.01); *H04L 41/5022* (2013.01)

(58) Field of Classification Search
CPC .............. H04L 43/0876; H04L 47/125; H04L 47/2408; H04L 41/5022; H04L 47/32; H04W 28/0205
USPC .......................... 370/230, 230.1; 3/230, 230.1
See application file for complete search history.

(56) References Cited

U.S. PATENT DOCUMENTS

| | | |
|---|---|---|
| 7,065,063 B2 | 6/2006 | Tran |
| 7,146,166 B2 | 12/2006 | Backes |
| 7,158,787 B2 | 1/2007 | Backes |
| 7,200,395 B2 | 4/2007 | Backes |
| 7,206,297 B2 | 4/2007 | Backes |
| 7,222,175 B2 | 5/2007 | Knauerhase |
| 7,248,574 B2 | 7/2007 | Backes |
| 7,274,930 B2 | 9/2007 | Backes |

(Continued)

*Primary Examiner* — Donald Mills
*Assistant Examiner* — Henry Baron
(74) *Attorney, Agent, or Firm* — Greer, Burns & Crain, Ltd.

(57) ABSTRACT

Wireless networks and devices are ubiquitous today. For service providers to offer customers QoS and Service Level Agreements (SLAs) means in part providing resilient connectivity of wireless devices with good signal strength, good Signal to Noise and Interference Ratio (SNIR), and adequate useable bandwidth. Doing so requires that devices transmitting and receiving packets use over-the-air bandwidth efficiently and manage over-the-air congestion. According to embodiments of the invention QoS measurements and controls are incorporated only in the network (i.e. APs or controllers) and therefore QoS and SLAs can be achieved with all deployed client stations versus standards based approaches that require additional capabilities in network nodes, client stations and in most cases modifications to the applications. SLAs can be provided exploiting embodiments of the invention for traffic prioritization, capacity improvements through load distribution, and adjacent channel interference mitigation discretely or in combination with standards based mechanisms.

19 Claims, 17 Drawing Sheets

(56) References Cited

U.S. PATENT DOCUMENTS

| | | |
|---|---|---|
| 7,274,945 B2 | 9/2007 | Backes |
| 7,280,517 B2 | 10/2007 | Benveniste |
| 7,307,972 B2 | 12/2007 | Backes |
| 7,307,976 B2 | 12/2007 | Backes |
| 7,362,776 B2 | 4/2008 | Meier |
| 7,366,103 B2 | 4/2008 | Engwer |
| 7,366,537 B2 | 4/2008 | Backes |
| 7,369,858 B2 | 5/2008 | Backes |
| 7,391,725 B2 * | 6/2008 | Huitema et al. .......... 370/230.1 |
| 7,400,901 B2 | 7/2008 | Kostic |
| 7,647,046 B2 | 1/2010 | Huang |
| 7,668,191 B2 * | 2/2010 | Steinback et al. ............ 370/437 |
| 7,706,326 B2 | 4/2010 | Marinier |
| 7,715,353 B2 | 5/2010 | Jain |
| 7,738,876 B1 * | 6/2010 | Radhakrishnan et al. .... 455/450 |
| 7,826,426 B1 | 11/2010 | Bharghavan |
| 2003/0086437 A1 | 5/2003 | Benveniste |
| 2004/0120290 A1 | 6/2004 | Makhijani |
| 2004/0165555 A1 | 8/2004 | Backes |
| 2004/0166867 A1 | 8/2004 | Hawe |
| 2004/0166870 A1 | 8/2004 | Backes |
| 2004/0166889 A1 | 8/2004 | Backes |
| 2004/0170140 A1 | 9/2004 | Backes |
| 2004/0192279 A1 | 9/2004 | Backes |
| 2004/0202122 A1 | 10/2004 | Backes |
| 2004/0202130 A1 | 10/2004 | Backes |
| 2004/0203688 A1 | 10/2004 | Backes |
| 2004/0229621 A1 * | 11/2004 | Misra ........................... 455/445 |
| 2004/0264394 A1 | 12/2004 | Ginzburg |
| 2005/0070263 A1 | 3/2005 | Backes |
| 2006/0058056 A1 | 3/2006 | Das |
| 2006/0072488 A1 | 4/2006 | Meier |
| 2006/0165031 A1 | 7/2006 | Wang |
| 2007/0248033 A1 | 10/2007 | Bejerano |
| 2007/0286202 A1 | 12/2007 | Remedios |
| 2008/0013522 A1 | 1/2008 | Benveniste |
| 2008/0101231 A1 | 5/2008 | Lai |
| 2008/0112326 A1 | 5/2008 | Krishnakumar |
| 2008/0151807 A1 | 6/2008 | Meier |
| 2008/0316985 A1 | 12/2008 | Kostic |
| 2009/0003252 A1 | 1/2009 | Salomone |
| 2009/0310569 A1 | 12/2009 | Tran |

\* cited by examiner

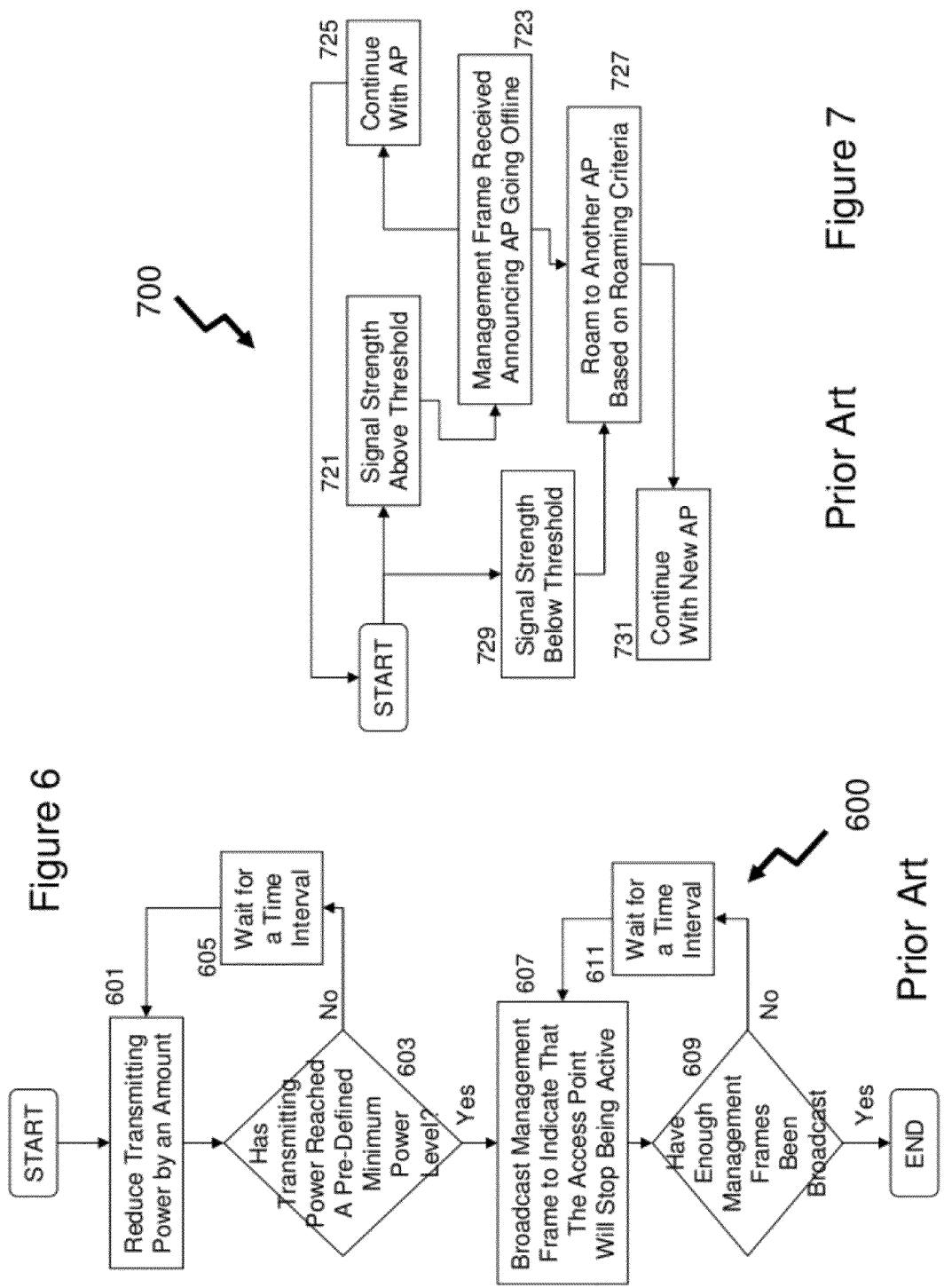

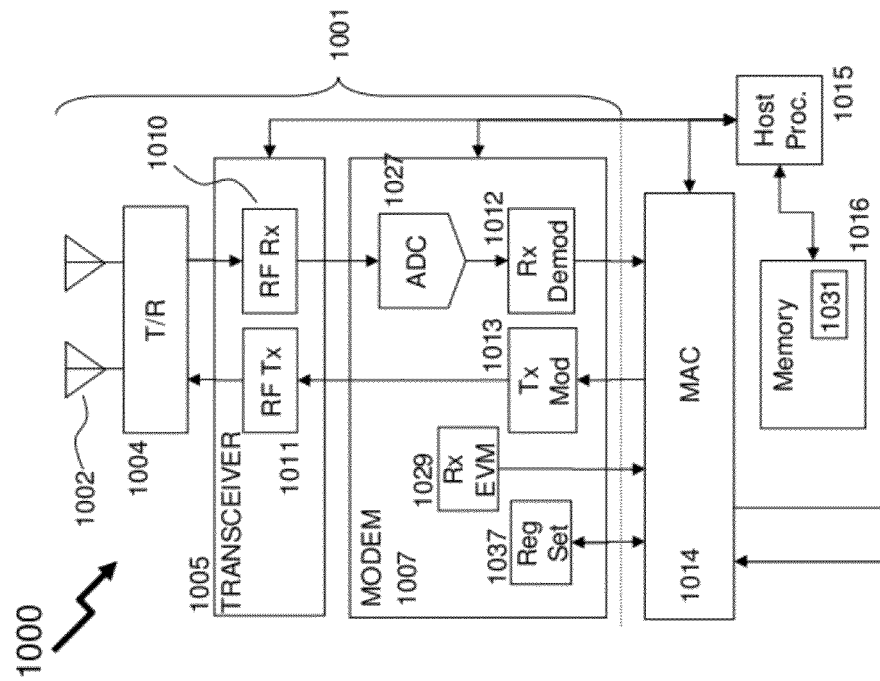

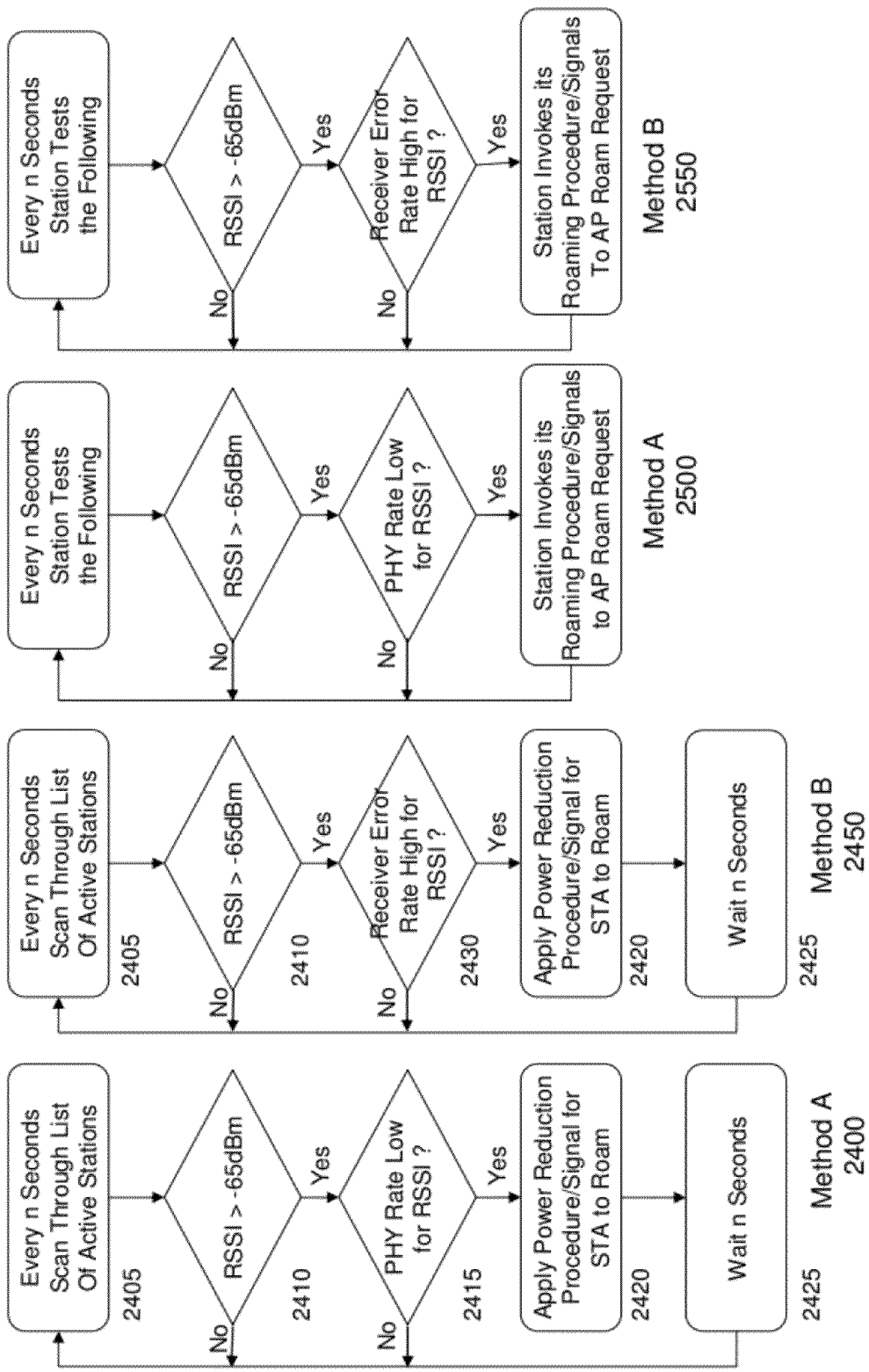

TRAFFIC MANAGEMENT IN DISTRIBUTED WIRELESS NETWORKS

FIELD OF THE INVENTION

This invention relates to wireless networks and more specifically to managing access, maximizing carried network traffic and ensuring quality of service within wireless networks.

BACKGROUND OF THE INVENTION

Wireless communication systems are today well known in the art having fundamentally changed how consumers, advertisers, and enterprises interact, communicate, exchange, store, and utilize information through a variety of formats including text, electronic mail, video, multimedia, and plain-old-telephone-service (POTS) as well as through a variety of mobile wireless devices from cellular telephones (cellphones), personal digital assistants (PDAs), laptops, tablet PCs, portable multimedia players, and portable gaming consoles. The Technology, Media and Telecommunications (TMT) business has grown in the past 10 years with the widespread deployment of wireless devices, personal computers, Internet, and broadband networks to represent a value chain of over $3 trillion worldwide, including content providers, advertisers, telecommunications companies and electronics suppliers (White Paper Wireless Social Networking from iSuppli, July 2008).

In the next decade wireless social networking products alone (applications, components, and advertising) will generate more than $2.5 trillion in revenue by 2020, according to iSuppli (Press Release, Jun. 4, 2008 http://www.isuppli.com/NewsDetail.aspx?ID=12930). During this timeframe it is anticipated that mobile devices, such as cellular telephones, smart phones, personal digital assistants (PDA), will become the primary channel for viewing content from or accessing the Internet (World Wide Web) and that many applications such as social networking, email, and financial transactions will have moved substantially into the wireless realm providing the degree and type of ubiquitous connection that consumers demand. At the same time it is anticipated that this evolution will be accompanied by the creation of a new generation of applications that will greatly expand the appeal, utility, and capabilities of mobile wireless devices.

Today, with a global population of approximately 6.9 billion there are estimated to be 5 billion active cellphone connections globally (see BBC Jul. 18, 2010 new report http://www.bbc.co.uk/news/10569081 citing market analysts Wireless Intelligence), which is approximately 3 times the number of computers globally. More than a billion cellular connections were added in the past 18 months, with China and India dominating these new connections with approximately 830 million and 706 million users respectively. However, the vast majority of these cellphone connections are currently "low functionality" wireless mobile cellphones and PDAs with only approximately 450 million mobile Internet users in 2009, about 10% of overall users (International Data Corporation cited in PC World http://www.pcworld.com/article/184127/idc_1_billion_mobile_devices_will_go_online_by_2013.html "Worldwide Converged Mobile Device 2009-2013 Forecast Update" December 2009).

However, with the evolution of smartphones, Internet-capable cellphones and PDAs, tablet PCs then as these devices become more affordable these devices will increase, to approximately 1 billion in 2013, being dominated by North America, Europe and Japan, and thereafter increasingly penetrating markets such as China and India. Accordingly, the average user will increasingly consume bandwidth and network resources as well as potentially accessing multiple services simultaneously, for example VoIP and Internet access for streaming multimedia or accessing information. Accordingly, for telecommunication service providers managing congestion as well as access for users is, and increasingly will be, an important issue. This will be further exacerbated as guaranteed network access is required, either to extend existing wired service level agreements (SLAs) for enterprises to wireless networks or where critical applications such as those relating to financial, security or medical applications are executed through the mobile devices.

Generally, wireless telecommunications networks comprise communication stations that transmit and receive wireless communication signals between each other. Depending upon the type of system, these communication stations typically are one of two types of wireless transmit/receive units (WTRUs): one type is the Access Point (AP) or base station, the other is the station (STA) or subscriber unit, which may or may not be mobile.

The term AP as used herein includes, but is not limited to, a base station, an Access Point, Node B, site controller, wireless router or other interfacing device or WTRU in a wireless environment, that provides other WTRUs with wireless access to a network with which the AP is associated. The AP may be associated with wired and/or wireless network(s). The term STA as used herein includes, but is not limited to, a station WTRU, user equipment, a mobile station, fixed or mobile subscriber unit, pager, or any other type of device capable of operating in a wireless environment and accessing an AP to obtain access to the network. Such STAs can include personal communication devices, such as cellular telephones, video phones, so-called Internet ready phones that have network connections. In addition, STAs can include portable personal computing and communication devices, such as smartphone, PDAs, netbook computers/laptop computers/tablet PCs etc. with wireless modems that have similar network capabilities, multimedia players, and gaming consoles. STAs that are portable or can otherwise change location are referred to as mobile units. In some instances, STAs may also provide AP functionality by operating at two telecommunication standards simultaneously.

Typically, a network of APs is provided wherein each AP is capable of conducting concurrent wireless communications with appropriately configured STAs, as well as other multiple appropriately configured APs. Some STAs may alternatively be configured to conduct wireless communications directly between each other, i.e., without being relayed through a network via an AP. This is commonly called peer-to-peer wireless communications. Where a STA is configured to communicate directly with other STAs it may itself also be configured as and function as an AP. STAs can be configured for use in multiple networks, including for example those with both network and peer-to-peer communications capabilities as well as supporting single or multiple basic service sets.

One type of wireless system, called a wireless local area network (WLAN), can be configured to conduct wireless communications with STAs equipped with WLAN modems that are also able to conduct peer-to-peer communications with similarly equipped STAs. It should be noted that in IEEE standards an STA is typically associated as being the WLAN modem rather than a station comprising such a modem. Currently, WLAN modems are being integrated into many traditional communicating and computing devices by manufacturers including, but not limited to, cellular phones, personal digital assistants, and laptop computers. Popular WLAN environments with one or more WLAN APs are generally those constructed according to one or more of the IEEE 802 family of wireless standards. Access to these networks usually requires user authentication procedures. Protocols for such systems exist at multiple levels of maturity including those that have been ratified as standards and are commercially deployed, those that are being formalized for ratification and may or may not be commercially deployed, those that are proposed and are being refined by industry prior to commercial release/ratification, and legacy/obsolete standards. As such IEEE 802 is one such family of standards, and multiple standards are active simultaneously and extensively globally.

A basic service set (BSS) is the basic building block of an IEEE 802.11 WLAN, which comprises WTRU STAs. A set of STAs that can talk to each other can form a BSS. A single-cell wireless LAN using the IEEE 802.11 Wireless LAN Standard therefore is a Basic Service Set (BSS) network. Multiple BSSs are interconnected through an architectural component called a distribution system (DS), to form an extended service set (ESS). An ESS satisfies the need for large coverage networks of arbitrary size and complexity to form the wireless infrastructure that consumers take for granted.

The IEEE 802.11 Wireless LAN Standard is published in multiple parts including:
  IEEE 80.211-1997 (802.11 legacy) with spread-spectrum transmission at 1-2 Mb/s at 900 MHz or 2.4 GHz;
  IEEE 802.11a-1999 for unlicensed portions of the radio spectrum, usually either in the 2.4 GHz Industrial, Scientific, and Medical (ISM) band or the 5 GHz Unlicensed-National Information Infrastructure (U-NII) band with orthogonal frequency division multiplexing (OFDM) to deliver up to 54 Mb/s data rates;
  IEEE 802.11b-1999 designed for the 2.4 GHz ISM band and uses direct sequence spread spectrum (DSSS) to deliver up to 11 Mb/s data rates with reduced range;
  IEEE 802.11g-2003 designed for the 2.4 GHz ISM band with OFDM at datarates up to 54 Mb/s;
  IEEE 802.11k exposes various measurements to facilitate the management and maintenance of a mobile Wireless LAN;
  IEEE Std 802.11-2007 Wireless LAN Medium Access Control (MAC) and Physical Layer (PHY) Specifications;
  IEEE 802.11n which adds multiple-input multiple output (MIMO) antennas, channel bonding etc to support data rates to several 100s Mb/s;
  IEEE 802.11r which provide continuous connectivity for wireless devices in motion through fast secure handoffs;
  IEEE 802.11s which addresses mesh networks;
  IEEE 802.11u that addresses interoperability of IEEE 802.11 devices with external networks; and
  IEEE 802.11v that addresses management of STAs.

The IEEE 802.11 Wireless LAN Standard defines at least two different physical (PHY) specifications and one common medium access control (MAC) specification. Other wireless LAN standards include: IEEE 802.16a (WiMAX), UMTS (Universal Mobile Telecommunication System), EV-DO (Evolution-Data Optimized), CDMA 2000, GPRS (General Packet Radio Service), EDGE (Enhanced Data Rates for GSM Evolution), OpenAir (which was the first wireless LAN standard), HomeRF (designed specifically for the home networking market), and HiperLAN1/HiperLAN2 (the European counterpart to the "American" 802.11a standard). Bluetooth is a personal area network (PAN) standard alongside other standards such as ZigBee (including IEEE 802.15), Wireless USB, 6IoWPAN (IPv6 over Low Power Wireless), and UWB (ultra-wideband). PAN standards typically addressing low-power, short-range, wireless connections.

For the purposes of defining aspects of wireless networks and their operating principles the background and embodiments of the invention will be described with respect to the IEEE 802.11 Wireless LAN Standard, which describes two major components, the mobile station (STA) and the fixed access point (AP). It would be understood by one skilled in the art that the embodiments of the invention and the principles within the specification overall may be applied to other wireless networks, including but not limited to those operating to standards such as those defined supra.

IEEE 802.11 networks can also have an independent configuration where the mobile stations communicate directly with one another, without support from a fixed AP. The medium access control (MAC) protocol regulates access to the RF physical link in such independent configurations and provides basic access mechanisms with clear channel assessment, channel synchronization, and collision avoidance using the Carrier Sense Multiple Access with Collision Avoidance (CSMA/CA) access method. The MAC also provides link setup, data fragmentation, authentication, synchronization, encryption, and power management.

Synchronization is the process of STAs in an IEEE 802.11 wireless LAN cell getting in step with each other, so that reliable communication is possible. The MAC also provides the basis for synchronization mechanisms that allow for some physical layers to make use of frequency hopping or other time-based mechanisms wherein the parameters of the physical layer change with time. This process involves an AP sending a beacon frame to announce the presence of a wireless LAN cell or a STA inquiring to find a wireless LAN cell. Once a wireless LAN cell is found, a STA joins the wireless LAN cell in a process managed by the distributed wireless LAN cells.

In an independent BSS (IBSS) wireless LAN cell, there is no access point (AP) to act as the central time source for the wireless LAN cell. In such an IBSS a wireless LAN cell timer synchronization is distributed among the mobile STAs of the IBSS wireless LAN cell. Since there is no AP, the mobile STA that starts the IBSS wireless LAN cell will begin by resetting its TSF timer to zero and transmitting a beacon frame. This establishes the basic beaconing process for this IBSS wireless LAN cell after which each STA will attempt to send a beacon after the target beacon transmission time (TBTT) arrives. To minimize actual collisions of the transmitted beacon frames on the medium, each STA in the wireless LAN cell will choose a random delay value, which it will allow to expire before it attempts its beacon transmission.

In order for a STA to communicate with other STAs in a wireless LAN cell, it must first find the AP. The process of finding another STA is by inquiry, which may be either passive or active. Passive inquiry involves only listening for IEEE 802.11 traffic whereas active inquiry requires the inquiring STA to transmit and invoke responses from IEEE 802.11 APs and allows an IEEE 802.11 STA to find a wireless LAN cell while minimizing the time spent inquiring. Once all responses are received, or the STA has decided there will be no responses, it may change to another channel and repeat the process. At the conclusion of this the STA has accumulated information about the wireless LAN cells in its vicinity. To join the selected wireless LAN cell all of the STA's MAC and physical parameters must be synchronized with the desired wireless LAN cell. Once this is complete, the STA has joined the wireless LAN cell and is ready to begin communicating.

Each STA and AP in an IEEE 802.11 wireless LAN implements the MAC layer service, which provides the capability for STAs to exchange MAC frames. The MAC layer transmits management, control, or data frames between STAs and APs, which once formed is passed to the Physical Layer for transmission. But before transmitting a frame, the MAC layer must first gain access to the network. Three interframe space (IFS) intervals defer an IEEE 802.11 STA's access to the medium and thus provide one mechanism of establishing priority, but for the STA and not its traffic. Each IFS defines the duration between the end of the last symbol of the previous frame to the beginning of the first symbol of the next frame. The Short Interframe Space (SIFS) provides the highest priority level by allowing some frames to access the medium before others.

The Priority Interframe Space (PIFS) is used for high priority access to the medium during the contention-free period. A point coordinator in the AP connected to the backbone network controls the priority-based Point Coordination Function (PCF) to dictate which STAs in a cell can gain access to the medium by sending a contention-free poll frame to a STA, thereby granting the STA permission to transmit a single frame to any destination.

The Distributed Coordination Function (DCF) Interframe Space (DIFS) is used for transmitting low priority data frames during the contention-based period. The DIFS spacing delays the transmission of lower priority frames to occur later than the priority-based transmission frames.

During the contention-based period, the DCF uses the Carrier-Sense Multiple Access with Collision Avoidance (CSMA/CA) contention-based protocol, which is similar to IEEE 802.3 Ethernet. This CSMA/CA protocol minimizes the chance of collisions between STAs sharing the medium by utilizing a random back-off interval to delay transmission by a STA.

Within the IEEE 802.11 Standard, the channel is shared by a centralized access protocol, the Point Coordination Function (PCF), to provide contention-free transfer based on a polling scheme controlled by the AP of a BSS. This feature, however, is typically not exploited in commercial systems. The centralized access protocol gains control of the channel and maintains control for the entire contention-free period by waiting the shorter Priority Interframe Space (PIFS) interval between transmissions than the STAs using the Distributed Coordination Function (DCF) access procedure. Following the end of the contention-free period, the DCF access procedure begins, with each STA contending for access using the CSMA/CA method. The 802.11 MAC Layer thereby provides both contention and contention-free access to the shared wireless medium through the use of various MAC frame types to implement the required functions of MAC management, control, and data transmission.

Quality of service (QoS) is a measure of service quality provided to a customer, using the STA. The primary measures of QoS are message loss, message delay, message jitter, and network availability. Voice and video applications have the most rigorous QoS requirements. Interactive data applications such as Web browsing have lower delay and loss requirements, but they are sensitive to errors. Non-Real Time applications such as file transfer, email, and data backup operate acceptably across a wide range of loss rates and delay. Prioritized packet scheduling, packet dropping, and bandwidth allocation are among techniques available, within the prior art, at the various nodes of the network, including APs, that enable packets from different applications to be treated differently, thereby helping to achieve different QoS objectives. Many network providers guarantee specific QoS and capacity levels through the use of Service-Level Agreements (SLAs). An SLA is a contract between an enterprise user and a network provider that specifies the capacity (and possibly other performance measures) to be provided between points in the network that must be delivered with a specified QoS. If the network provider fails to meet the terms of the SLA, then the user may be entitled to some form of compensation. The SLA is typically offered by network providers for private line, frame relay, ATM, or Internet networks employed by enterprises and generally only for wired services due to issues including, but not limited to, access, contention, data rates that have been discussed above as well as others such as handover between APs during roaming, for example, that are discussed below.

The problem of overlapping AP coverage is acute when wireless LANs are installed without any awareness of what other wireless LANs are operating nearby. Consequently, multiple-cell wireless LANs typically rely on a medium access control (MAC) protocol to allocate channel time among STAs in order to avoid co-channel interference between APs, just as it avoids contention among STAs within the same cell associated with an AP.

Additional MAC protocols are provided for wireless LANs because transmission may be flawed by higher bit error rates and different losses that are experienced on a wireless channel depending on the path on which the signal travels. Additive noise, path loss and multipath interference result in more retransmissions and necessitate additional acknowledgements, as successful transmission cannot be taken for granted, all of which further reduce the actual bandwidth available to the traffic the STA is trying to send or receive. These effects, amongst others such as physical barriers, can also result in what are known as "hidden" STAs wherein an STA is visible to an AP but not from other STAs communicating with the AP. Accordingly, these STAs that cannot hear or be heard by a source STA are capable of causing interference to the destination STA of a transmission. Generally, a message exchange mechanism known in the art as Request-to-Send/Clear-to-Send (RTS/CTS) alleviates the hidden terminal problem. RTS/CTS may also provide a reservation mechanism that can save bandwidth in wireless LANs. The inability to detect a collision as quickly as it can be detected on cable with carrier-sense multiple access with collision detection (CSMA/CD) causes more channel time to be wasted in a collision while waiting for the entire frame to transmit before the collision is detected. Hence, carrier sensing is combined with the RTS/CTS mechanism to give carrier-sense multiple access with collision avoidance (CSMA/CA).

To address enhancements to the MAC protocols for achieving acceptable QoS for WLANs IEEE 802.11e-2005 (IEEE 802.11e) was formalized as an approved amendment to the IEEE 802.11 standard by providing modifications to the MAC. The standard is considered of critical importance for delay-sensitive applications, such as Voice over Wireless LAN and streaming multimedia, and has subsequently been incorporated into the IEEE 802.11-2007 standard. IEEE 801.11e provides for enhanced DCF (EDCF) and enhanced PCF (EPCF) through a new coordination function, the hybrid coordination function (HCF). IEEE 801.11e also includes additional Admission Control in that the AP publishes available bandwidth in beacons such that STAs can check the available bandwidth before adding more traffic.

The EDCF mechanism employs the Tiered Contention Multiple Access (TCMA) protocol that has basic access rules that similar to CSMA but now transmission deferral and backoff countdown depend on the priority classification of the data. A STA still waits for an idle time interval before attempting transmission following a busy period, but the length of this interval is no longer equal to DIFS but equal to the Arbitration-Time Inter-Frame Space (AIFS), which varies with the priority of the data. Equally, for high priority data contention window (CW) duration is reduced such that the random back-offs are shorter. Additionally, IEEE 802.11e provides contention-free access to the channel for a period called a Transmit Opportunity (TXOP), which is a bounded time interval during which a STA can send as many frames as possible. Accordingly, higher priority data gets to the channel faster. Additionally, countdown of the backoff timer in an STA does not commence when a busy period completes unless the channel has been idle for a period. This causes the backoff countdown of lower priority data frames to slow down and even freeze if there are higher-priority frames ready to transmit. This slow down/freezing is a common occurrence in situations of congestion thereby limiting transmission of data frames that have a priority below that of those seizing and holding the channel. The Wi-Fi Alliance (a trade association that promotes wireless LAN technology) certifies products if they conform to interoperability standards, such as Wireless Multimedia Extensions (WME) (also known as Wi-Fi Multimedia (WMM)) which is based on the IEEE 802.11e standard. WMM certified APs must be enabled for EDCA and TXOP whilst all other IEEE 802.11e enhancements are optional.

The EPCF maintains multiple traffic queues at the STAs for different traffic categories with higher-priority frames being scheduled for transmission first. Delays are reduced through improved polling-list management, which maintains only active STAs on it. A STA with data to transmit must reserve a spot on that list, where it stays as long as it is active and for a limited number of inactive polling cycles. As such IEEE 802.11e provides a generalization of PCF in that it allows for contention-free transfers to occur as needed; not necessarily at pre-determined regular repeat times. An AP can thus send (and possibly receive) data to STAs in its BSS on a contention-free basis. This contention-free session, referred to as a contention-free burst (CFB), helps an AP transmit its traffic, which is typically heavier in infrastructure cells (since STAs must communicate exclusively through the AP).

Attention must also been given to the problem of co-channel overlapping BSSs (OBSSs), particularly with dense deployments. Channel re-use in multiple-cell Wireless LANs, which is necessary due to the small number of channels in the unlicensed band, three non over lapping channels for IEEE 802.11b/g (24 for IEEE 802.11a), can lead to a high degree of overlap in the coverage areas of co-channel WLAN cells. This overlap is exacerbated by the typically ad hoc placement of WLANs. This also potentially poses a problem for the PCF and HCF, as contention-free sessions (CFSs) are generated without coordination among co-channel APs when contention free periods are enabled. The existing standards do not provide adequate coordination for contention-free sessions in such situations.

Within OBSSs channel access time (or bandwidth) should also be allocated among the multiple co-channel cells in order to avoid interference. To be efficient, a channel should not remain idle if there is data waiting for transmission and as channel selection within the IEEE 802.11 standard is fixed or static, then bandwidth allocation should be dynamic so that an STA only gets the bandwidth it needs, thereby increasing efficiency. Potentially, this bandwidth allocation may change on a per-transmission basis if something occurs to impact the path, for example distance from AP increasing or barrier interference. Beneficially, dynamic bandwidth allocation promotes fair access to the channel for all co-channel cells. The success rate of a STA in accessing its assigned channel either by its AP generating CFSs or by (E)DCF transmissions, should be independent of its location, assuming comparable traffic loads. Without a mechanism to manage access under high traffic loads transmissions can be delayed excessively in the disadvantaged cell(s), such that important STAs/sessions do not get the bandwidth they require such that they fail to meet QoS requirements.

Not surprisingly, within the prior art there are multiple disclosures of techniques and methods for controlling access to Wi-Fi networks as well as providing QoS, managing congestion, taking APs offline etc that seek to either address the limitations within the IEEE 802.11 standards or extend upon them. A subset of these prior art approaches are discussed below in respect of FIGS. 1 through 7. Amongst these techniques are:

Management of Beacon Power, wherein an AP uses beacon frames for example to announce the presence of a wireless LAN cell, transmit timing information and the length of the contention-free interval. Adjustments to the beacon power form the basis of solutions taught in US Patent Application 2008-0,112,326 "Load Balancing Routes in Multi-Hop Ad-Hoc Wireless Networks", U.S. Pat. No. 7,715,353 "Wireless LAN Cell Breathing", US Patent Application 2007-0,248,033 "Methods and Devices for Balancing the Load of Access Points in Wireless Local Area Networks", and US Patent Application 2007-0,248,059 "Wireless LAN Cell Breathing."

Management of Beacon Timing, see for example U.S. Pat. No. 7,222,175 "Dynamically Configurable Beacon Intervals for Wireless LAN Access Points."

Received Signal Strength Indicator (RSSI) and QoS Indicators at STA, see for example U.S. Pat. No. 7,065,063 "System and Method for Balancing Communication Traffic Between Adjacent Base Stations in a Mobile Communications Network", US Patent Application 2009-0,310,569 "System and Method for Balancing Communication Traffic Between Adjacent Base Stations in a Mobile Communications Network", U.S. Pat. No. 7,200,395 "Wireless Station Protocol Apparatus", U.S. Pat. No. 7,158,787 "Wireless Station Protocol Method", U.S. Pat. No. 7,206,297 "Method for Associating Access Points with Station using Bid Techniques", U.S. Pat. No. 7,248,574 "Apparatus for Selecting an Optimum Access Point in a Wireless Network", U.S. Pat. No. 7,274,930 "Distance Determination Program for use by Devices in a Wireless Network", U.S. Pat. No. 7,307,976 "Program for Selecting an Optimum Access Point in a Wireless Network on a Common Channel", and US Patent Application 2004-0,166,867 "Program for Ascertaining a Dynamic Attribute of a System."

AP Loading Determination, see for example US Patent Application 2008-0,316,985 "WLAN having Load Balancing Based on Access Point Loading", U.S. Pat. No. 7,400,901 "WLAN having Load Balancing Based on Access Point Loading", U.S. Pat. No. 7,366,103 "Seamless Roaming Options in an IEEE 802.11 Compliant Network", U.S. Pat. No. 7,362,776 "Method for Multicast Load Balancing in Wireless LANs", US Patent Application 2004-0,120,290 "Admission Control in a Wireless Communication Network", and US Patent Application 2008-0,151,807 "Method for Multicast Load Balancing in Wireless LANs."

QoS Signaling, see for example US Patent Application 2008-0,101,231 "Wi-Fi Quality of Service Signaling."

Managing STA Attributes and Configuration, see US Patent Application 2006-0,165,031 "Apparatus and Method for Delivery handling Broadcast and Multicast Traffic as Unicast Traffic in a Wireless Network", U.S. Pat. No. 7,146,166 "Transmission Channel Selection Program", U.S. Pat. No. 7,307,972 "Apparatus for Selecting an Optimum Access Point in a Wireless Network on a Common Channel", U.S.

Pat. No. 7,369,858 "Apparatus for Self-Adjusting Power at a Wireless Station to Reduce Inter-Channel Interference", US Patent 2004-0,192,279 "Program for Scanning Radio Frequency Channels" "WLAN having Load Balancing Based on Access Point Loading", and US Patent Application 2008-0,151,807 "Method for Multicast Load Balancing in Wireless LANs."

Global Release, predominantly for reacquisition although also for removing an AP temporarily or permanently. See for example U.S. Pat. No. 7,280,517 "Wireless LANs and Neighborhood Capture", US Patent Application 2003-0,086,437 "Overcoming Neighborhood Capture in Wireless LANs", US Patent Application 2008-0,019,343 "Wireless LANs and Neighborhood Capture", and U.S. Pat. No. 7,647,046 "Maintaining Uninterrupted Service in a Wireless Access Point and Client Stations Thereof."

AP Directed Transfer to another AP, see for example US Patent Application 2006-0058056 "Method for Controlling Handoff between Secondary Agents in a Wireless Communications System", U.S. Pat. No. 7,706,326 "Wireless Communications Methods and Components that Implement Handoff in Wireless Local Area Network", and US Patent Application 2004-0,264,394 "Method and Apparatus for Multi-Channel Wireless LAN Architecture."

Higher Level Protocols wherein APs are directed, see for example US Patent Application 2007-0,286,202 "Methods and Systems for Call Admission Control and Providing Quality of Service in Broadband Wireless Access Packet-Based Networks", U.S. Pat. No. 7,826,426 "Seamless Mobility in Wireless Networks", and US Patent Application 2004-0,202,130 "Apparatus for Associating Access Points with Stations in a Wireless Network."

AP Characteristics and Configuration, see for example U.S. Pat. No. 7,274,945 "Transmission Channel Selection Apparatus", U.S. Pat. No. 7,366,537 "Wireless Network Apparatus and System", US 2004-0,166,870 "Distributed Protocol for use in a Wireless Network", and US Patent Application 2004-0,203,688 "Apparatus for Adjusting Channel Interference between Access Points in a Wireless Network."

Polling STAs, see for example 2008-0,013,522 "Wireless LANs and Neighborhood Capture", and US Patent Application 2006-0,072,488 "Point-Controlled Contention Arbitration in Multiple Access Wireless LANs", US Patent Application 2005-01,070,263 "Wireless Access Point Protocol Logic", and US Patent Application 2004-0,202,122 "Wireless Access Point Protocol Program"

Overall the 802.11 protocol is designed to provide equal opportunity for all STAs to seize the RF channel. However, with different classes-of-service, a STA transmitting Real Time traffic should receive priority in seizing the RF channel to improve delay, jitter and loss to these services over other traffic either from the same STA or from other STAs. Whilst the IEEE standard 802.11e provides a mechanism to achieve this prioritization it requires that both the APs and the STAs support this protocol. Critically IEEE 802.11e requires that key elements be applied to the STAs, which as discussed supra are in the majority of cases consumer devices that only provides basic IEEE 802.11 functionality without QoS or other features. Advanced features such as QoS (IEEE 802.11e) and Signaling for Load Distribution are not expected to be ubiquitously deployed and available anytime soon for several factors including, but not limited to 1. some of these standards are yet not ratified and hence the standardized functions are not available in Wi-Fi chip sets;

2. modification to applications running on STAs would be required to interwork with the QoS and traffic management functions that are deployed in the chip sets; and 3. many legacy STAs will continue to operate even when standards are deployed so a QoS solution is still needed for these legacy STAs.

Consequently, ubiquitous penetration of such QoS compliant STAs to the more general consumer base in markets for many years. In 2009 the top 5 manufacturers sold 888 million devices from a total sales base of 1 billion units. Even at these high rates, which are driven by the current massive subscriber increases in China and India, and hence likely to drop as market penetration reaches 100% of the world's population, it would take nearly 6 years to replace all existing handsets in the consumer's hands with QoS compliant STAs.

Recently, significant attention has been focused on smartphones as opposed to feature phones, together with their operating systems such as Android (Google), Apple iOS and Symbian. Smartphones typically allow the user to install and run more advanced applications as they run a complete operating system whereas feature phones have less advanced programming and are typically based on Java ME or BREW. Yet in both Q3 and Q4 2010 (July-September) when compared to 2009 sales were still dominated by feature phones and in fact low cost feature phones increased market share. Overall smartphones currently account for only 20% of handset shipments, and typically most consumers today exploit only voice and data services like the majority of consumers with their feature phones.

Equally today, in 2011, Wi-Fi enabled devices typically sold often do not support IEEE 802.11e. Those that do however, such as laptop computers and netbooks, generally do not use it due to the nature of the applications they run. Accordingly, it would be beneficial to provide a method today that provides for enhancing QoS, provides resilient connectivity, and increases useable network capacity and bandwidth to users of Wi-Fi networks when using Real Time services such as voice (VoIP), video and interactive data, as well data services such as email, FTP, web browsing, etc on basic Wi-Fi devices that do not support QoS features.

Providing resilient connectivity between each STA and AP means that each STA sees a good RF signal with good Signal to Noise and Interference Ratio (SNIR). Increasing useable network capacity and bandwidth means that each STA can transmit and receive packets using maximum over-the-air data rate and that over-the-air congestion is controlled and minimized. Enhancing service quality means ensuring that delay, loss and jitter are managed to a level where Real Time services perform, for example voice quality obtains a Mean Opinion Score (MOS) of 3.8 or higher (where MOS tests for voice are established by ITU-T recommendation P.800).

Whilst standards are evolving to address some of these issues, however, standards development, ratification and industry adoption are moving slowly. In other areas devices supporting QoS today, such as netbooks and laptops, are either not mass consumer market products or are not supported by the application. It would thereby be beneficial to provide a network-based solution sooner that supports legacy STAs as well as new QoS compliant STAs and additionally augments standards based QoS-compliant APs.

SUMMARY OF THE INVENTION

It is an object of the present invention to obviate or mitigate at least one disadvantage of the prior art and introduce new concepts.

In accordance with an embodiment of the invention there is provided a method comprising:
(a) providing an access point supporting at least a communication session of a plurality of communication sessions, each communication session associated with a client station of a plurality of client stations operating according to a first predetermined standard and comprising a plurality of frames, the access point comprising an over-the-air measurement block, a load distribution control block, and a processor;

(b) determining with the over-the-air measurement block for each communication session of the communication sessions at least one load utilization of a plurality of load utilizations, each load utilization associated with at least a predetermined traffic class of a plurality of traffic classes;

(c) determining for each traffic class with the over-the-air measurement block an accumulated load utilization in dependence upon at least the plurality of load utilizations relating to the plurality of communication sessions associated with that traffic class;

(d) determining with the processor whether to establish an enforcement action of a plurality of enforcement actions with the load distribution control block in dependence upon the plurality of load utilizations and a plurality of thresholds, each threshold relating to a predetermined traffic class of a plurality of traffic classes.

In accordance with another embodiment of the invention there is provided a device comprising:

a communications interface supporting at least a communication session of a plurality of communication sessions, each communication session associated with a client station of a plurality of client stations operating according to a first predetermined standard and comprising a plurality of frames an over-the-air measurement block;
a load distribution control block;
a non-transitory tangible computer readable medium encoding a computer program, and
a processor for executing the computer process, the computer process comprising:

(i) determining with the over-the-air measurement block for each communication session of the communication sessions at least one load utilization of a plurality of load utilizations, each load utilization associated with at least a predetermined traffic class of a plurality of traffic classes;

(ii) determining for each traffic class with the over-the-air measurement block an accumulated load utilization in dependence upon at least the plurality of load utilizations relating to the plurality of communication sessions associated with that traffic class;

(iii) determining with the processor whether to establish an enforcement action of a plurality of enforcement actions with the load distribution control block in dependence upon the plurality of load utilizations and a plurality of thresholds, each threshold relating to a predetermined traffic class of a plurality of traffic classes.

In accordance with another embodiment of the invention there is provided a non-transitory tangible computer readable medium encoding a computer program for execution by a processor, the computer program for executing a computer process comprising:

(i) determining with the over-the-air measurement block for each communication session of the communication sessions at least one load utilization of a plurality of load utilizations, each load utilization associated with at least a predetermined traffic class of a plurality of traffic classes;

(ii) determining for each traffic class with the over-the-air measurement block an accumulated load utilization in dependence upon at least the plurality of load utilizations relating to the plurality of communication sessions associated with that traffic class;

(iii) determining with the processor whether to establish an enforcement action of a plurality of enforcement actions with the load distribution control block in dependence upon the plurality of load utilizations and a plurality of thresholds, each threshold relating to a predetermined traffic class of a plurality of traffic classes.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 6 and 7 depicts a schematic of global release according to the prior art of U.S. Pat. No. 7,647,046;

FIG. 8 depicts a schematic of managing mobility with a higher level controller according to the prior art of U.S. Pat. No. 7,826,426;

FIG. 10 depicts the RF physical architecture of a representative STA;

FIG. 24 depicts exemplary process flows for adjacent channel interference mitigation by an AP according to embodiments of the invention; and FIG. 25 depicts exemplary process flows for adjacent channel interference mitigation by a STA according to embodiments of the invention.

DETAILED DESCRIPTION

Figure 1:
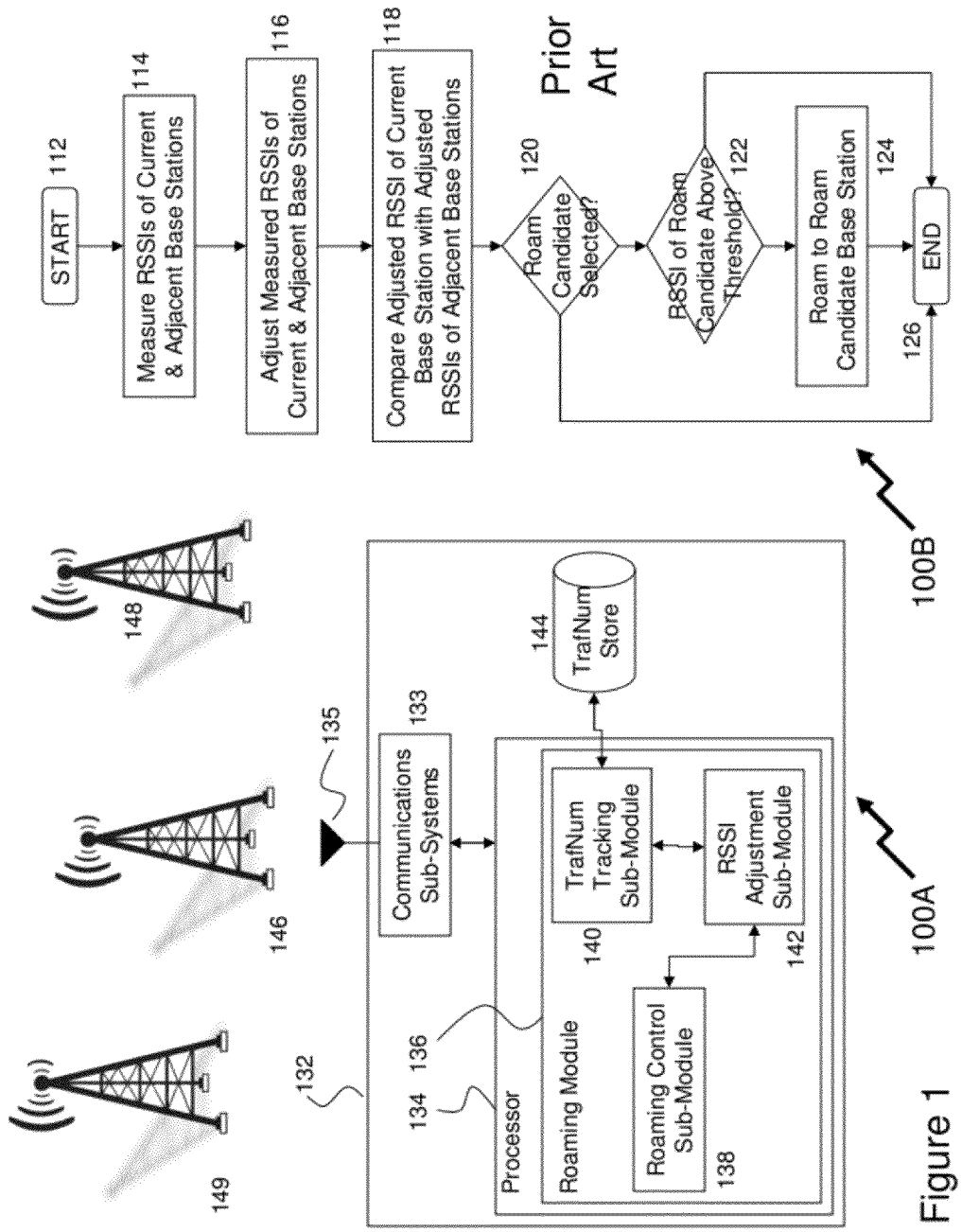
FIG. 1 depicts a schematic of load balancing according to the prior art of U.S. Pat. No. 7,065,063.

The present invention is directed to wireless networks and more specifically to managing access and ensuring quality of service within wireless networks.

For the purposes of defining aspects of wireless networks and their operating principles the background and embodiments of the invention will be described with respect to the IEEE 802.11 Wireless LAN Standard, which describes two major components, the mobile station (STA) and the fixed access point (AP). It would be understood by one skilled in the art that the embodiments of the invention and the principles within the specification overall may be applied to other wireless networks, including those operating to standards such as those defined supra.

Within the following description of embodiments of the invention "Service Class" is used to represent a set of traffic that requires specific delay, loss, and jitter characteristics from the network (see "Configuration Guidelines for Diff-Serv Service Classes" Internet Engineering Task Force, RFC 4594, August 2006). Conceptually, a service class pertains to applications with similar characteristics and performance requirements. Two service classes are addressed in the embodiments, Real Time Class and Data Class. The Real Time Class includes voice and video that have strict requirements in terms of delay, loss and jitter and is composed dominantly of UDP traffic. The Data Class includes all other traffic that is not serviced by the Real Time Class such as Internet surfing, email, FTP, etc., and can generally tolerate larger delay, loss and jitter and is composed dominantly of TCP traffic. It would be evident that the embodiments of the invention are not limited to just two classes of traffic and that multiple classes may be provided without departing from the scope of the invention.

Within the following description of embodiments of the invention "Client Station" is used to describe a STA, a Wi-Fi based device used by the end-user and which associates to an access point (AP). STAs used only for voice communications are often called handsets or Wi-Fi phones. General purpose multi-application wireless hand held devices are often called Smartphones. Other multi-application wireless devices are PDAs, netbooks, laptops, tablets, etc. It would be apparent to one skilled in the art that embodiments of the invention are applicable to any Wi-Fi based device that accesses a Wi-Fi network.

Within the following description of embodiments of the invention "Over-the-air Bandwidth" is used to describe the raw bandwidth that is available on the RF channel (i.e., between the AP and STAs) to carry a digital signal and is usually measured in bits per second.

Within the following description of embodiments of the invention "Over-the-air Utilization" is used to describe a measure of the average amount of over-the-air bandwidth being used relative to the total available. It is also a measure of the relative amount of time the RF channel is in use. In both cases it is usually measured as a ratio in percent.

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

FIG. 1 depicts a schematic of load balancing according to the prior art of U.S. Pat. No. 7,065,063 entitled "System and Method for Balancing Communication Traffic Loading between Adjacent Base Stations in a Mobile Communications Network" by P. H. Tran (Tran). First schematic 100A depicts a block diagram of an exemplary roaming system for a mobile communications device 132. The mobile device 132 includes at least a processor 134, a communications subsystem 133, an antenna 135, and a storage device 144. The roaming system includes a roaming module 136 and a trafnum store within the storage device 144. The roaming module 136 may be for example a software module executing on the processing device 134, and includes a roaming control sub-module 138, a trafnum tracking sub-module 140, and an RSSI adjustment sub-module 142. In one alternative embodiment, the roaming module 136 may instead execute on an additional processing device within the communications subsystem 133, such as a digital signal processor (DSP). Also illustrated is a current base station 146 and two adjacent base stations 148 and 149.

The term "trafnum" is commonly used to denote a traffic indicator, originally in the Mobitex network which was the first wireless network to provide always on, wireless push email services and used by the first model of Research in Motion's BlackBerry and PDAs such as the Palm VII, and indicates the number of wireless devices operating which it intends to send packets to within the next cycle. Within the context of FIG. 1 it is used generically to refer to traffic indicators and related devices, such as the trafnum store 144 and trafnum tracking sub-module 140. The roaming control sub-module 138 monitors signals received by the communications subsystem 133 from both the current base station 146 and one or more adjacent base stations 148, and measures an RSSI value for each signal. In addition, the roaming control sub-module 138 identifies a base station traffic indicator from the current base station 146. The size of this list of identifiers, commonly referred to as a trafnum, is dependent upon the number of devices that have traffic pending at the base station, and thus is a reliable indicator of the load on the base station. A stable traffic indicator for a current base station 146 may, for example, be calculated by averaging the trafnum values for a base station extracted from multiple control frames, such as SVP6 frames.

The roaming control sub-module 138 is typically able to monitor only the trafnum value for the current base station 146. Therefore, as the mobile communications device 132 roams between base stations 146, 148, the trafnum tracking sub-module 140 records the trafnum value from the current base station 146 in the trafnum store 144. For instance, if the mobile communications device 132 has recently roamed from the adjacent base station 148, then the last trafnum value detected from that base station 148 would be recorded by the trafnum tracking sub-module 140 in the trafnum store 144. In addition, the recorded trafnum values 144 are decreased or "aged" over time by the trafnum tracking sub-module 140 such that a stored trafnum value will be reduced to zero (0) after a predetermined aging time interval. For instance, if the aging time interval is 120 minutes, then the trafnum aging function may be performed by the trafnum tracking sub-module 140 using a linear aging formula, for example, where the particular formula may be adapted according to communication network operator or mobile communications device owner preferences, for example. An exemplary nonlinear trafnum aging scheme would involve maintaining a trafnum value in the trafnum store 144 for a predetermined period of time, and then reducing the trafnum value to zero at the expiry of the predetermined period.

The storage of trafnum values by the trafnum tracking sub-module 140 reduces the occurrence of "ping-pong" roaming of mobile communication devices 132 between congested base stations. The aging of trafnum values also allows a device to retry congested base stations after permitting time for the congestion to potentially abate. Consequently, the rate of trafnum aging affects the rate of "ping-pong" roaming. An aging time interval may, for example, be adjusted automatically by the trafnum tracking sub-module 140 or may be responsive to a control input from a network operator, a mobile communications service provider, or a mobile device user. The RSSI adjustment sub-module 142 receives the appropriate RSSI values and trafnum values from the roaming control sub-module 138, and calculates the RSSI_ADJ values for the current and adjacent base stations 146 and 148. If no trafnum value has been recorded for a particular base station (because the mobile communications device 132 has never roamed there), then the base station is assigned a default trafnum value, such as zero (0). The RSSI adjustment sub-module 142 may, for example, calculate the RSSI_ADJ values using Equation (1):

$$RSSI\_ADJ = RSSI\_MAX(0, MIN(12, Offset)) \quad (1)$$

where Offset=2*(trafnum−3).

The value of the term MAX(0,MIN(12,Offset)) in the above equation represents the amount by which the RSSI value is attenuated (in dB) depending upon the traffic load on the base station. The "MIN" component of the equation term MAX(0,MIN(12,Offset)) sets the maximum attenuation at 12 dB, and provides an "offset" term which in this example provides for attenuation increments of 2 dB and establishes a trafnum of 3 as a threshold loading at or below which a base station's RSSI will not be attenuated. It should be understood, however, that the values used in the above equation were selected for illustrative purposes only, and are not intended as a limitation of the claimed invention. It should also be understood that the RSSI adjustment sub-module 142 may calculate the RSSI_ADJ values using other equations. For example, an analogous equation may instead be used for increasing the RSSI of base stations with relatively low traffic loads. Thus, the roaming module 136 may store or input both RSSI and RSSI_ADJ values for a current base station 146 and a plurality of adjacent base stations, 148 and 149. For each base station, these values may be stored or input as triplets including a base station identifier, an RSSI value, and an RSSI_ADJ value. Accordingly, within one subset of solutions in the prior art, the RSSI and RSSI_ADJ are processed as described above to identify roam candidates and to determine whether a mobile communications device should roam to one of the roam candidates. Than extends the prior art wherein known roaming modules and algorithms used only RSSI values to make such determinations.

Referring now to the second schematic 100B there is depicted a flow diagram of an exemplary roaming method that utilizes an adjusted RSSI value according to the prior art of Than. The method starts at step 112. At step 114, the mobile communications device measures the signal strength of its current base station and one or more adjacent base stations (base stations with overlapping coverage), and calculates a signal strength indicator, such as an RSSI value, for each base station. Methods of measuring the signal strength of a base station and calculating a signal strength indicator, such as an RSSI value, from the signal strength measurement are well known in the field of mobile communications. In step 116, the signal strength indicator for each base station is adjusted by an amount dependent upon the current loading of the base station. The adjusted signal strength indicator (RSSI_ADJ) is calculated using the measured signal strength indicator (RSSI) and a base station traffic indicator, such as a trafnum value. Based on the traffic indicator, the RSSI value of a base station may be adjusted upward or downward, such as described above in respect of Equation (1). At step 118, the RSSI_ADJ value of the current base station is compared with the RSSI_ADJ values of one or more adjacent base stations to identify possible roam candidate base stations. The adjacent base station with the highest RSSI_ADJ value that is also at least a certain threshold amount greater than the RSSI_ADJ value of the current base station is selected as a roam candidate at step 120. If none of the adjacent base stations meet this criterion, however, then no roam candidate is selected and the method ends at step 126.

If a roam candidate is selected in step 120, then its RSSI is compared with a pre-selected minimum threshold RSSI value at step 122. If the RSSI of the roam candidate base station is not greater than this minimum threshold value, then the method ends (step 126) and the mobile communications device remains on its current base station. If the roam candidate has an RSSI value greater than the minimum threshold, however, then the mobile communications device roams to the roam candidate base station at step 124. In the teachings of Than the minimum threshold measured in step 122 relates to the measured RSSI values, similar to known prior art roaming methods. Since the minimum threshold in step 122 is associated with physical limitations of a mobile communications device, below which communication signals cannot be reliably transmitted and/or received, the measured RSSI values are preferably used. However, unlike the prior art roaming methods, the initial selection of a possible roam candidate base station at step 118 is made on the basis of RSSI_ADJ values. Thus, the method effectively pre-processes or adjusts RSSI values of a current and one or more adjacent base stations, and uses the adjusted values to select roam candidate base stations.

In an alternate embodiment, adjusted values may be used for fewer roaming method operations. For instance, in step 120, a mobile communications device may determine whether a possible roam candidate base station, selected based on its RSSI_ADJ value, has an RSSI value that is at least a certain threshold amount greater than the RSSI value of the current base station. Selection of candidate base stations for roaming is based on RSSI_ADJ values, whereas the final determination as to whether the mobile communications device should roam to an adjacent base station is dependent upon relative RSSI values. The threshold value used in step 122 may also be adjusted, based on a trafnum value for a selected roam candidate base station for example, so that RSSI_ADJ values may be used throughout the roaming method. Because both RSSI and RSSI_ADJ values will typically be readily available however, roaming methods in which both RSSI and RSSI_ADJ values may provide the most efficient use of processing and memory resources.

However, it would be evident to one skilled in the art that the determination of roaming from one AP to another in the prior art of Than is simply based upon the determined RSSI for the current active and adjacent APs and overall traffic loading, trafnum, of the respective APs. Accordingly, the STA determines whether to move based solely upon the RSSI and number of devices to transmit to for each AP. Accordingly, if the adjacent nodes do not offer any better figure of merit the STA will not disassociate from the current AP, as will all other STAs making the same determination for that AP. There is no consideration of the traffic of the STA, the traffic of other STAs and the delay that the STA is currently experiencing with the AP for the traffic class it is transmitting or receiving. Accordingly, the prior art of Than does not provide an AP with a means to manage the QoS of STAs associated with it.

Figure 2:
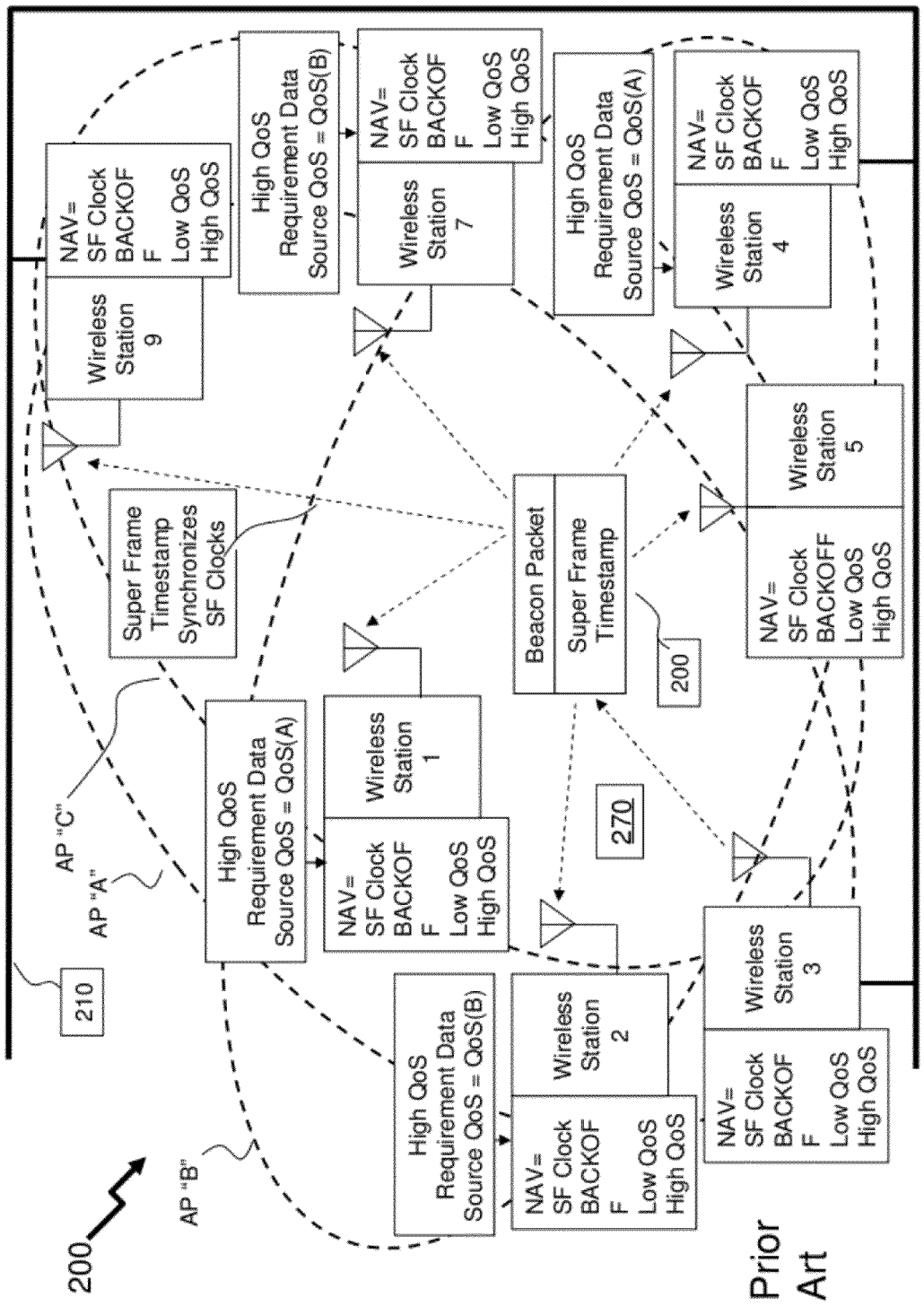
FIG. 2 depicts a schematic of managing a WLAN according to the prior art of U.S. Pat. No. 7,280,517.

Now referring to FIG. 2 there is depicted a schematic 200 for a technique of managing a WLAN according to the prior art of U.S. Pat. No. 7,280,517 entitled "Wireless LANs and Neighborhood Capture" by M. Benviste (Benviste). Within schematic 200 three APs are depicted that have been assigned the same channel, commonly referred to as a co-channel group, which are referred to as APs A, B, and C and comprise nine STAs. APs are depicted as dotted areas, and STAs are labeled numerically. STAs 1, 2, and 3 make up AP A with STA 3 serving as the AP for AP A. STAs 4, 5, and 6 make up AP B with STA 4 as AP B's AP. STAs 7, 8, and 9 make up AP C with STA 9 as the AP for AP C. APs A and C are not within interference range of each other, so they are called a re-use group. STAs in the pair of APs A-B or B-C are, however, within possible interference range of one another. In the A-B AP pair, STA 2 of AP A and STA 5 of AP B are both in the possible interference range of one another. Correspondingly, in the B-C AP pair, STA 6 of AP B and STA 7 of AP C are both in the possible interference range of one another.

All STAs use a CSMA-type of protocol to access the channel, which involves some form of carrier-sensing (either actual or virtual) and handle traffic at three priorities, top, medium, and low. A STA will refrain from transmitting while the channel is busy, and transmission will be deferred until the backoff timer expires. Backoff countdown occurs while the channel is sensed idle and an idle time interval equal to the AEFS for the priority of the pending transmission has elapsed following a busy period. Because different APs hear different transmissions, depending on their location relative to other co-channel APs, their backoff countdown rates are different. As a consequence, AP B will have difficulty accessing the channel and in operation a STA in AP A may transmit at the same time as a STA in AP C. STAs in AP A must refrain from transmitting only when STAs in AP B are transmitting. STAs in AP B are preempted from accessing the channel by transmissions in either of its interfering neighbors, APs A or C. Because transmissions have variable lengths, it is very likely under loaded traffic conditions for a STA in AP A to start a transmission before a transmission in AP C expires, and vice versa. As a result, APs A and C will capture the channel, not allowing STAs in AP B to transmit. In general, one would expect that periphery APs, for example APs at the top or bottom floors of a multiple-story building equipped with a multiple-AP WLAN, to be likely to capture the channel, at the expense of APs in the same co-channel group located in the interior. In this instance, an AP is disadvantaged not only because it's competition for the channel—namely, the re-use group comprising APs A and C—has a greater combined offered load, but also because selected STA members of a re-use group may transmit simultaneously, thus prolonging their retention of the channel. In fact traffic from AP B that may be transmitted would only be high-priority traffic when APs A and C are not transmitting. All other traffic from AP B would be blocked by traffic from APs A and C even though the traffic from APs A and C was medium- or even low-priority. This phenomenon, being commonly referred to in the prior art as neighborhood capture, has a negative impact on QoS delivery.

Transmissions in APs outside the re-use group capturing the channel will be delayed excessively as transmissions will find the channel busy for long time intervals. In consequence, CFPs could not be initiated as scheduled and periodic and time-critical data will be delayed. The prioritization apparatus put in place for EDCF within IEEE 802.11e WMM will also be rendered ineffective. Accordingly Benviste addresses this capture of the PHY by APs A and C by requiring all STAs to release the channel at pre-specified times. All competing co-channel APs would thus have an equal chance to seize the channel. Global channel release (GCR) should occur at regularly spaced time intervals that are sufficiently close to meet delay and jitter restrictions for time-critical applications such as voice or video. This implies slotting of the channel into superframes and synchronization of all STAs.

As shown in schematic 200 wireless STA 3 transmits a timing packet, such as the beacon frame packet 200 or probe response frame of the IEEE 802.11 standard, carrying a superframe timestamp field. Each STA receiving the timing frame 200 updates its SF clock if the received timestamp is later than the current value of the clock. The initial setting of the clock when a STA powers on is 0. All STAs in an IBSS AP prepare to transmit a beacon frame at a target beacon transmission time (TBTT). Each STA prepares its beacon frame to contain the superframe timestamp value and selects a random delay when it is to transmit its superframe timestamp value. In this manner, the superframe timestamp value is propagated to overlapped STAs, such as wireless STA 5 in FIG. 2. At a later target beacon transmission time (TBTT) wireless STA 5 will relay a superframe timestamp value that is updated with the passage of time since its receipt, when it transmits its beacon frame. In this manner, wireless STAs, such as STA 9, which may be out of range of wireless STA 3, will receive an updated superframe timestamp value. As a result, the BPs that follow must be foreshortened in order to ensure termination of the BP at the designated slotted time. However, GCR does not eliminate all inequities. By forcing STAs to end their BPs at the same time, equal access is offered to all STAs in all APs, as there is no synergy of member APs of the same re-use group in retaining the channel. If traffic loads are equally distributed across APs and re-use groups, all STAs have a fair/equal chance at the channel. But if the combined offered load is greater in one re-use group, as is possible for instance with group A-C which has more STAs, the success rate of AP B would be less. GCR improves the success rate of AP B, however, relative to what the success rate would have been otherwise. To achieve greater fairness, traffic loads in all re-use groups must be comparable—hence the need to balance loads not only across APs, but also across re-use groups.

Irrespective of this limitation within Benviste, in order to avoid their BPs straddling the superframe boundary, all STAs in the multiple-AP WLAN must be synchronized. Synchronization may be achieved in several ways. For instance, within an AP, STAs may synchronize with the AP, as is done in the current IEEE 802.11 standards. Neighboring APs may be synchronized via frames sent by STAs in the overlapping coverage area of two APs. However, time offsets may arise between different APs as distant APs [APs that cannot hear each other] power on and synchronize locally, independently of one another. This would happen for example early in the morning when few STAs are on, when an AP is taken offline for maintenance, In the former instance as more STAs power on and synchronize with their neighbors in the course of the day, asynchrony may arise. Clock adjustment is necessary in order to eliminate time offsets. Time offsets between APs may be corrected in a way similar to node synchronization in an independent BSS. As shown in schematic 200 the STAs transmit a special frame, such as the beacon frame 100 or probe response frame of IEEE 802.11, carrying a superframe timestamp field. Each STA updates its SF clock if the received timestamp is later. The initial setting of the clock when a STA powers on is 0.

Other mechanisms are also possible for synchronization such as for instance, synchronization between APs through a wired distribution network 210 within the WLAN infrastructure. In this manner, synchronization between APs can be maintained by transmitting the superframe timestamp over the wired distribution system 210. Additionally, STAs in each AP can communicate with each other and with STAs in other APs via their AP, which is in communication with the wired distribution network 210. For example, if STA 1 in AP A has data/communication traffic for STA 7 in AP C, then when STA 1 is polled by AP 3 of AP A, STA 1 indicates that it has data for STA 7 of AP C and the priority of the data. The AP 3 can then poll STA 1 to send the data to the AP 3. If AP 3 is within wireless communication range of AP 9 in AP C, it can attempt to gain channel access to the wireless medium to communicate that data to AP 9. If channel access is granted, then AP 3 of AP A forwards STA 1's data frames over the wireless medium to AP 9. Alternately, AP 3 can access the wired distribution network to forward the frames to STA 9 of AP C for final distribution to STA 7 of AP C. The AP can use the IEEE 802.3 protocol to access the wired distribution network 210.

Accordingly Benviste teaches to a method of managing access to the PHY overall by providing a predetermined period wherein all STAs associated with all APs are silent before allowing STAs to contend for access to the PHY. As such over-the-air utilization drops as time is devoted to the global silence as well as the transmission of the superframes. Further GCR does not manage the loading of APs, but rather manages contention between APs for the same PHY. Additionally Benviste does not manage the transmissions from each STA within an AP or determine movement of STAs based upon the traffic carried by them. As such Benviste does not proactively associate STAs with other APs based upon the loading of a particular AP nor the traffic content for that AP but simply prevents particular APs dominating access to the PHY irrespective of their loading and traffic pattern.

Figure 3:
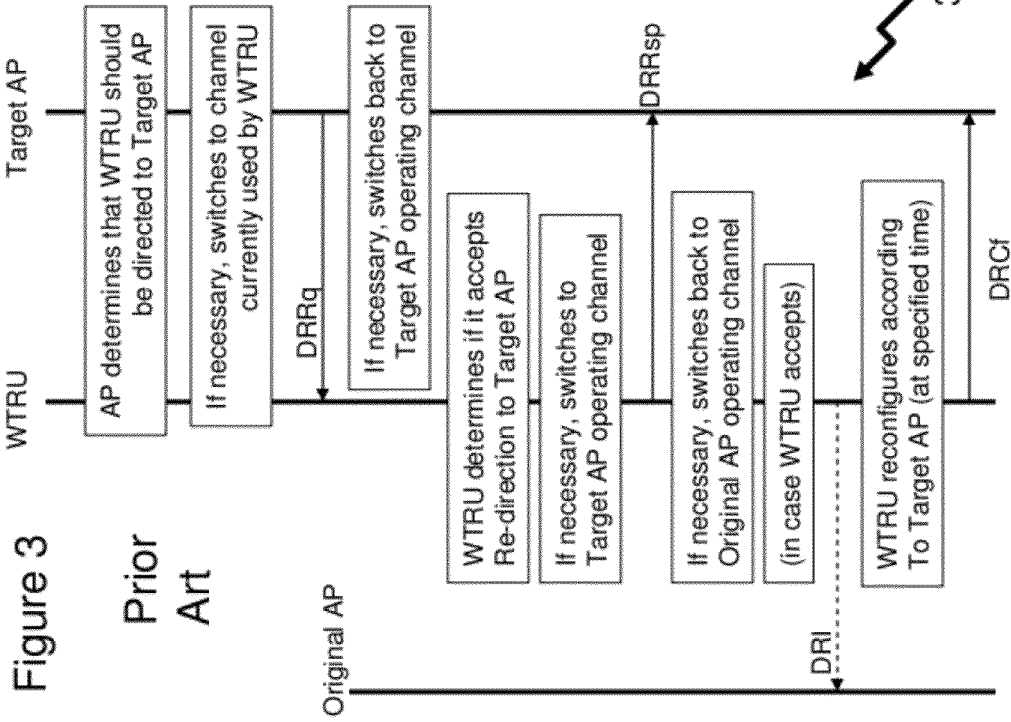
FIG. 3 depicts a schematic of managing handoff according to the prior art of U.S. Pat. No. 7,706,326.

Now referring to FIG. 3 there is depicted a schematic 300 of managing handoff according to the prior art of U.S. Pat. No. 7,706,326 entitled "Wireless Communication Methods and Components that Implement Handoff in Wireless Local Area Networks" by P. Mariner et al (Mariner). Within schematic 300 the target AP requests the STA to handoff to the target AP. The STA decides whether to handoff or not, and communicates its decision to the target AP. In the case where the STA decides to go forward with the handoff, the STA notifies the original AP with which it is communicating of its imminent handoff, reconfigures its channel, BSSID, etc. for the target AP, and sends to the target AP a confirmation message indicating that it has completed the re-association. Within the teachings of Mariner the target AP determines that the STA should be redirected to it, and further preferably as taught, the target AP uses the channel being used by the STA in communicating with the original AP to send to the STA a DRRq message requesting that the STA handoff to the target AP. The target AP subsequently communicates with the STA on the target AP's preferred operating channel. The STA determines if it accepts the redirection request. It communicates its decision to the target AP via a DRRsp message, preferably on the target AP's operating channel. In the case where the STA accepts the request to handoff to the target AP, the STA sends to the original AP a DRI communicating its decision, preferably on the original channel that had been used in communications with the original AP. The STA then reconfigures itself to the target AP, and sends to the target AP a DRCf message, confirming that it has handed off.

Mariner teaches that it is possible to combine the DRRsp with the DRCf, or treat the DRCf as the DRRsp, where the STA determines to accept the redirection request from the target AP. These alternatives eliminate the need for the STA to switch between communication parameters multiple times during handover, but imply that either the original AP or the target AP are using the same channel or that, after sending the DRRq, the target AP remains on the original AP channel until it receives the DRCf message. The method by which the AP driving the handoff procedure determines which AP is a suitable or desired candidate to be the target AP can include, for example, the STA reporting a list of candidate APs, inter-AP signaling, and centralized decision-making performed at a central controller. Four different scenarios are presented by Mariner:

1. An original AP requests a WTRU to handoff to a target AP wherein the WTRU then decides whether to handoff or not, and communicates its decision to the original AP;

2. An original AP commands a WTRU to handoff to a target AP wherein the WTRU then reconfigures its channel, BSSID, etc. for the target AP, and sends to the target AP a confirmation message indicating that it has completed the re-association;

3. A target AP commands a WTRU to handoff to the target AP wherein the WTRU then notifies the original AP of its imminent handoff, reconfigures its channel, BSSID, etc. for the target AP, and sends to the target AP a confirmation message indicating that it has completed the re-association; and 4. A target AP requests the WTRU to handoff to the target AP wherein the WTRU decides whether to handoff or not, and communicates its decision to the target AP.

It would be evident to one of skill in the art that the teachings of Mariner whilst teach to commanded and requested transfer of an STA from one AP to another that the teachings within Mariner require that the STA and AP are implemented with the firmware variants that handle such commanded/requested transfer from the AP in addition to the normal handoff protocols for roaming. Further, whilst Mariner mentions the directed transfer arising from congestion at an AP there is no determination of when this occurs, whether such directions are directed to specific STAs based on traffic type etc. As presented by Mariner the approach is not dependent of the traffic nor thresholds of over-the-air utilization.

Figure 4:
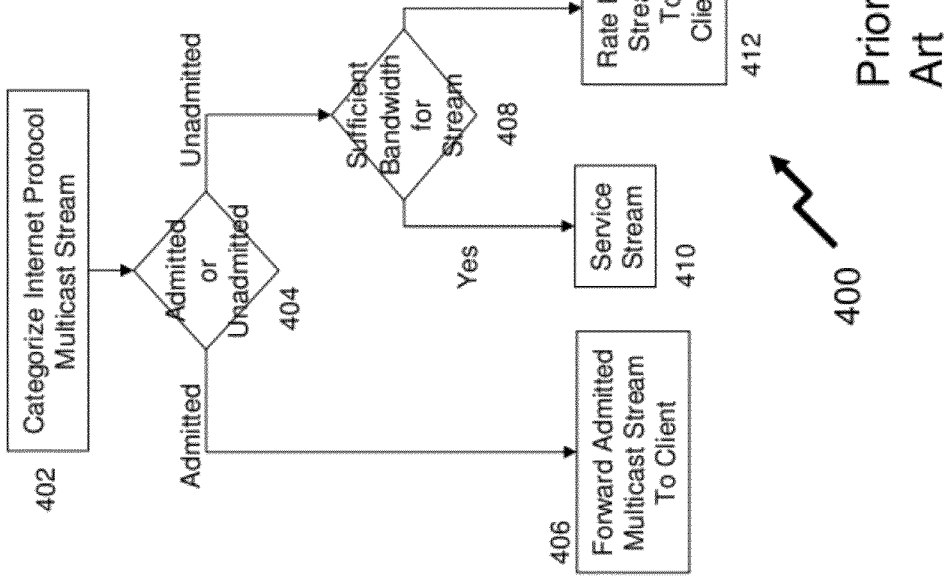
FIG. 4 depicts a schematic of load balancing according to the prior art of US Patent Application 2008-0,151,807.

Referring to FIG. 4 there is depicted a flowchart 400 for a method of load balancing according to the prior art of US Patent Application 2008-0,151,807 entitled "Method for Multicast Load Balancing in Wireless LANs" by R. C. Meier et al (Meier). Flowchart 400 depicts a method according to Meier for an AP using implicit admission control to prevent excessive downlink multicast traffic from disrupting multicast and unicast communications and is based on Internet Group Management Protocol snooping of Internet Protocol multicast streams. At step 402, the AP categorizes an Internet protocol multicast stream, identified by a destination multicast address, or optionally by a multicast destination IP address and a unicast source IP address, using Internet Group Management Protocol snooping. At step 404, a determination is made whether the Internet protocol multicast stream is admitted or unadmitted. If the Internet protocol multicast stream is admitted, the AP forwards all frames that belong to the implicitly admitted downlink multicast stream to the client at step 406. However, if the Internet protocol multicast stream is unadmitted, a determination is made whether sufficient bandwidth is available for the stream at step 408.

If there is sufficient bandwidth available for the multicast stream, the AP services the multicast stream at step 410. However, if there is insufficient bandwidth available for the multicast stream, the AP rate limits frames that belong to the unadmitted multicast stream to the client at step 412. Thus, implicit admissions control can be used to protect admitted or unadmitted low bandwidth multicast streams and admitted high bandwidth multicast streams from high bandwidth unadmitted multicast streams when the total offered multicast load is greater than the available multicast bandwidth available from the AP. For example, a dual-mode IEEE 802.11a/g STA needs to be able to roam seamlessly between IEEE 802.11b/g APs and IEEE 802.11a APs. Generally IEEE 802.11b STAs are low bandwidth clients of the WLAN to which they are connected and IEEE 802.11a/g STAs are relatively high bandwidth clients. Accordingly Meier teaches to an IEEE 802.11a/g STA roaming to another AP wherein if sufficient bandwidth is available the STA is serviced fully, otherwise the STA receives a reduced bandwidth, commonly referred to as being throttled back, such that it can be serviced from the new AP to which it is associating.

Accordingly Meier teaches to a method of throttling back STAs to manage the loading at an AP. In contrast it would be beneficial for the AP determining that it is going to be unable to receive additional traffic load from STAs to dynamically instruct STAs that are active in sending traffic on low bandwidth-efficiency connections to disassociate or cause these STAs to roam to APs with lower channel utilization.

Figure 5:
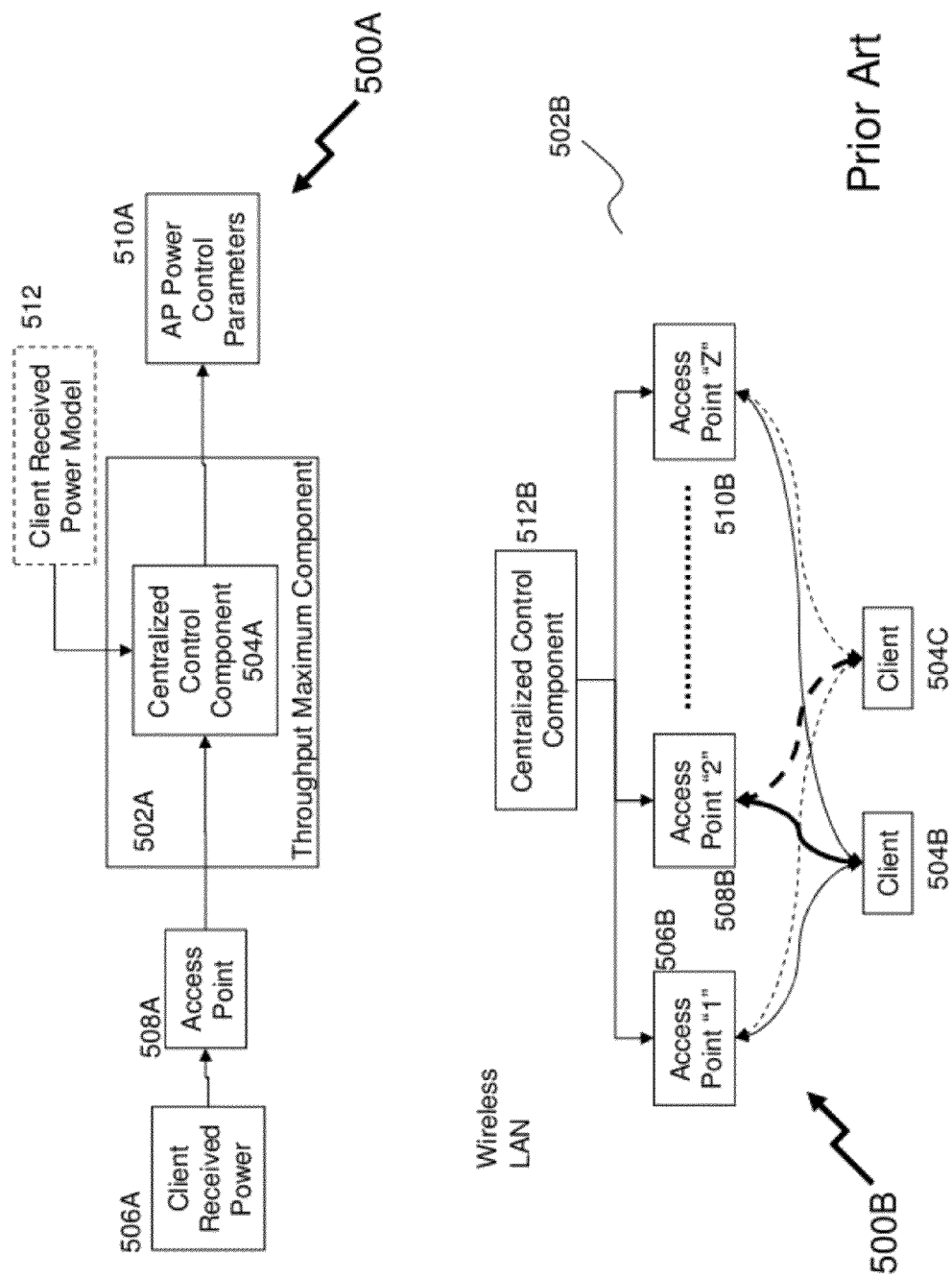
FIG. 5 depicts a schematic of beacon power management according to the prior art of U.S. Pat. No. 7,715,353

Now referring to FIG. 5 there are depicted first and second schematics 500A and 500B according to the prior art of U.S. Pat. No. 7,715,353 entitled "Wireless LAN Cell Breathing" by K. Jain et al (Jain). Considering initially first schematic 500A there is shown a block diagram of a wireless LAN data throughput maximization system comprises a throughput maximization component 502A. The throughput maximization component 502A is comprised of a centralized control component 504A that obtains client received power 506A via an AP 508A and provides AP power control parameters 510A. Optionally, the centralized control component 504A can utilize a client received power model 512 to provide information regarding client received power without requiring the information from the AP 508A. Jain teaches that the optional client received power model 512 can provide a complex estimation and/or a simpler solution such as a ratio indicating how client received power is proportional to AP transmitted power and the like. Jain teaches that the other instances of the throughput maximization component 502A can employ distributed control components as well that can reside in other parts of a wireless LAN such as, for example, within an AP and the like, to further facilitate control of the AP power. The AP power control parameters 510A can include, but are not limited to, AP power levels, power ON/OFF commands, and/or power level increase/decrease information (e.g., percentage reduction of power over time e.g., 10% each minute for 10 minutes, etc.) and the like.

Now referring to second schematic 500B an illustration of a wireless LAN employing a wireless LAN data throughput maximization system 502B in accordance with an aspect of an embodiment is depicted. The wireless LAN data throughput maximization system 502B is comprised of a centralized control component 512B and APs "1-Z" 506B to 510B respectively, where Z is an integer from one to infinity. A first client 504B can interact wirelessly with the APs "1-Z" 506B-510B. The centralized control component 312B provides AP beacon power control for the APs "1-Z" 506B to 510B respectively to maximize data throughput and/or optimize power of the wireless LAN. For example, if AP "2" 508B has heavy client demand, the centralized control component 512B can reduce the beacon power level for AP "2" 508B and/or raise the beacon power for AP "1" 506B and/or AP "Z" 510B. The first client 504B typically automatically attempts to acquire the stronger signal from AP "1" 506B or AP "Z" 510B when AP "2" 508B is no longer receivable. Therefore, Jain teaches that by controlling the power levels of the APs "1-Z" 506B to 510B respectively, the first client 504B can be manipulated into accessing the wireless LAN 502B at a different AP without any modifications to the client itself. In another instance, the functions of the centralized control component 512B can be located in one of the APs "1-Z" 506B to 510B respectively or distributed among the APs "1-Z" 506B to 510B respectively rather than at a central location. In the latter scenario interaction between the APs "1-Z" 506B to 510B respectively may be necessary to coordinate AP power levels.

Now consider, second client 504C that is also in communication with AP "2" 508B and which likewise detects that the centralized control component 512B has either reduced the beacon power level for AP "2" 508B or raised the beacon powers for AP "1" 506B and/or AP "Z" 510B. Second client 504C makes the same determination as first client 504C and seeks to associated with another AP, such as AP "1" 506B or AP "Z" 510B. Depending upon the location of first and second clients 504B and 504C respectively relative to the APs "1-Z" 506B to 510B respectively they may associate to the same AP or different APs. Likewise other STAs being serviced by AP "2" 506B will make their own determinations to disassociate or remain associated. For disassociation to occur an STA must establish that the other AP is at a higher RSSI relative to the current AP. As would be evident to one skilled in the art the teaching of Jain simply reduces the beacon power, which an AP employs when sending beacon frames, which for example announce the presence of a wireless LAN cell, transmit timing information, or the length of the contention-free interval. Accordingly all STAs will react to the beacon power reduction with an unpredictable re-association of those STAs that disassociate based upon their locations relative to the other APs. As such Jain may force significant traffic from one AP to another AP thereby overloading the other AP. It would also be evident that the STAs are not moved in any manner that is associated with their traffic, merely their effective distance (as established by the received RSSIs) from the APs in the network.

Studies of public-area wireless networks have shown that STA service demands are highly dynamic in terms of both time of day and location and that STA load is often distributed unevenly among wireless APs. STAs tend to localize in particular areas of the network for a wide variety reasons, including but not limited to the availability of favorable network connectivity (away from deadzones for example), proximity to power outlets, classrooms, meeting rooms, and/or geographic constraints of other services (e.g., at airport gate areas with arriving and departing flights). A consequence of such behavior is sporadic client congestion at popular locations within the network. At any one time, a large percentage of mobile clients communicate with a small subset of the APs. These client concentrations create an unbalanced load in the network and complicate capacity planning, making it difficult to accommodate heavy, concentrated load in different parts of the network without significant, and costly, over-engineering. As Jain notes the mapping between clients and the APs that service them is a critical determinant of system performance and resource usage. As Jain notes an AP can get seriously overloaded even when several nearby APs are lightly loaded as the majority of STAs will associate with the APs with the loudest beacons (i.e., the strength of the received beacon signal is highest among all neighboring APs).

Jain therefore teaches that one way to address this is to modify the client association algorithm within the STAs to incorporate the AP's load in addition to the received signal strength indicator (RSSI) of the AP's beacon. A client associates with the AP that is lightly loaded and whose beacons have a highest RSSI value. However, this requires that the STAs are now configured to receive the AP load information, thereby preventing legacy STAs from exploiting the modified association algorithm. However, the re-association is still uncontrolled in that all STAs establishing a louder AP beacon in their vicinity will move which given the clustering of STAs within most networks will mean that the other APs will become heavily loaded. Jain further does not address any consideration of the traffic to/from STAs/APs within the association algorithm.

Now referring to FIGS. 6 and 7 there are depicted first and second schematics 600 and 700 respectively of a global release technique according to the prior art of U.S. Pat. No. 7,647,046 entitled "Maintaining Uninterrupted Service in a Wireless Access Point and Client Stations Thereof" by W. Huang et al (Huang). Referring to first schematic 600 a flowchart according to an embodiment of Huang is shown that exploits the IEEE 802.11 protocols for wireless roaming, these principles such as RSSI being described above, that induces roaming from the AP under certain conditions. As shown in first schematic 600 in one embodiment, a first AP carries out a power reduction step 601 to induce wireless roaming in one or more STAs associated with the AP. According to Huang the power reduction is carried out in a plurality of steps rather than in one step so as to not cause any of the associated STAs to simply and suddenly lose signal. For example, the first AP, in step 603 ascertains whether or not a pre-defined minimum power level has been reached, and if not, then in step 605 the AP waits for a pre-defined time interval, and repeats the power reduction step 601. In a particular embodiment, the power reduction is carried out in six or seven steps. For example, suppose the first AP is transmitting at 100 mW. The first reduction (step 603) of communication power is to 75 mW, the second to 50 mW, the third to 30 mW, the fourth to 20 mW, the fifth to 10 mW, and then finally, the sixth instance of step 601 reduces the transmit power to 5 mW. The pre-defined minimum power level is thus 5 mW. In this example, each reduction step is separated in wait step 605 by a pre-defined interval of one second.

At the end of the reduction process, there are three possibilities for each associated, or previously associated, STA. The first possibility is that the STA has successfully roamed to a different (second) AP. The second possibility is that the STA is still associated with the first AP even when the first AP is transmitting at a minimum power level. The third possibility is that there is a catastrophic power drop-off that causes the associated STA to be disconnected from the wireless network. Huang teaches that in the case of one or more STAs being associated still with the first AP even when that AP is transmitting at the pre-defined minimum power level a management frame to indicate to all associated STAs that the AP will stop being active at some future point in time, e.g., that the first AP is going offline at some point in the (near) future. These management frames may be a new management frame that is a broadcast frame broadcast by the AP or it may be a modification of a standard beacon frame.

Continuing with the flowchart in first schematic 600, in step 607, the first AP broadcasts a management frame, which in a simple embodiment is transmitted only at the minimum power level used the last instance of 603, e.g., 5 mW. In another embodiment of Huang, to ensure that all associated STAs can successfully roam to another AP, including those STAs that were in a "sleep mode" during the power reduction process, one or more management frames are also broadcast at a higher power than the pre-defined minimum power level. Such an embodiment that includes repetition of broadcasting of management frames being depicted in first schematic 600. In step 609, the first AP ascertains if enough management frames have been sent, and if the first AP determines not enough, in step 611 the AP waits for a pre-defined time interval and then repeats step 607 of broadcasting the management frame. Thus, each step of broadcasting the management frame is separated by a preset time interval. For example, the preset time interval in one version is selected such that a STA that was asleep during the first broadcast would be awake after the pre-defined time interval.

Huang also teaches, as shown in second schematic 700, a method implemented in a STA wherein as the first AP reduces the power of transmission then at some stage, shown in step 729, the STA receives signals from the first AP at a received power level below a pre-defined threshold, such that the STA, in 727, commences a wireless roaming procedure to associate itself with a different, say a second AP. In one embodiment, this second AP is selected from a set of APs stored at the STA based on beacon frames received from APs. Once the station has in step 727 roamed to another AP, e.g., associated with the second AP, in step 731, communication continues via the new AP. Now consider that as shown in step 721 that the STA is still in communication with the first AP, as indicated by the signal strength (or measure of received signal quality) above the pre-defined threshold, even after such an AP has reduced its transmit power to a pre-defined minimum level. In step 723 shows the case that the STA wirelessly receives a management frame that was broadcast by the AP. Such a management frame, as described above, includes information that announces that the first AP will stop being active at a defined time and hence in step 727 the STA initiates the roaming procedure that associates the STA to a second AP from which it has received a beacon, e.g. that is in it's AP list and therefore with which it can communicate. The STA in step 731 then continues communication, now via the new AP. The case of no management frame received is shown as step 725, assuming the AP does not go offline, and the process cycles back to the start and the AP re-determines whether the signal is above or below the threshold. It would be clear to those in the art that if 729 and 723 are not cases that occur, and the AP instantly goes offline, communication will be (temporarily) lost until the client can re-associate with another AP.

Accordingly, it would be evident to one skilled in the art that Huang in teaching the controlled removal of an AP from the network, for example for maintenance, teaches to a global release wherein any STAs associated with the AP either initiate roaming automatically due to the RSSI of their associated AP dropping to below a trigger threshold or that they receive a management frame that triggers the roaming process. In each instance the STA determines which other AP it will associate with based upon internally stored data relating to the other APs from which it receives beacons. An alternate embodiment of the teaching of Huang is to initiate such a global release as a means of distributing the loading of STAs with a network of APs such that, either periodically or upon determining that congestion is occurring, the power of the AP is reduced thereby triggering roaming in the STAs associated with it. Huang in teaching to reducing the output power in a series of steps teaches to sequentially reducing the received RSSI of the STAs, essentially reducing the effective radius of the cell in a series of steps dropping the STAs that have lowest RSSI first. Hence, as with the other methods described supra the STAs are dropped based upon their location relative to the AP they are associated with and the other APs. There is no consideration of what traffic an STA is handling alone nor the overall traffic distribution and loading of the AP, and RF signal quality between STA and AP. For example, many STAs at the periphery may be in power-save mode (not sending or receiving packets) or may be handling Data Class traffic at relatively low bitrate such that reduction of the AP power only removes these STAs without significantly reducing the overall loading of the AP and over-the-air utilization.

Now referring to FIG. 8 there is depicted a schematic 800 of managing mobility with a higher level controller according to the prior art of U.S. Pat. No. 7,826,426 entitled "Seamless Mobility in Wireless LANs" by V. Bharghavan (Bharghavan). Schematic 800 depicts a first AP 810 and a second AP 820 and a set of three wireless devices 830, 840, and 850 and a system coordinator 860. Each of the first and second APs 810 and 820 respectively maintains a data structure such as a data structure 870 that includes a set of entries, each entry for example including an AP identifier, a value for a state of the AP, a set of identifiers for wireless devices (here shown as BSSIDs), a value that identifies the AP currently actively communicating with each wireless device, and at least one value that indicates a received signal strength indicator (RSSI), i.e., a measure of received signal strength, for that communication. The system coordinator 860 handles sharing of information between AP's as needed to maintain the data structure 870 at each AP.

First AP 810 sends communications to the wireless devices, e.g. first wireless device 830 whilst the first and second APs 810 and 820 receive communications from the first wireless device 830. The system coordinator monitors each active wireless communication session and based on the characteristics of these the system coordinator 860 can determine which AP will be associated (or reassociated) with the wireless device for active communication. This is represented by the dashed lines in schematic 800 between the system coordinator 860, the first AP 810 and the second AP 820. With the teaching of Bharghavan the wireless device does not need to take any action and the handoff, sometimes called a "soft handoff" herein, generally occurs without the wireless device even being aware. Accordingly, no messages are exchanged between the wireless device and the AP's to carry out the soft handoff. The infrastructure of the system (i.e., system coordinator and AP's) preferably carries out the soft handoff entirely on its end.

Figure 9:
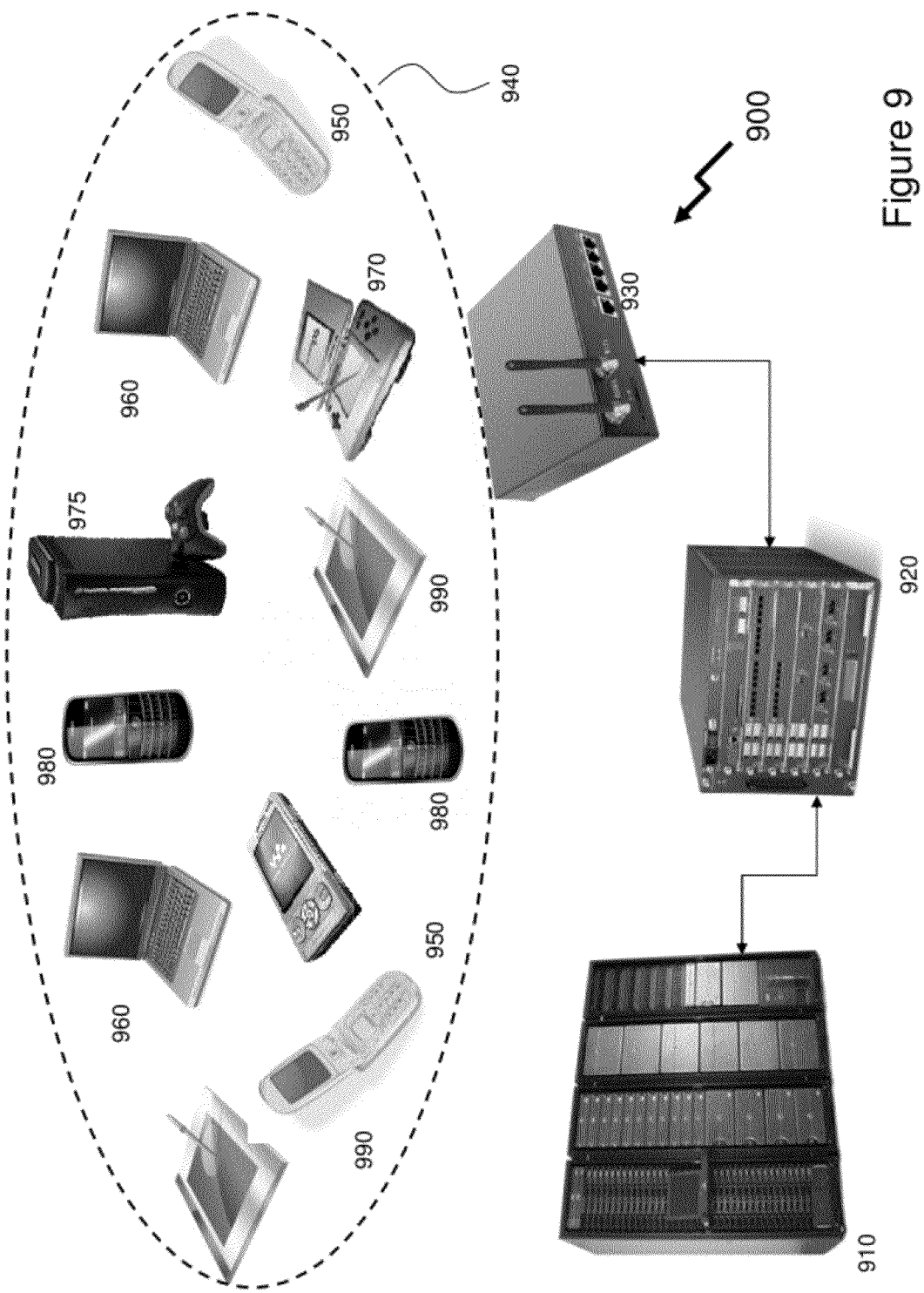
FIG. 9 depicts a representative WLAN architecture.

Referring to FIG. 9 there is depicted a representative WLAN architecture 900 wherein a remote central exchange 910 communicates with the remainder of the telecommunication service providers network which may include for example a long-haul OC-48/OC-192 backbone or an OC-48 wide area network (WAN). The central exchange 910 is connected to a router 920 that interfaces to the AP 930 that provides a Wi-Fi cell 940. Within the Wi-Fi cell 940 are a variety of STAs including Wi-Fi phones 950, laptops 960, gaming consoles 970 and 975, smartphones 980, and tablets 990. Accordingly these devices present a variety of upstream and downstream traffic requirements within the Real Time Class and Data Class traffic groups.

Now referring to FIG. 10 there is depicted an exemplary RF physical architecture of a representative device 1000. The device 1000 may, for example, implement an AP or a STA and includes a physical layer interface (PHY) 1001 that includes at least one antenna 1002 for the frequency or frequencies of service (approx. 2.4 GHz and/or approx. 5 GHz), a transmit/receive (T/R) switch 1004 for half-duplex operation, a transceiver 1005 that includes a radio frequency (RF) wireless receiver 1010, and an RF wireless transmitter 1011. The PHY also includes a modem 1007 that includes a demodulator 1012 and a modulator 1013. The receive path to the demodulator includes an analog-to-digital converter (ADC) 1027 to produce samples of the received signal. The device 1000 further includes a medium access controller (MAC processor, or simply MAC) 1014 for layer-2 processing of the data link layer (MAC). A computer system databus 1018 may be included in some STAs as may a processor 1015 with associated memory 1016 that may be directly coupled to the processor 1015 or to the MAC 1014 or to both. Within the memory 1016 are stored the data associated with APs and STAs according to the functionality of the device 1000, this data being stored within lookup table 1031.

Figure 11:
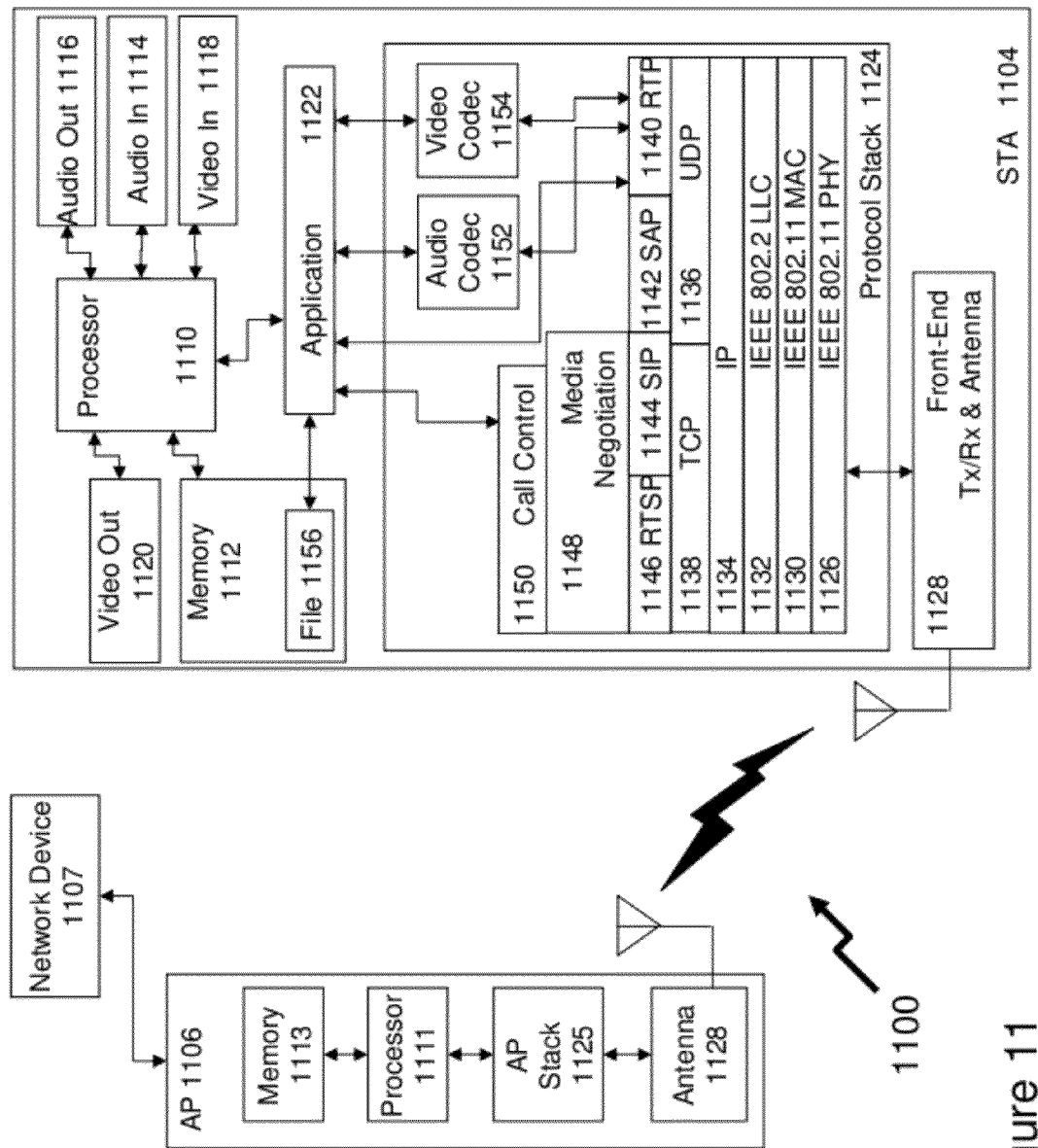
FIG. 11 depicts the protocol architecture of a representative STA.

Referring to FIG. 11 there is depicted the protocol architecture of a representative STA as part of a simplified functional diagram of a system 1100 that includes an STA 1104, an AP 1106, and one or more network devices 1107, such as communication servers, streaming media servers, and routers for example. Network devices 1107 may be coupled to AP 1106 via any combination of networks, wired, wireless and/or optical communication links. The STA 1104 includes one or more processors 1110 and a memory 1112 coupled to processor(s) 1110. AP 1106 includes one or more processors 1111 and a memory 1113 coupled to processor(s) 1111. A non-exhaustive list of examples for any of processors 1110 and 1111 includes a central processing unit (CPU), a digital signal processor (DSP), a reduced instruction set computer (RISC), a complex instruction set computer (CISC) and the like. Furthermore, any of processors 1110 and 1111 may be part of application specific integrated circuits (ASICs) or may be a part of application specific standard products (ASSPs). A non-exhaustive list of examples for memories 1112 and 1113 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like. Alternatively memories 1112 and 1113 may include optical devices (CD ROM, DVD) and magnetic devices, such as a HDD.

STA 1104 may include an audio input element 1114, for example a microphone, and an audio output element 1116, for example, a speaker, coupled to any of processors 1110. STA 1104 may include a video input element 1118, for example, a video camera, and a video output element 1120, for example an LCD display, coupled to any of processors 1110. STA 1104 includes one or more applications 1122 that are typically stored in memory 1112 and are executable by any combination of processors 1110. STA 1104 includes a protocol stack 1124 and AP 1106 includes a communication stack 1125. Within system 1100 protocol stack 1124 is shown as IEEE 802.11 protocol stack but alternatively may exploit other protocol stacks such as an Internet Engineering Task Force (IETF) multimedia protocol stack for example. Likewise AP stack 1125 exploits a protocol stack but is not expanded for clarity. Elements of protocol stack 1124 and AP stack 1125 may be implemented in any combination of software, firmware and/or hardware. Protocol stack 1124 includes an IEEE 802.11-compatible PHY module 1126 that is coupled to one or more Front-End Tx/Rx & Antenna 1128, an IEEE 802.11-compatible MAC module 1130 coupled to an IEEE 802.2-compatible LLC module 1132. Protocol stack 1124 includes a network layer IP module 1134, a transport layer User Datagram Protocol (UDP) module 1136 and a transport layer Transmission Control Protocol (TCP) module 1138.

Protocol stack 1124 also includes a session layer Real Time Transport Protocol (RTP) module 1140, a Session Announcement Protocol (SAP) module 1142, a Session Initiation Protocol (SIP) module 1144 and a Real Time Streaming Protocol (RTSP) module 1146. Protocol stack 1124 includes a presentation layer media negotiation module 1148, a call control module 1150, one or more audio codecs 1152 and one or more video codecs 1154. Applications 1122 may be able to create, maintain and/or terminate communication sessions with any of devices 1107 by way of AP 1106. Typically, applications 1122 may activate any of the SAP, SIP, RTSP, media negotiation and call control modules for that purpose. Typically, information may propagate from the SAP, SIP, RTSP, media negotiation and call control modules to PHY module 1126 through TCP module 1138, IP module 1134, LLC module 1132 and MAC module 1130.

It would be apparent to one skilled in the art that elements of the STA 1104 may also be implemented within the AP 1106 including but not limited to one or more elements of the protocol stack 1124, including for example an IEEE 802.11-compatible PHY module, an IEEE 802.11-compatible MAC module, and an IEEE 802.2-compatible LLC module 1132. The AP 1106 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module.

Over-the-Air Bandwidth Demand Overload:

As more STAs associate with an AP and set up sessions (voice, video or data), the demand from all the devices for access to the over-the-air bandwidth increases resulting in increased delay and loss. Furthermore, STAs with existing associations may start up new sessions with larger bandwidth demand. The result is that demand for over-the-air bandwidth increases beyond a utilization level where QoS can be met. This is due to excessive requests from stations and APs for access to the RF channel causing traffic to be queued in station and AP queues with corresponding delay. Excessive over-the-air bandwidth demand will also result in increased collisions and a further reduction in service quality and reduce throughput. The need to distribute this excess traffic over more lightly loaded APs forms a substantial part of the prior art solutions presented supra, as well as access control mechanisms that have not been presented but would be known to one of skill in the art. However, as evident from the discussions supra these prior art solutions address different capability and require functionality in both the AP and STA. These types of upgrades can be expensive and difficult to implement under most circumstances but are exacerbated in this instance as the STAs are consumer devices. A solution is needed that will operate with existing STAs resulting in lower cost and smoother upgrade to next generation traffic management features. In this manner SLAs can be offered based upon only upgrades to APs wherein, as will be evident from the embodiments described, these upgrades may in some instances be implemented as firmware/software upgrades.

Wireless Station Priority:

Since wireless STAs are distributed over a large area, they contend for the over-the-air bandwidth independently of each other. In general, some STAs, will be transmitting Real Time Class traffic, others Data Class traffic. The 802.11 protocol is designed to provide equal opportunity for all STAs to seize the RF channel. However, with classes-of-service, a STA transmitting Real Time traffic should receive priority in seizing the RF channel to improve delay, jitter and loss to these services to one transmitting Data traffic. The IEEE standard 802.11e provides a mechanism to achieve this prioritization; however, as discussed in the Background, many commercial, currently deployed consumer STAs do not support these features and widespread deployment of these features and their use may take many years. Accordingly, a network-based solution according to embodiments of the invention which interworks with IEEE 802.11e such that only APs need to be retrofitted/installed, and such retrofits/installations could begin being implemented quickly, complementing IEEE 802.11e functionality. Further, no STA upgrades are required beyond today's basic Wi-Fi functionality (IEEE 802.11) according to embodiments of the invention.

General End-User Requirements:

For end-users the goal is for all carried voice and video sessions to receive near toll quality performance when connected to a Wi-Fi wireless access network. Active Wi-Fi STAs sending and receiving Data Class traffic will receive good performance as required by the application.

General Solution Requirements:

The new functionality will be added to the network and not the STA as will be evident from discussion below of exemplary embodiments of the invention. This will ensure that todays and future smartphones, and other Wi-Fi enabled client devices (laptops, tablets, iPod, netbooks, etc.) will work with this feature set. The solution according to embodiments of the invention does not require new IEEE 802.11 features; i.e. IEEE 802.11e (i.e. RF Priority using Enhanced Distributed Channel Access and Traffic Specification (TSpec)), IEEE 802.11k (i.e. Measurements), IEEE 802.11v (i.e. BSS Transition Management) to be supported in the STA or AP. The solution has the following components: Virtual Station Priority; Session Admission Control; Load Distribution Control; and Adjacent Channel Interference Control.

"Virtual Over-the-Air Priority" solutions according to embodiments of the invention may coexist with the standards-based "Wireless Multimedia" solution (WMM is based on IEEE 802.11e priority). This means that the AP may properly support clients using the standards-based solution when supported in the wireless client STA.

Similarly the "Session Admission and Load Distribution Control" solution may coexist with a standards-based "Admission Control" solution using IEEE 802.11e Tspec. It may also coexist with "Load Balance" solutions using IEEE 802.11v BSS Transition Management. This means that the AP can properly support STAs using the standards-based solution when supported in the STA; otherwise, the AP will apply a solution according to an embodiment of the invention. The AP, typically, will determine which solution based upon capability negotiations during STA association with the AP.

It will be evident to one of skill in the art that the solutions taught within this specification according to embodiments of the invention may operate with STAs using IEEE 802.11a,b, g,n standards. Further, the solutions may operate with STAs using a plurality of BSS also know as ESS. Further, these features will operate independently on each Virtual BSS (RF channel partitioned into multiple BSS) and may be configured separately.

Virtual Station Priority Overview:

This element of the solution addresses the wireless station priority issue. A network administrator may assign a maximum level of over-the-air bandwidth that will be used by each traffic class. This manages the demand for the over-the-air bandwidth and hence, manages the queue delay at a STA and AP. Real Time Class traffic bandwidth is managed by forcing STAs to move to another AP when over-the-air bandwidth usage thresholds are reached. Data Class traffic bandwidth is managed by using rate control in both directions upstream and downstream so that over-the-air bandwidth is not saturated. Real Time traffic needs to receive "priority" access to this over-the-air bandwidth over Data traffic in order to minimize delay. This is accomplished by controlling the total amount of over-the-air bandwidth used (over-the-air utilization) to assure good QoS, and by allowing Real Time traffic to use all the bandwidth it requires up to a threshold but only allowing the Data Class to use what is left over (i.e. difference between maximum assigned bandwidth and bandwidth used by Real Time Class.

Session Admission and Load Distribution Overview:

This part of the solution addresses the over-the-air bandwidth overload issue described supra. Real Time Class traffic sessions are not explicitly denied on session initialization i.e. a handset associated to an AP starting a voice call will be allowed to proceed. However, when the assigned over-the-air bandwidth for Real Time traffic is exceeded, selected session(s) will be handed-off to a near-by AP that has more capacity to carry the traffic. On reaching or approaching the maximum over-the-air bandwidth usage for Real Time traffic and Data traffic (total utilization for both traffic classes) in the Wi-Fi access network, new associations may be denied. Some STAs may be disassociated on severe overload. Accordingly, the network administrator can configure the Wi-Fi system for:
- usable over-the-air bandwidth for Real Time traffic;
- usable over-the-air bandwidth for Real Time and Data traffic (sum total);
- packet fields which define packets as belonging to the Real Time Class;
- over-the-air usage threshold(s) where a new STA association to the specific AP is discouraged;
- over-the-air utilization threshold(s) where associated STAs with active Real Time sessions are encouraged to move to another AP and
- over-the-air utilization threshold(s) where associated STAs are going to be disassociated.

Adjacent Channel Interference Mitigation Overview:

Adjacent channel interference occurs when two wireless STAs are in proximity to each other, each STA is using a different RF channel and each STA has active (transmitting and receiving packets) sessions. Due to one or more reasons, including but not limited to mobility, load balancing, etc, these STAs are connected to different APs or different RF channels on the same AP. When one STA is transmitting and the other is receiving, their close proximity may result in sideband noise being injected by the transmitting STA to the receiving STA thereby reducing the bandwidth (possibly to zero). Adjacent channel interference mitigation according to embodiments of the invention associates both devices with the same AP and channel.

Virtual Station Priority Detailed Description:

As discussed supra a solution is required to ensure that STAs sending or receiving Real Time Class traffic are given priority on the RF channel over Data Class traffic. This means that STAs sending Real Time traffic will have lower delay, loss and jitter, and if configured correctly, the STAs should be able to meet more stringent quality-of-service (QoS) requirements compared to the Data Class traffic.

There is a standards-based solution for traffic prioritization under IEEE 802.11e that requires functionality in both the AP and STA. However, it has only been adopted and implemented in some APs and higher-priced Wi-Fi STAs. It is not expected to be fully adopted by widely used end-user (consumer) devices such as smartphones, laptops, netbooks and tablets for several years. Accordingly, most applications running on such mobile devices will continue to run without using this QoS feature for some years. This means that QoS capable STAs and non-QoS STAs will continue to coexist for a long time.

Therefore the inventors have established a network solution, i.e. functionality is implemented only in the AP, and does not require the IEEE 802.11e or WMM QoS feature. Accordingly, embodiments of the invention work with today's basic Wi-Fi STAs in which applications do not signal their QoS requirements to the network layer. Beneficially, as IEEE 802.11e compliant STAs are deployed in networks alongside legacy STAs both classes of STA can co-exist and interoperate in the same AP.

The basic priority solution within WMM, based upon IEEE 802.11e, operates with four classes of traffic, called Access Categories (AC). These are "Voice", "Video", "Best Effort" and "Background" in order of highest to lowest priority. Applications running on STAs signal to the network layer requesting a specific priority service. The STA sending higher priority packets uses a shorter wait time (i.e. inter frame spacing) before attempting to seize the RF channel. Therefore, applications with higher priority traffic wait less time before attempting to seize the channel than applications sending low priority traffic. All STA packets either go to or come from the AP (i.e. infrastructure configuration). The traffic direction from the STA to the AP is called upstream and traffic direction from the AP to the STA is called downstream. The Real Time Class (pertaining to this invention) is intended to include voice and video traffic. This type of traffic usually uses the User Datagram Protocol (UDP) transport protocol and requires a higher quality-of-service. The Data Class includes all remaining traffic types (i.e. Internet, Data Downloading), with Transmission Control Protocol (TCP) being the dominant transport protocol.

Traffic Management Procedures:

The purpose of assigning priority to the Real Time traffic type is to ensure better QoS for Real Time traffic (voice/video) over traffic in the Data Class. At present, SLAs for traffic over-the-air interface in Wi-Fi wireless systems do not exist. This section describes the traffic management procedures used to achieve virtual priority according to embodiments of the invention. The IEEE 802.11 Distributed Control Function, without IEEE 802.11e, allows each STA to have access to the over-the-air bandwidth with approximately equal likelihood. In general, as the over-the-air bandwidth utilization increases so do the delays, loss and jitter for STAs attempting to send packets. This is due to the fact that as the over-the-air channel becomes busier, STAs need to wait longer to get access to the over-the-air channel leading to longer queuing delays and possible queue overflows (i.e. loss).

Figures 12, 13:
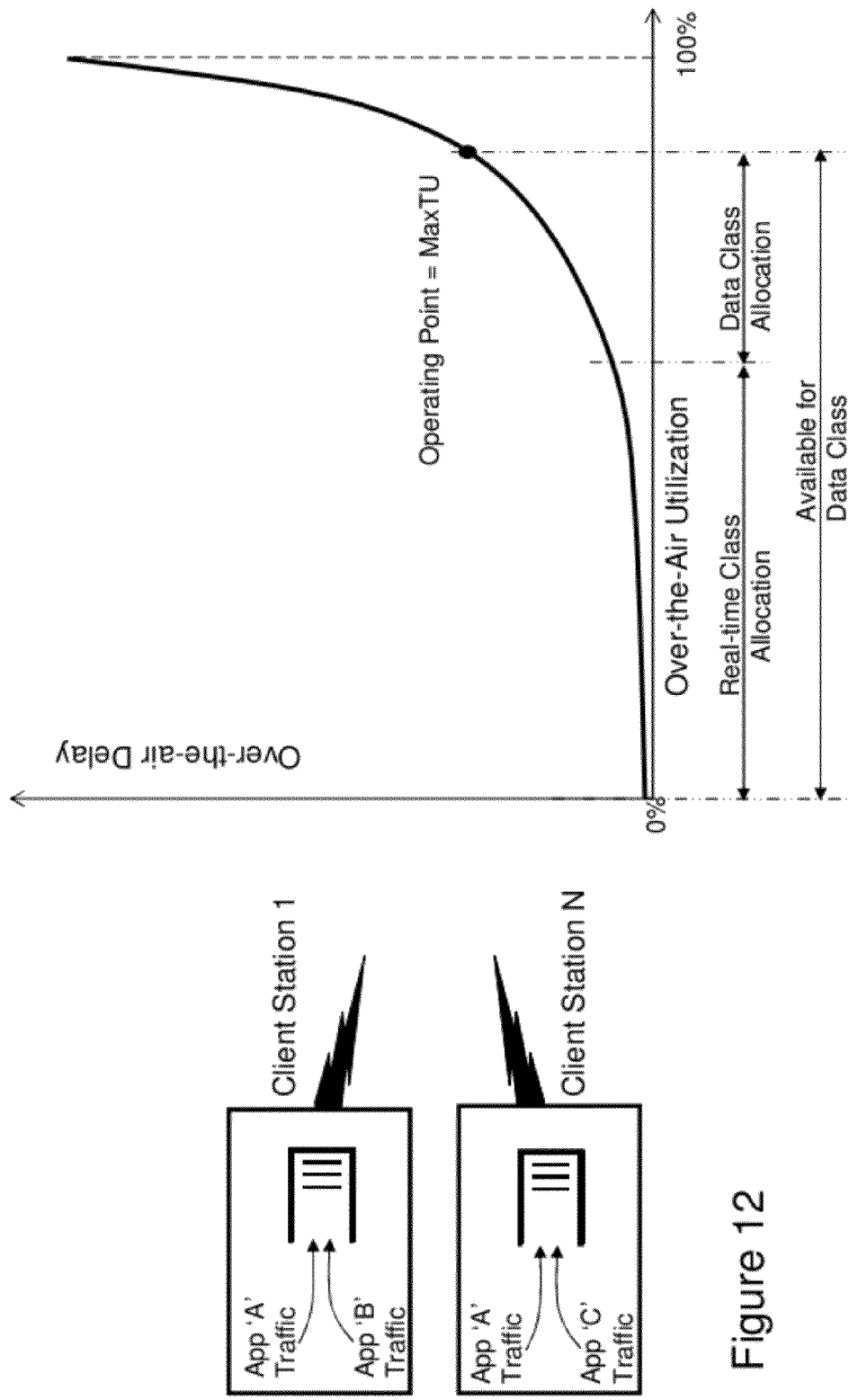
FIG. 12 depicts schematically client stations operating over-the-air that do not support IEEE 802.11e or WMM features.
FIG. 13 depicts a graph depicting how over-the-air delay varies with over-the-air utilization.

Consider, for example, the scenario shown by FIG. 12 that shows representative STAs (with internal queues) communicating via the over-the-air channel. Application traffic includes such traffic sources as Voice-over-IP (VoIP), Video or Hypertext Transfer Protocol (HTTP) packets. As the over-the-air channel load increases through increased service demands from already associated STAs and/or through the number of associated STAs increasing, the over-the-air bandwidth utilization increases. Therefore each STA needs to wait a longer period of time before they get an opportunity to transmit their data. This delay increase, as shown by the representative graph in FIG. 12, shows how the over-the-air delay varies with over-the-air utilization (i.e. load). Also shown are representative allocations/partitions of Real Time and Data Class allocations and the maximum Data Class allocation accessible with no Real Time Class traffic.

In order to maintain good QoS it is desirable to ensure that the total traffic load remains below a threshold MaxTU for over-the-air utilization as show in the graph in FIG. 13, this threshold being chosen at a point which provides an acceptable delay. Selecting the threshold 'MaxTU' also determines how much over-the-air bandwidth will be available for Real Time and Data Class traffic, plus an emergency overhead between "MaxTU" and 100% utilization. Real Time Class traffic is guaranteed its allocation whilst the Data Class traffic is allowed to use the remaining bandwidth. In order to keep overall traffic levels within the threshold, a methodology is required for managing Real Time Class traffic which is dominated by UDP packets but a different method is required for managing Data Class traffic which is dominated by TCP packets.

Figure 14:
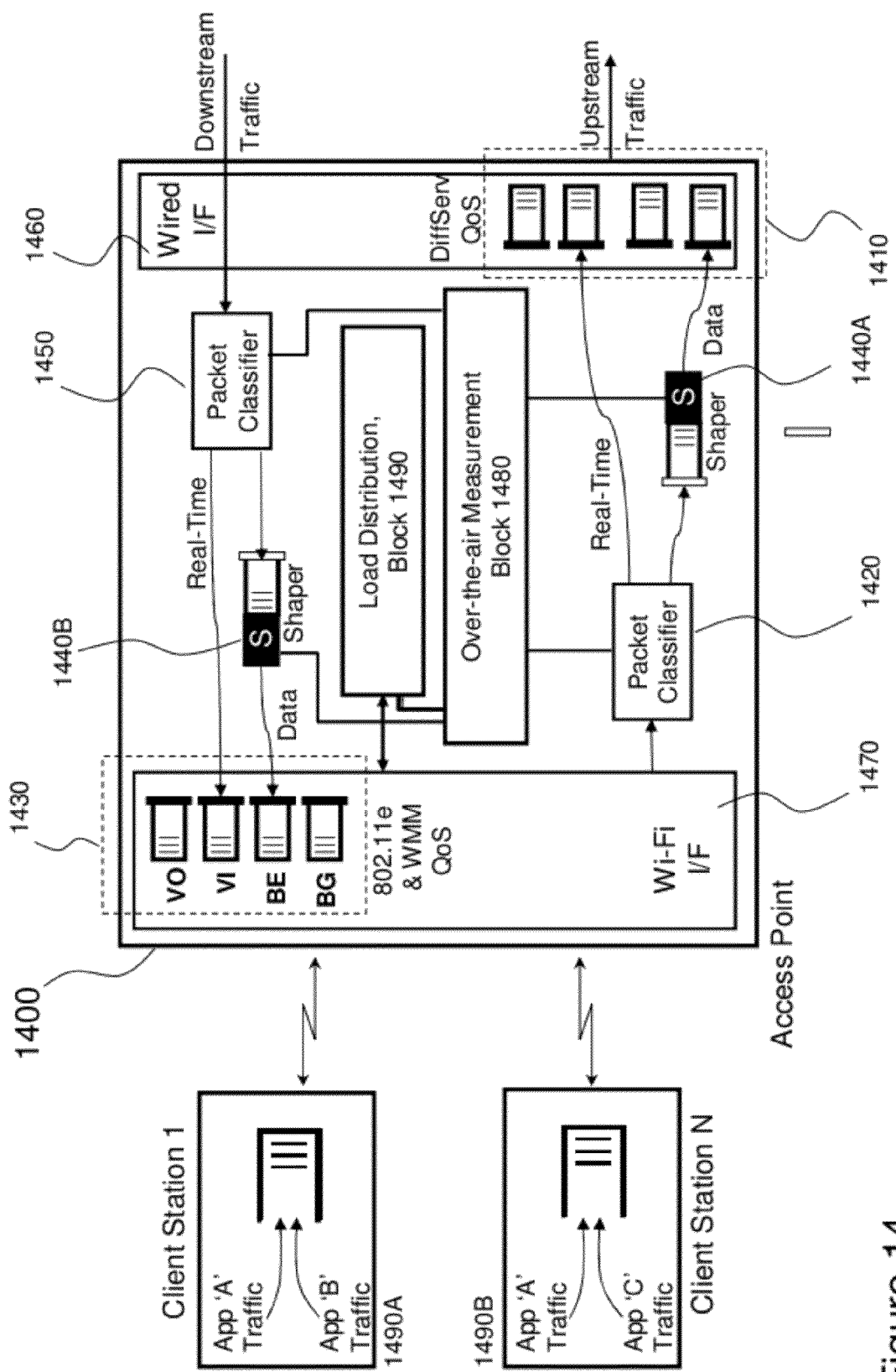
FIG. 14 depicts an AP for managing upstream/downstream according to an embodiment of the invention.

Referring to FIG. 14 there is depicted an AP 1400 for managing traffic according to an embodiment of the invention. Traffic sent from an STA, such as first STA 1490A or second STA 1490B is received at the AP 1400 by the Wi-Fi interface (Wi-Fi I/F) 1470. In order to manage each Traffic Class separately, the packets must be classified as belonging to the Real Time Class or Data Class. The packet classifier 1420 decides to which class the incoming packet belongs, for example based on packet header fields and other information. After a packet is classified and metered (bytes and packets counted) it sends byte count information about the packet to the Over-the-air Measurement block 1480 to allow it to calculate its over-the-air transmission time. The over-the-air transmission time is used to calculate the over-the-air utilization for the Real Time Class and the Total (Real Time and Data Class) over-the-air utilization for all STAs accessing the AP. The Over-the-air Measurement block 1480 obtains the PHY rate, also needed to calculate the utilization, from the Wi-Fi I/F block 1470. A detailed explanation of the Over-the-air Measurement Block 1480 and the utilization calculations are presented subsequently. The methods for managing bandwidth for each of the traffic Classes are outlined as follows:

Real Time Class Traffic Bandwidth Management:

Bandwidth for the Real Time Class is managed by the Load Distribution Control Block 1490. The Load Distribution Control Block 1490 receives an over-the-air utilization update from the Over-the-air Measurement Block 1480 every measurement interval. The Load Distribution Block 1490 compares this value to a set of thresholds. If any of these thresholds have been crossed, the Load Distribution Control Block 1490 takes specific actions, to manage the RF channel load such as moving active STA(s) to other APs. The details of the Load Distribution Control Block 1490 are described subsequently.

For Upstream Traffic Only:

Packets which are classified as belonging to the Real Time Class may be en-queued directly on the egress queues 1410 of the wired interface 1460, for example Ethernet. The queue structure may follow the QoS of Ethernet IEEE 802.1p (i.e. priority queues) or of IP DiffServ as defined by IETF. The specific egress queue 1410 into which the Real Time packet is en-queued is configurable. Typically, the packet will be en-queued into same queue that services video packets and if there are no video packets then it is en-queued into the same queue that services the voice packets.

For Downstream Traffic Only:

Packets which are classified as belonging to the Real Time Class may be en-queued directly on the egress queues, shown as downstream egress queues 1430 of the Wi-Fi interface 1470 of AP 1400. The queue structure may follow the priority of IEEE 802.11e and WMM Access Categories. The mechanism as discussed supra comprises four queues which map to the Access Categories (AC): Voice, Video, Best Effort and Background, serviced with priority, with Voice AC being the highest priority. The specific queue into which the Real Time packet is en-queued is configurable, but is typically en-queued into the Video AC.

Data Class Traffic Bandwidth Management:

The Data Class traffic is dominated by packets using the TCP transport protocol. TCP traffic is greedy, which means that it tries to use as much bandwidth as is available by opening its transmission window; however, it also has an integral congestion control mechanism. This means that if a client terminal with a TCP flow detects network congestion, it acts to reduce the bandwidth transmitted from the terminal. A TCP session assumes network congestion is occurring when a packet timeout occurs (i.e. packet loss) or a duplicate ACK is received. At this point TCP closes a congestion window based on an algorithm which reduces the number of packets that can be transmitted before receiving an ACK, effectively reducing the packet rate and bandwidth used.

To manage Data Class traffic, the TCP congestion control can be used as follows. The Data Class traffic rate is controlled to match the "available over-the-air bandwidth" by using the traffic shapers 1440A and 1440B that are inserted in the data paths between the packet classifiers 1420 and 1450 and egress queues 1410 and 1430 in the upstream and downstream directions respectively in FIG. 14. The Over-the-Air Measurement Block 1480 computes the utilization used by Real Time Class traffic (upstream plus downstream) and compares it to the Configured Operating Point, or MaxTU. The difference between them is the over-the-air utilization that is available for upstream and downstream Data Class traffic.

Data Class over-the-air available utilization is partitioned based on configurable minimum ratios for downstream and upstream (e.g. 60% downstream and 40% upstream). For example, assume that MaxTU is set at 90% of the AP over-the-air utilization and that Real Time Class traffic is currently using 50%. Accordingly, the upstream Data Class traffic utilization will be shaped to about 16%, being [90%-50%] *40%. This over-the-air utilization allocation information is sent by the Over-the-air Measurement Block 1480 to the upstream traffic shaper 1440A. Updates are sent to the traffic shaper 1440A when the allocation changes. As the traffic shaper 1440A throttles back Data Class traffic, packets are delayed or dropped and the TCP congestion control mechanism is activated to ensure the STAs throttle back to the available bandwidth.

The traffic shaper uses its utilization allocation to manage the packet flow as follows. Utilization is calculated over a configurable Measurement Period. Since utilization is defined by;

$$UtilizationAllocation = \frac{\left( \sum_{t=0}^{t=t_{meas}} PacketTransmissionTimes \right)}{MeasurementPeriod}, \quad (1)$$

where tmeas is the measurement period, the traffic shaper can determine the allowed sum of packet transmission times over the measurement period. For example, if the Utilization Allocation is 16% and the Measurement Period is 100 ms, then the allowed over-the-air sum of packet transmission times cannot exceed 16 ms per Measurement Period.

When the traffic shaper sends the first packet, it calculates and saves the equivalent over-the-air transmission time. When the second packet is sent it adds the transmission time to that of the first packet to create a sum. The traffic shaper continues sending packets until the sum of the equivalent over-the-air transmission times reaches the allocation. It stops sending packets until the end of the measurement period. At this point, the Packet Transmission time sum is reset to zero and the above process repeats. The equivalent packet transmission time is the time needed to transmit a packet over-the-air with the current PHY rate for the STA and it can be determined in several ways. For upstream frames, this information can be saved with the packet when the packet is received on the wireless interface. Otherwise, packet transmission times can be recalculated using the packet size and current PHY rate for the wireless client using Equation (2) below.

The traffic shaper queue is serviced by a data rate limiting mechanism that forwards traffic based on what over-the-air utilization is left over from the Real Time Class. The Data Class is also configured with Active Queue Management (AQM) using algorithms such as Random Early Discard (RED) for example, others being known in the prior art. AQM techniques such as RED ensure a smooth traffic flow when packets need to be dropped.

For Upstream Traffic Only:

Data Class packets forwarded by the traffic shaper 1440A may be en-queued directly on the egress queues 1410 of the wired interface 1460 (usually an Ethernet interface). The queue structure may follow the QoS of Ethernet IEEE 802.1p defined by IEEE or of IP DiffServ as defined by IETF and the specific queue into which the Real Time packet is en-queued is configurable. Typically, the packet will be en-queued into same queue that services best-effort packets.

For Downstream Traffic Only:

Data Class packets forwarded by the traffic shaper may be en-queued directly on the downstream egress queues 1430 of the Wi-Fi interface 1470 of AP 1400 in FIG. 14. The queue structure may follow the QoS of 802.11e or it may optionally be different for legacy devices. Accordingly, downstream packets can be classified using filter polices, and if the AP supports IEEE 802.11e then use that QoS mechanism for traffic forwarding. Otherwise, in legacy systems, all traffic will have the same priority but by applying a traffic shaper to data traffic, thereby delayed and rate controlling it so Real Time traffic gets priority access to over-the-air bandwidth. The mechanism includes downstream egress queues 1430 which may map to the Access Categories: Voice (VO), Video (VI), Best Effort (BE) and Background (BG). They are usually serviced with a priority scheduler, with the Voice AC being the highest priority. The specific queue into which the Data Class packets are en-queued is configurable and typically Data Class packets are en-queued into the queues servicing Best Effort or Background traffic.

Figure 15:
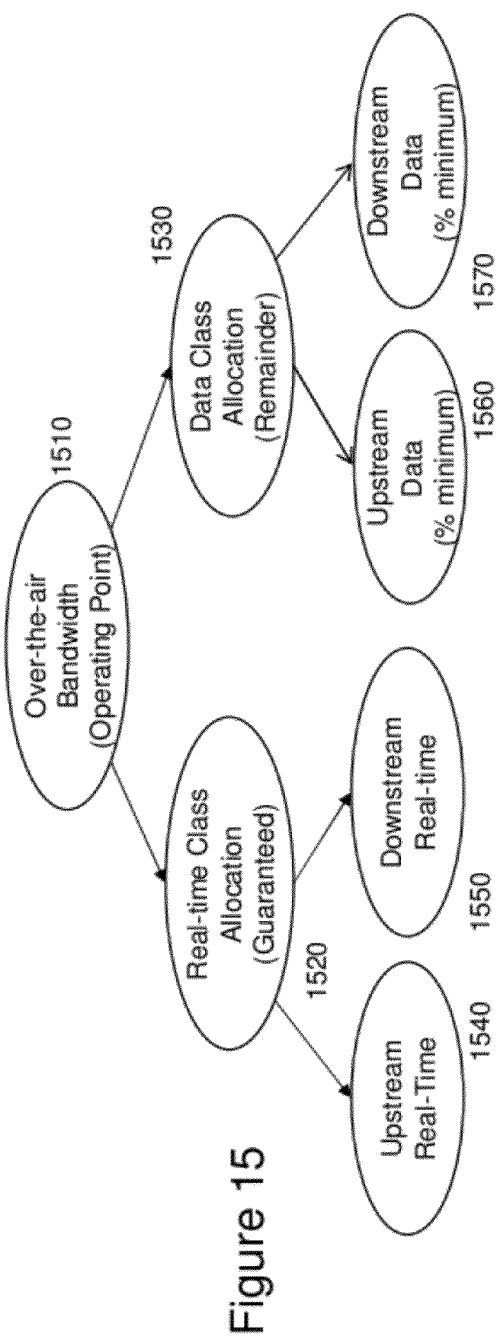
FIG. 15 depicts an allocation between classes according to an embodiment of the invention.

Bandwidth Allocation and Configuration:

Referring to FIG. 15 there is depicted a bandwidth allocation between classes according to an embodiment of the invention and therefore how the available bandwidth is allocated for each Traffic Class as well as for upstream and downstream traffic flows. The Over-the-air Bandwidth 1510 represents the configured Operating Point (MaxTA) for the RF channel as shown in the delay curve of FIG. 12. This available bandwidth is partitioned and allocated to the Real Time Class 1520 and Data Class 1530. The allocation of available over-the-air bandwidth to each traffic class is further partitioned to upstream and downstream flows, being upstream 1540 and downstream 1550 for Real Time Class 1520 and upstream 1560 and downstream 1570 for Data Class 1530. The Real Time Class allocation is managed as a single block of bandwidth. That is the Real Time Class traffic flows are measured for both the upstream 1540 and downstream 1550 and combined into a single over-the-air utilization value. It is this combined value that is compared to the configured guaranteed value. When the over-the-air utilization of the combined upstream and downstream Real Time flows exceeds the guaranteed value, load distribution action is initiated and accordingly there is no need to manage traffic imbalances between upstream and downstream flows. In fact several thresholds may be used for efficient load distribution which is described in detail below Since the Real Time Class gets priority service, the Data Class bandwidth allocation is what is left after the Real Time Class uses its allocation. For example, if the Over-the-air operating point (MaxTU) is set to 90% utilization and the Real Time Class is using 50% (upstream plus downstream), then the Data Class will be allocated the difference, which is 40%. Furthermore, because of the greedy nature of TCP flows, Data Class traffic will try to use all the bandwidth that is available, so we need to separately assign a minimum percentage for over-the-air utilization to the upstream Data Class 1560 and downstream Data Class 1570 flows. Bandwidth that is allocated to that Data Class is configured to provide minimum bandwidth assurance as a percentage of the remaining over-the-air bandwidth for downstream and upstream. The allocations do not need to be equal and in many practical applications, the downstream minimum percentage may have a higher allocation to account for downloading from databases or web sites. However a minimum allocation of bandwidth is required to assure that some packets can be sent upstream and downstream (starvation avoidance). The allocations of upstream Data Class 1560 and downstream Data Class 1570 may be dynamically adjusted according to a range of predetermined thresholds or based upon the determinations of the data in the upstream and downstream directions classified by the upstream and downstream packet classifiers 1420 and 1450 respectively within the AP 1400 of FIG. 14.

Interworking with IEEE 802.11e Priority:

The IEEE 802.11e priority mechanism as outlined above defines four traffic classes called Access Categories (AC), "Voice", "Video", "Best Effort" and "Background" in order of priority. Stated very simply, a STA or AP with a packet in its Voice queue has higher probability to be transmitted than a packet in one of the other queues. Higher priority is achieved by a STA using both a shorter inter-frame spacing and a shorter contention window, which combine to result in a shorter time to attempt to seize the RF channel. Frames are en-queued into a queue corresponding to its Access Category. The four queue IEEE 802.11e structure is used for the over-the-air interface in downstream direction, as shown downstream egress queues 1430 in FIG. 14. Within embodiments of the invention as presented by the inventors the Real Time Class would typically be mapped to the Video Access Category and the Data Class to the Best Effort Access Category.

Traffic Shaper Description:

A traffic shaper, such as upstream and downstream traffic shapers 1480 and 1440 respectively in AP 1400 are inserted in the upstream and downstream path of Data Class packets, as separated by the upstream and downstream Packet Classifiers 1480 and 1450 respectively, to rate limit them so that the overall over-the-air utilization does not exceed the Configured Average Operating Point (MaxTU). These traffic shapers can be configured to provide minimum bandwidth assurance for the upstream and downstream directions through control signaling received from the Over-the-air measurement block 1480. So, for example, if the Configured Average Operating Point was 90% for over-the-air utilization with Real Time Class traffic consuming 30% then the Data Class would get the difference or 60% of over-the-air resource to transmit packets. Further, the upstream and downstream shapers can be configured with different weights so that upstream and downstream data throughput is different e.g. 60% downstream and 40% upstream.

Over-the-Air Measurement Block Description:

The Over-the-air Measurement Block 1480 receives inputs from the upstream and downstream Packet Classifiers 1420 and 1450 respectively and uses this information to calculate the over-the-air utilizations. It uses this information together with the predetermined configured thresholds (for example LD1, LD2, MaxTU, Upstream/Downstream ratio) to calculate the Data Class utilization allocations which are sent to the upstream and downstream Traffic Shapers, LD1 and LD2 being two load distribution thresholds. The Over-the-air Measurement Block 1480 also sends the Utilization calculations to the Load Distribution Block 1490. The calculations are made using the following process.

A: Over-the-Air Utilization Measurement:

When a packet arrives from either the Wi-Fi interface 1470 or the wired interface 1460, the over-the-air utilization must be calculated and is based on Packet Transmission Time used by all upstream packets and all downstream packets. The Packet transmission time is the duration in which the RF channel is seized by a STA or AP transmitting a packet. In general, this information includes the Packet Size in bytes including the Ethernet and IP layer headers and the PHY rate used to receive the upstream packet or the current PHY rate for downstream packets. A formula for calculating the over-the-air time packet transmission time is given by Equation (2)

$$\text{PacketTransmissionTime} = (\text{PacketSize}/PHY\text{ rate}) + \text{Overhead} \quad (2)$$

where Overhead for example typically includes the sum of PHY Preamble, ACK packet time and the inter-frame spacing between the Data transmission and the ACK packet transmission time, as defined by the IEEE 802.11 standard(s). Other equations may also be used to calculate Packet Transmission Time and in some Wi-Fi implementations, the Packet Transmission time is available from the Wi-Fi chip set.

The "Packet Transmission Time" is used to calculate the "Over-the-air Utilization" using Equation (3)

$$UtilizationSample = \frac{\sum PacketTransmissionTime}{MeasurementPeriod} \quad (3)$$

where Packet Transmission Times are summed over a Measurement Period. The Utilization Samples are input into an exponential moving average filter to create damping using Equation (4)

$$\text{Utilization}(n) = A^*\text{UtilizationSample} + (1-A)^*\text{Utilization}(n-1) \quad (4)$$

where A is the averaging constant between 0 and 1, n is the sample number and utilization measurements are between 0% and 99% (0.0 and 0.99). Measurements are made over a measurement interval which is configurable and typical values will range from 100 ms to 2 seconds.

Equation (4) is used to keep an ongoing running Utilization of the Real Time Class traffic which is called "Real Time Class Utilization" and the Real Time Class traffic plus Data Class traffic which is called "Total Utilization. Accordingly, Real Time Utilization only includes Packet Transmission Times for packets determined by the Classifier as belonging to the Real Time Class whereas Total Utilization includes all packets.

B: Utilization Allocation Calculation:

The Utilization Allocations assigned to the Traffic Shapers are determined as follows. First calculate the over-the-air utilization available for the Data Class using the Equation (5)

$$\text{DataClassUtilizationAllocation} = \text{Max}TU - \text{RealTime Utilization} \quad (5)$$

where MaxTU is a configurable parameter. If the result is negative then set Data Class Utilization to zero. The allocations are set using the following Equations (6) and (7)

$$\text{UpstreamDataClassUtiliz} = \text{DataClassUtilization}^*\text{UpstreamRatio} \quad (6)$$

$$\text{DownstreamDataClassUtiliz} = \text{DataClassUtilization}^* (1-\text{UpstreamRatio}) \quad (7)$$

This information is sent to the Traffic Shapers and is updated by the Measurement Block every Measurement Period. The Measurement Block also sends to the Load Distribution Block the Real Time Class Utilization and the Total Utilization results (or alternatively the over-the-air utilizations for each traffic class), which are similarly updated every Measurement Period. This information will be used by the Load Distribution Block 1490 as discussed below.

Session Admission and Load Distribution Control Detailed Description:

As discussed supra there are times when an AP needs to encourage a STA to roam to another AP in order to maximize the wireless system carried load. The Load Distribution Block 1490 uses over-the-air utilization measurements it receives from the Over-the-air Measurement Block 1480 to determine when to shift associations for a STA to another AP and to manage the actual roaming of the STA. The IEEE standards group is in the process of defining a protocol under 802.11v called BSS Transition Management whereby the AP can request that the STA roam to another AP. It uses a messaging protocol whereby an AP can initiate a request to a STA to roam to another AP. However, this is only a part of a comprehensive load balance solution.

It is expected to take several years before this feature is introduced into high volume consumer STAs, such as smartphones, PDAs, gaming consoles etc and all APs. Accordingly, the inventors have developed a Load Distribution Control solution whereby the AP, using currently available functionality, can influence the STA to roam to another AP. The solution will also work with the BSS Transition Management feature when it becomes available. Fundamentally, Session Admission and Load Distribution Control (Simplified to "Load Distribution") operates as follows. When the Real Time Class over-the-air utilization exceeds a threshold, an attempt is made to redistribute the traffic. In fact, several thresholds of increasing over-the-air utilization can be defined and different redistribution actions taken with each being exceeded, which are increasingly more aggressive with higher thresholds because it is approaching the limit. The thresholds are defined to begin an early distribution of load so that the Load Distribution Block begins to distribute load before the RF channel is fully utilized (i.e. before MaxTU is reached). This can result in a significant improvement in total wireless access network traffic throughput.

Figure 16:
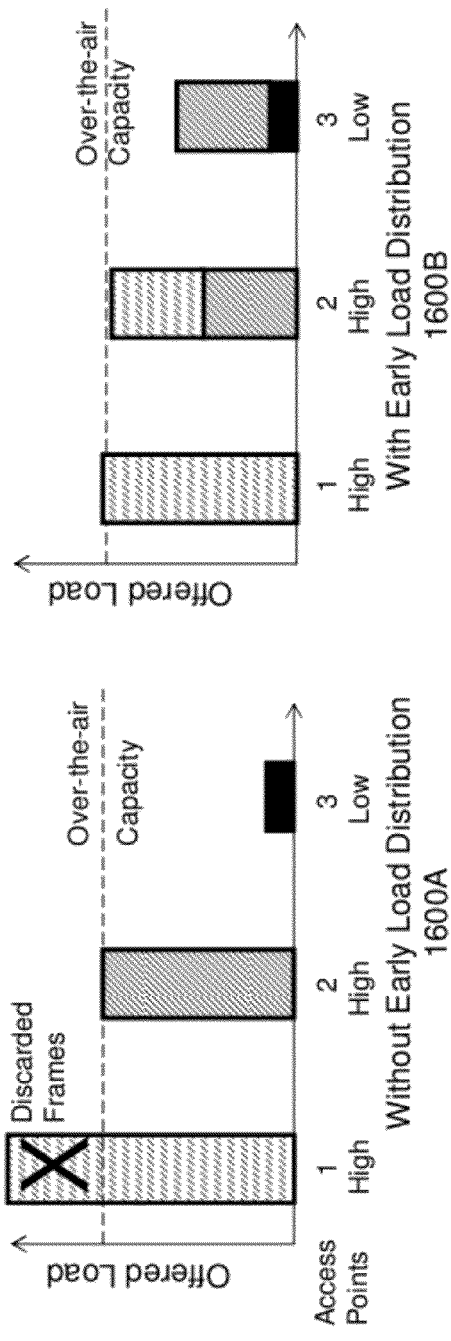
FIG. 16 depicts the benefit of early load distribution as provided by embodiments of the invention.

Referring to FIG. 16 there is depicted an example of the benefit of preemptive load distribution as provided by embodiments of the invention. Consider initially first graph 1600A whereby, unless AP 2 shifts some load to AP 3 before reaching channel capacity, then AP 1 cannot shift any of its load to AP 2 resulting in lost traffic (that portion above the capacity line). Load distribution, shown in second graph 1600B, demonstrates the resulting domino effect and increase in overall system capacity when AP 1 shift its load before reaching its capacity limit. STAs at AP 1 may not reach AP 3 or do so with very low signal strength. This domino effect may involve more than 3 APs over larger distances or within high-density environments.

Figure 17:
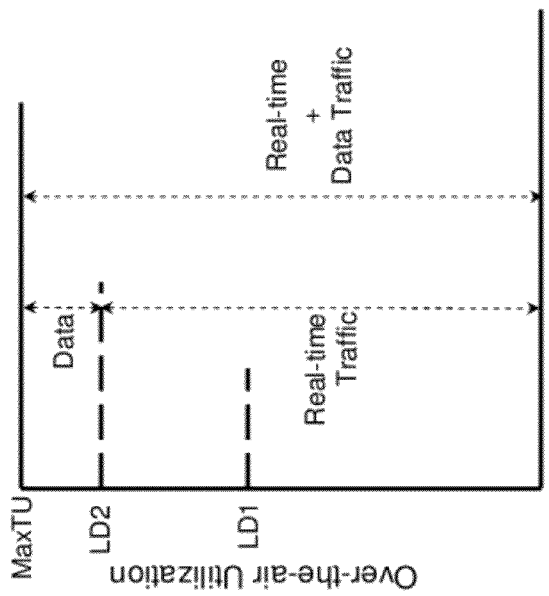
FIG. 17 depicts multiple thresholding for triggering actions by an AP to improve over-the-air capacity and reduce discarded frames for QoS performance according to an embodiment of the invention.

Now referring to FIG. 17 there is depicted multiple thresholds for triggering actions by an AP to improve over-the-air capacity and reduce discarded frames according to an embodiment of the invention. Threshold LD1 defines the point at which early load distribution is invoked. Threshold LD2 defines the maximum, guaranteed level of Real Time Class traffic. The threshold MaxTU is the maximum total traffic permitted in order to achieve good QoS for all STAs. Accordingly LD1<LD2<MaxTU and the difference between MaxTU and LD2, MaxTU−LD2, is the assured utilization allocated to Data Class traffic. As outlined supra the Load Distribution Block within an AP is responsible for making the decision as to which threshold has been crossed and to execute the resulting required procedures. The Load Distribution Block is informed of the Real Time Class over-the-air utilization measurements by the Over-the-air Measurement Block in order to make its decisions. The following are exemplary specific actions taken at each threshold:

Threshold 1: LD1 Procedures:

Threshold level LD1 is chosen to initiate early load distribution whereby actions are taken after crossing LD1 to encourage new associations to go to other APs that may have more available over-the-air bandwidth. This is accomplished by reducing the channel beacon power by a configurable amount. This action will mean that APs with more available over-the-air channel utilization will be favoured by STAs, whereby the STAs exploit both RSSI values and other information for the other APs, for example including but not limited to utilization and number of associated STAs, rather than just RSSI data. It will also mean that more distant STAs may no longer associate with this AP, but rather will associate with APs that have a stronger beacon signal resulting in more efficient channel utilization. This will have no effect on STAs already associated or have sessions in progress because the transmit power for data transmission is not reduced.

Figure 18:
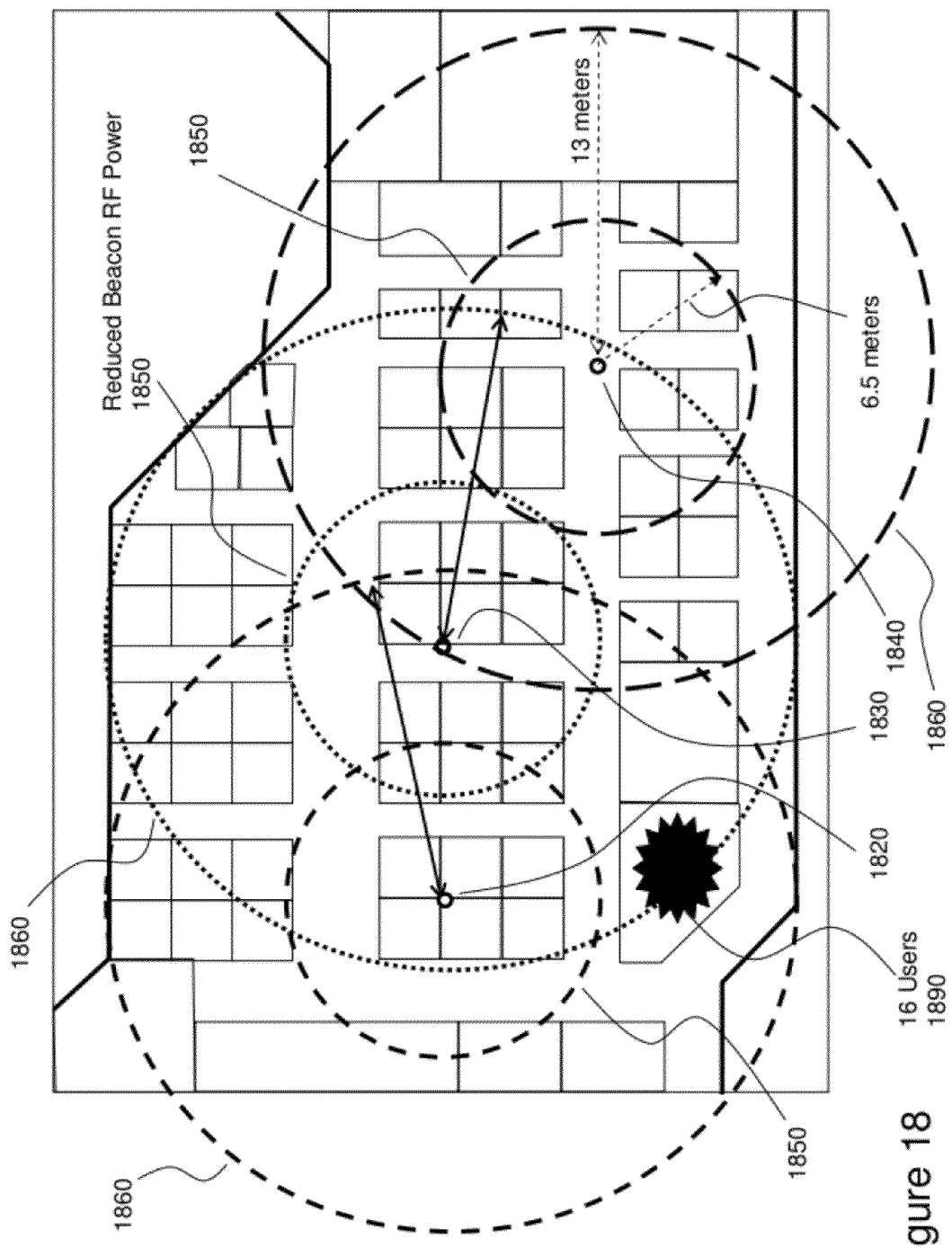
FIG. 18 depicts a scenario for managing AP loading according to an embodiment of the invention.

Referring to FIG. 18 there is depicted a scenario for managing AP loading according to an embodiment of the invention. A portion of a building is shown comprising for example offices and meeting rooms within one of which meeting 1890 there is a meeting with 16 users associated with it. Deployed within the building are first to third APs 1820, 1830 and 1840 respectively which under normal operation have radii (simply presented assuming uniform properties of the media within the building) 1860 of radius 13 meters. If the beacon power in each is reduced by 6 dB, then the effective range is reduced to one half of the original, resulting in reduced radii 1850 from each AP. This results in a coverage area reduction to 25% of the original.

Clearly if all STAs undertake the same reduction then RF channel coverage area and overlap from neighbour APs will need to be large enough to pick up STAs. However, if only the first AP 1820 reduces its beacon power then users in meeting 1890 will now receive the beacon from second AP 1830 at a higher level such that some or all STAs would associate with the second AP 1890. Optionally, multiple LD1 thresholds may be employed so that first AP 1820 reduces its beacon power in multiple steps to match the multiple thresholds. Alternatively when the LD1 threshold is crossed the beacon power of first AP 1820 is reduced in multiple steps in order rather than a single reduction thereby reducing RF channel coverage in multiple steps.

Threshold 2: LD2 Procedures:

When the measured Real Time Class traffic utilization exceeds the LD2 threshold (LD2>LD1), then additional, more forceful actions can be triggered to distribute the load. Representative actions are, the AP rejects any new associations, and in addition to this encourages candidate STAs to roam to another AP. Considering these two measures then:

(1) Reject New Associations:

Association requests (i.e. based on receiving an Association message) are denied by responding to an association request message with an association response using status code 17 (per IEEE 802.11-2007) which informs the STA of the following: "association denied because AP is unable to handle additional associated STAs". Rejection of new associations occurs when the utilization for Real Time Class traffic is above LD2 threshold or if a predetermined maximum number of STA associations with the AP is reached. Re-association requests from roaming STA are also denied. Accordingly, this will prevent neighbouring APs in high load (>LD2) from forcing STAs roaming to each other in a type of infinite loop.

(2) Invoke Station Roaming:

The emerging standards-based approach to force roaming is to use the messaging and procedures defined in IEEE 802.11v BSS Transition Management. As noted above this is not expected to be available in commodity STAs (i.e. handsets, smartphones, laptops, netbooks, tablets, etc.) or low-end APs for some years. Another potential approach is for the STA to be forcibly disassociated when the AP sends it a disassociate message. However, this action will most likely takedown any security associations and hence also any sessions (voice or video calls) that are in progress thereby abruptly terminating them which is not a desirable result.

As such the methods implemented according to embodiments of the invention are intended to remove these issues whilst simultaneously working with existing commercially deployed STAs, which do not support many of the advanced 802.11 protocols such as IEEE 802.11e, k, v, etc. Accordingly active STAs (stations that are sending or receiving data) are either influenced to move to another channel or AP by reducing the RF transmit power on the AP for only those packets that are being sent to the selected STA, i.e. the STA that is selected specifically to be moved. The transmit RF power to other STAs is not affected. The selected STA therefore perceives that the distance to the AP has increased and when its received power level falls below a certain threshold, the STA attempts to roam to a better AP (i.e. stronger signal and/or higher PHY rate). We refer to this approach as "Implicit Load Distribution". What we term "Explicit Load Distribution" may use similar Load Distribution algorithms (i.e. threshold definitions and actions) but the AP additionally signals using a standard messaging protocol, such as that proposed in IEEE 802.11v or another proprietary signaling protocol, between the AP and the STA to provide additional information or control signals that are used by the STA to associate with another AP. Examples of such information may include providing data relating to an AP that has been preselected to accept the STA (for example using a controller such as presented supra in respect of FIG. 7).

Several criteria are used to identify which STA(s) need to be moved from a channel where the over-the-air utilization is above LD2 to a different channel on the same AP or neighbouring AP that is less utilized (has more bandwidth available) and is operating below LD2. These required criteria include the following.

Station Activity:

STAs that are currently sending or receiving data are called "active stations". Moving a STA that is not sending or receiving data to another AP does not reduced the over-the-air utilization and as such the mechanism needs to move STA(s) that are sending or receiving data to reduce over-the-air utilization. A STA's activity is determined by monitoring "Idle Time", which is a client parameter that is available in most AP implementations. Accordingly, according to an embodiment of the invention the AP looks to see if the STA was sending or receiving non-TCP data over a predetermined period of time, e.g. 1 second. If yes, than there is a high probability that it will send or receive non-TCP data in the near future and therefore this STA will contribute to over-the-air utilization on the channel or AP. Moving that STA to another channel or AP will reduce the over-the-air utilization on that channel or AP. Equally, if the STA whilst included within the analysis stops transmitting, this would have the same impact as if STA was moved, namely the over-the-air utilization is reduced.

PHY Rate:

This is the data rate that is currently used to send and received packets between the STA and the AP. It will be one of the supported data rates that both the STA and AP supports and was selected based on current SNIR (Signal to Noise and Interference Ratio). Valid entries Data Rate are 1 though 600:

802.11b, 1, 2, 5.5, 11;
802.11a/g, 6, 9, 12, 18, 24, 36, 48, 54;
802.11n data rates;
1×1 20 Mhz Ch. 6.5, 13, 19.5, 26, 39, 52, 58.5, 65;
1×1 40 Mhz Ch. 13.5, 27, 40.5, 54, 81, 108, 121.5 135;
1×1 40 MHz Ch. Short Guard Interval, 15, 30, 45, 60, 60, 120, 135, 150;
2×2 20 MHz Ch. 13, 26, 39, 52, 78, 104, 117, 130;
2×2 40 MHz Ch. 27, 54, 81, 108, 162, 216, 243, 270;
2×2 40 MHz Ch. Short Guard Interval, 30, 60, 90, 120, 180, 240, 270, 300;
3×3 20 MHz Ch. 19.5, 39, 58.5, 78, 117, 156, 175.5, 195;
3×3 40 MHz Ch. 40.5, 81, 121.5, 162, 243, 324, 364.5, 405;
3×3 40 MHz Ch. Short Guard Interval, 45, 90, 135, 180, 270, 360, 405, 450;
4×4 20 MHz Ch. 26, 52, 78, 104, 156, 208, 234, 260;
4×4 40 MHz Ch. 54, 108, 162, 216, 324, 432, 486, 540;
4×4 40 MHz Ch. Short Guard Interval, 60, 120, 180, 240, 360, 480, 540, 600.

Real Time Traffic:

STAs that are sending non-TCP packets are candidates to be moved to another channel or AP. Station Roaming Value (SRV) is calculated for active STAs that were sending/receiving non-TCP packets in the past one second. The table is checked if the entry is not a TCP flow to indicate that this is a candidate to be moved.

RSSI:

Receive signal strength indicator (RSSI) is a measurement of the power present in a received radio signal. The RSSI is a parameter that has a value of 0 through RSSI Max (up to 255). This parameter is measured by the PHY layer based on the energy observed at the receiver, or alternatively the antenna, when receiving the current Physical Layer Convergence Protocol (PLCP) Protocol Data Unit (PDU). RSSI is measured between the beginning of the Start Frame Delimiter, an 8-bit value marking the end of the preamble of an Ethernet frame and the end of the PLCP Header Error Check (HEC), a 16-bit Cyclic Redundancy Check that is calculated over the contents of the header of the Ethernet frame and inserted into the header. RSSI is intended to be used in a relative manner and hence the absolute accuracy of the RSSI reading is not important, and different AP vendors may use slightly different methods. The received signal strength at the STA is not known but it is reasonable to assume a symmetric RSSI because the transmission path is often the same for traffic in both directions. If the two RSSI values are somewhat different, it will have minimal impact on the algorithm performance It would be evident to one skilled in the art that alternatively Received Channel Power Indicator (RCPI), which is measured across the entire frame rather than the preamble, may be employed.

Error Rate:

Receive bit error rate is a whole number between 0 and 100 and is a percent value.

Station Priority:

This parameter is used to indicate priority for roaming and that the STA was selected for roaming, and normally the default value for Station Priority is set to zero. When a STA was selected for roaming but did not roam, a predetermined value, e.g. 50 is added to the Station Priority value. When a STA successfully completes roaming its Station Priority is reset to the configured value. Increasing the SRV value reduces the probability that this STA will be asked to roam again soon so that the process does not waste time repeatedly trying to force a STA to roam that cannot.

TABLE 1

Station Statistics Table

| MAC Address | Idle Time | Real-time | PHY Rate | RSSI | Error Rate | Station Priority | SRV |
|---|---|---|---|---|---|---|---|
| | | | | | | | |

These parameters are stored by the AP in a table, such as shown in Table 1 above, and are updated at a predetermined rate, for example every second. When the over-the-air Utilization exceeds LD2 for Real Time Class traffic, the AP scans through its table of associated STAs with Idle Time less than the predetermined value, e.g. 1 second, and computes the Station Roaming Value (SRV). An exemplary algorithm for SRV being shown in Equation (8).

$$SRV = A*PHY + B*RSSI + C*(100 - ErrorRate) + StnP \qquad (8)$$

where A, B, C are configurable weight factors and StnP is Station Priority.

Figure 19:
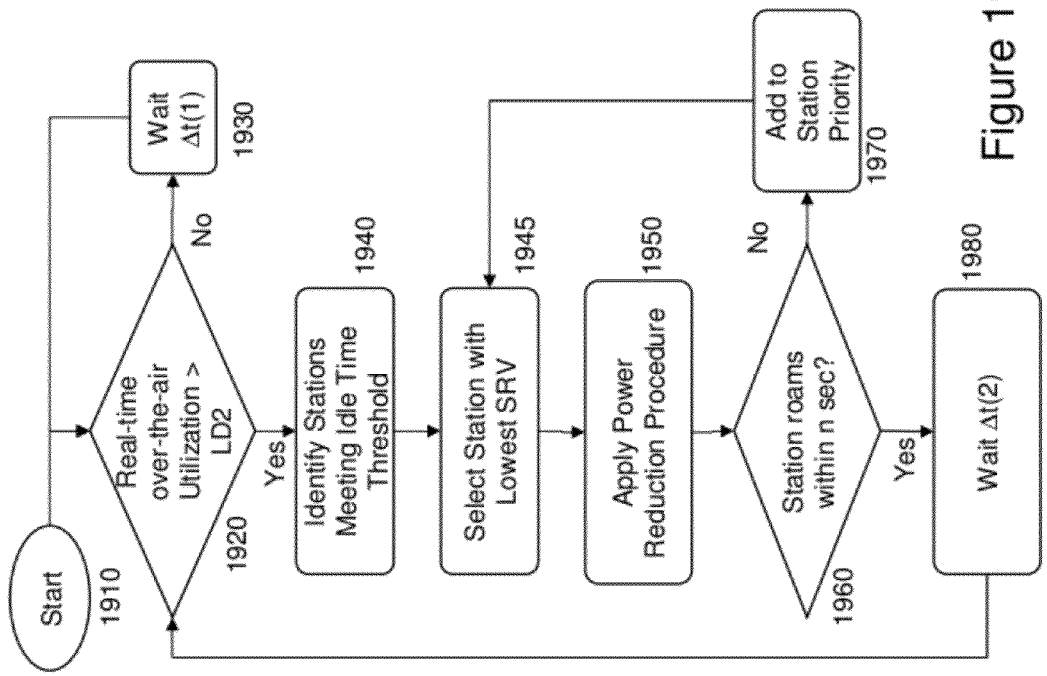
FIG. 19 depicts a flow chart depicting actions for an AP according to an embodiment of the invention where over-the-air utilization exceeds a predetermined threshold.

A STA is selected based on the smallest value of the Station Roaming Value (SRV). An exemplary algorithm of "Implicit Load Distribution" is shown by the flowchart in FIG. 19 and starts at step 1910. In step 1920 a determination is made whether the over-the-air utilization for Real Time Class traffic exceeds the LD2 threshold. If not then the flow moves to step 1930, waits for a predetermined period, before looping back to step 1910. If the LD2 threshold has been met or exceeded then the AP scans the Station Statistics Table in step 1940 to identify any STA that has an Idle Time that meets a predetermined duration and computes a Station Roaming Value (SRV) for each identified STA.

Next in step 1945 the AP selects a STA from all STAs associated with the AP with the smallest Station Roaming Value. A STA with the smallest SRV value has the most inefficient use of over-the-air resources. Since the formula for SRV is comparing over-the-air receive conditions between STAs, the exact method used for computing RSSI and Error Rate is not imported because our algorithm looks at the difference between STAs. The algorithm now proceeds to step 1950 wherein it applies the power reduction procedure to the frame transmission for the identified STA to force it to roam to an adjacent AP.

An exemplary procedure for the power reduction formula is as follows. Reduce the transmit power from the AP to only the selected STA so that STA's receive signal is below the level where the STA invokes its roaming procedure (i.e., −72 dBm) for a short period of time (i.e. 3 seconds). To determine the amount the AP needs to reduce it's transmit power to the selected STA, the AP measures the receive power from the STA and computes the difference between current measured level and −72 dBm and reduces the transmit power by that amount. In typical implementations, the AP measures Received Signal Strength Indicator (RSSI) using a proprietary scale. Therefore, a RSSI value to dBm equivalency for −20 dBm to −90 dBm range needs to be determined for each vendor's AP that this algorithm is implemented on. The process moves then to step 1960 wherein a wait is executed and a determination is made as to whether the STA has roamed to another AP. If the STA has not roamed then a predetermined value is added to its Station Priority, in step 1970, this Station Priority forming part of the data used to re-calculate the SRV and RF power for frame transmissions to this STA is restored back to normal. The flow then returns to step 1945 and retries with the next best STA candidate.

If the disassociation of the STA was successful then the process waits for a predetermined time shown in step 1980, before returning to step 1920 to determine if the over-the-air utilization has dropped below LD2. If not, the flowchart reapplies the process to redistribute another STA. Whilst the process in respect of FIG. 19 was described in respect of a single STA it would be evident that the process may optionally seek to disassociate a number of STAs to reduce the over-the-air utilization. It would be evident to one skilled in the art that the selection, by the AP, of the STA(s) that will have the RF power reduced during transmissions to it to try and force the disassociation. It would be apparent to one skilled in the art that the received signal power threshold and wait duration may be predetermined values or that these may be established dynamically according to factors determined by the AP or the network and communicated to the AP.

Threshold 3: MaxTU Procedures:

The MaxTU (Total Utilization) threshold is the maximum utilization for sum of Real Time Class traffic and Data Class traffic. When the aggregate (Real Time Class and Data Class) utilization exceeds, MaxTU, the engineered limit for the over-the-air utilization, then extreme measures need to be taken to maintain service quality because load distribution and rate control measures were inadequate. The MaxTU procedures include forcing a disassociation of a STA(s) such that the STA(s) will then begin the procedure for re-associating to an alternate STA. An exemplary procedure for forced disassociation may, for example, begin with the AP determining which STA to drop using the procedures described above in respect of Threshold 2: LD2 Procedure with the modification that any traffic can be disassociated irrespective of whether the traffic is TCP or non-TCP. Once the STA(s) has been selected the AP sends a disassociation message and does not reduce RF transmit power for the STA(s). For example, the AP sends a disassociate message using reason code 5 (per IEEE 802.11-2007) that informs the STA of the following: "Disassociated because AP is unable to handle all currently associated STAs". If the disassociated STA does not find another STA and tries to return to this AP then the association request is rejected while at this threshold level.

Operation with Multiple BSS:

Within the scenarios discussed supra there has been an implicit assumption that the AP is operating as a single BSS. However, in many situations an AP may support multiple BSS cells. The embodiments of the invention described supra for Admission and Load Distribution Control will operate within these scenarios as discussed below.

Consider, for example, the scenario of a school where the Wi-Fi channels have been subdivided into two BSS: one for teachers and one for students. Two sets of thresholds are therefore defined, one for each BSS. If the students exhaust their over-the-air utilization (say MaxTU1), this will have no effect on the teachers' assigned over-the-air utilization. Therefore, new student sessions will be blocked/disassociated but the teachers can continue to make new calls assuming they have available over-the-air utilization allocation. According to embodiments of the invention there are two over-the-air utilization partitioning models considered, Dedicated and Shared. The principles of Admission and Load Distribution will work with multiple BSS using each partitioning model.

Figures 21, 23:
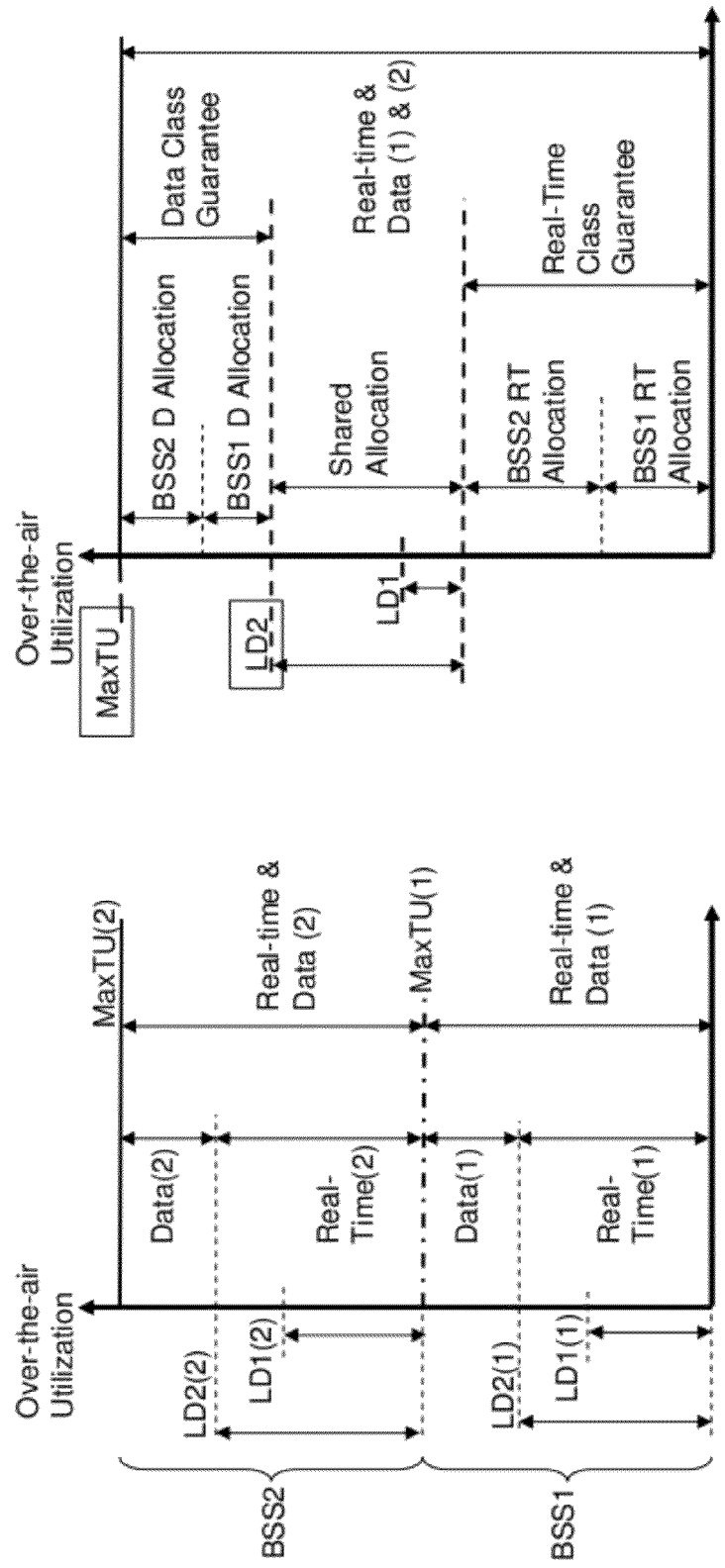
FIG. 21 depicts multiple thresholding for triggering actions by an AP to improve over-the-air capacity and QoS performance according to an embodiment of the invention wherein there are two BSS's per channel.
FIG. 23 depicts multiple thresholding for triggering actions by an AP to improve over-the-air capacity and QoS performance according to an embodiment of the invention wherein the AP supports multiple BSS's.

Dedicated Partitioning Model:

An exemplary implementation for multiple thresholding for triggering actions by an AP to improve over-the-air capacity and reduce discarded frames for according to an embodiment of the invention wherein there are two BSS's per channel is depicted in FIG. 21 according to an embodiment of the invention. In this model the over-the-air utilization is divided into two fixed partitions, BSS1 and BSS2 that are associated with first and second BSS respectively. The MaxTU threshold still needs to be calculated for the AP as it represents a system maximum but now when multiple BSS are deployed from the same AP the MaxTU is divided and allocated to the BSS as MaxTU(n) where n is the partition number and $$\text{Max}TU = \sum_{1}^{n} \text{Max}TU(n).$$

The partitions do not have to be equal or even related in any manner to one another other than their sum cannot exceed MaxTU. For example, if MaxTU is 90% and there are two BSS in use, then a possible allocation could MaxTU(1)=20% and MaxTU(2)=70%. Similarly, LD1(n) and LD2(n) can be calculated to fit into their max MaxTU(n) allocation such that $$LD1(n) < LD2(n) < \text{Max}TU(n) \tag{8}$$

Figure 22:
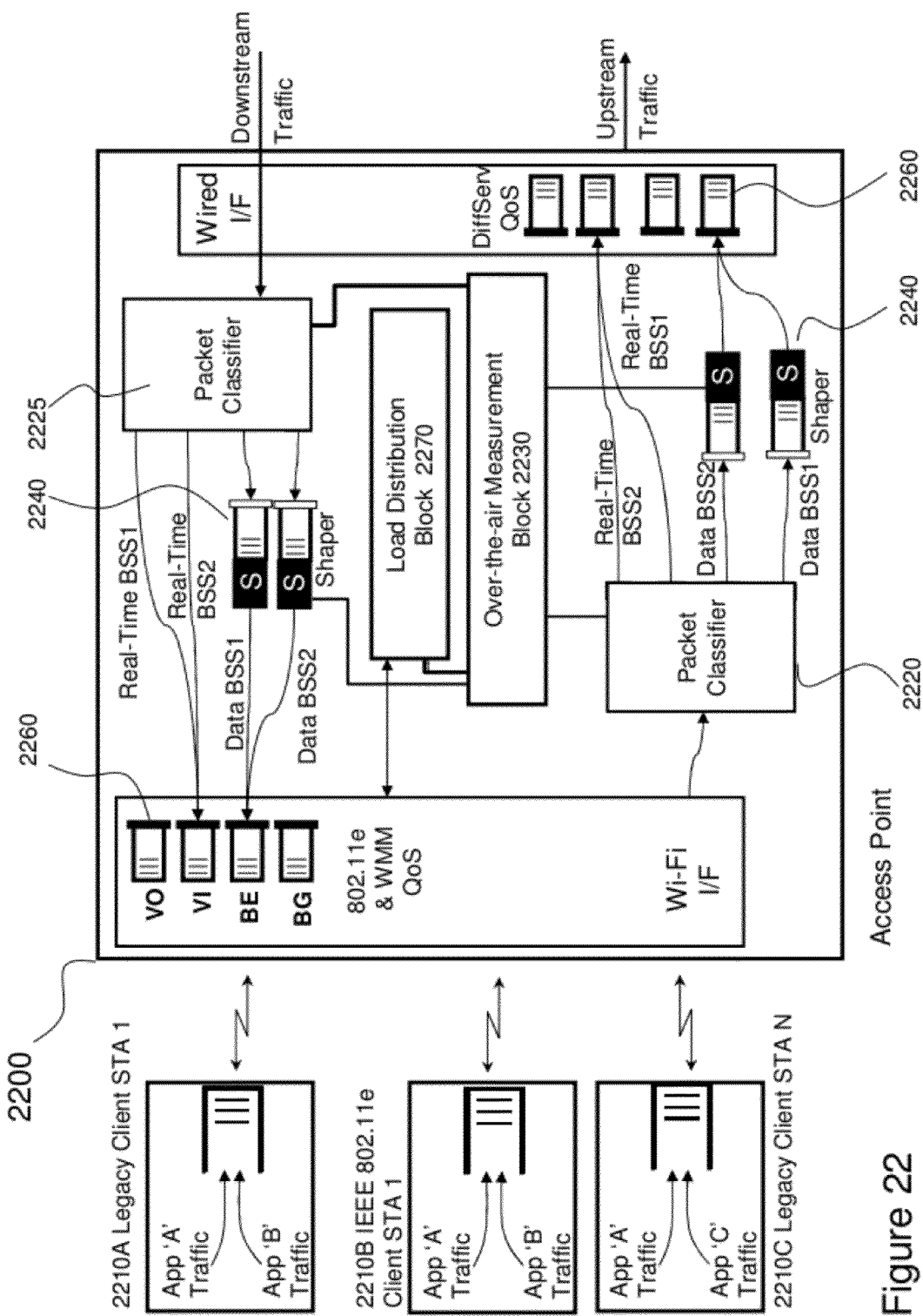
FIG. 22 depicts an AP for managing upstream/downstream transmissions according to an embodiment of the invention wherein the AP supports multiple BSS's.

Accordingly, the Packet Classifiers, such as Upstream and Downstream Packet Classifiers 2220 and 2225 respectively in AP 2200 of FIG. 22, according to an embodiment of the invention, have to determine for each packet not only which Traffic Class the traffic belongs to based on header fields but also which BSS it belongs to based on BSS information within the frame. This information is sent to the Over-the-air Measurement Block 2230 in addition to the BSS number, n, to which it relates. The Over-the-air Measurement Block 2230 now also keeps track of the thresholds for each BSS which include LD1(n), LD2(n) and MaxTU(n), where n is the BSS number. The previously outlined formulas for the Over-the-air Measurement presented supra are now applied for each BSS. The Over-the-air Measurement Block 2230 uses the information collected from the Upstream and Downstream Packet Classifiers 2220 and 2225 respectively and the provisioned Thresholds to determine the over-the-air utilization allocations for the Data Class for each BSS.

Within the AP 2200 of FIG. 22 there are depicted two Traffic Shapers 2240 per BSS (one per BSS in each of the upstream and downstream directions). The Over-the-air Measurement Block 2230 sends to the Traffic Shapers 2240 its over-the-air utilization allocation for their respective BSS. Each Traffic Shaper 2240 then shapes the traffic for its respective BSS and sends the packets to the appropriate queues in the Wired interface 2250 and Wireless interface 2255 respectively for the upstream and downstream directions. As depicted the Traffic Shapers 2240 output to the same interface queue 2260 although it would be evident to one of skill in the art that each Traffic Shaper 2240 may output to a different interface queue 2260.

The Over-the-air Measurement Block sends to the Load Distribution Block the traffic class utilization per traffic class for each BSS. The Load Distribution Block uses the over-the-air utilization information and threshold levels for each BSS to determine if a threshold has been crossed. If a threshold has been crossed then, the Load Distribution Block 2270 begins the appropriate procedures as defined supra to manage the traffic load but only for the affected BSS. All tables and data structures are replicated for each BSS. Accordingly, the traffic is managed independently for each traffic class in both the upstream and downstream directions for multiple BSS's within a single AP without requiring any upgrade to the STAs it supports.

Shared Partition Model:

Now referring to the Shared Partition Model, depicted by the model in FIG. 23, according to an embodiment of the invention, wherein multiple thresholding for triggering actions by an AP to improve over-the-air capacity and reduce discarded frames according to an embodiment of the invention is depicted wherein the AP supports multiple BSS's. The Shared Partition Model is more efficient than the Dedicated Partition Model. Essentially each BSS gets some "Guaranteed" bandwidth allocation for each of the Real Time and Data classes but there is also a "Shared" bandwidth portion. This reduces the level of stranded bandwidth and increases the over-the-air bandwidth usage efficiency. Stranded bandwidth is bandwidth not used by one BSS, but reserved for it that is not available to another BSS. Referring to FIG. 23 the original Real Time Class is now partitioned into a BSS1 RT Allocation and a BSS2 RT Allocation Similarly the original Data Class is now partitioned into a BSS1 D Allocation and a BSS2 D Allocation. There is also a Shared Allocation which can be used by any of the traffic classes according to the defined usage rules, an exemplary scenario being presented below.

Similarly, the Data Class traffic can use the Real-time allocation as described supra for the single BSS scenario. The Data Class traffic can use the Share Allocation if it is not used by the Real Time Class. The Data Class Allocation is split between the BSS's to maintain the ratio of BSS1-Allocation:BSS2-Allocation, see FIG. 15. Optionally the allocation between BSS1 and BSS2 in the Data Class may be allocated differently. The Real Time Class traffic has priority over the Data Class in being able to use the Share Allocation. BSS1 Real-time Class and BSS2 Real-time Class traffic use the Share Allocation in a First Come First Session manner without any need to maintain the BSS1:BSS2 ratio although optionally this may be enforced. The Over-the-air Measurement Block 2230 ensures the Real Time Class gets priority which it does by providing the Traffic Shapers 2240 with their allocations to ensure Data Class backs off as Real Time traffic increases.

Typically, a single MaxTU threshold is employed for each channel on an AP. When the over-the-air utilization exceeds this level, the MaxTU procedures are applied by the AP. Similarly, each channel typically operates with a single LD2 threshold shown in FIG. 23. The LD2 threshold is deemed crossed when the Share Allocation is exhausted. When this happens, the AP 2200 determines that at least one BSS has exhausted its Real Time allocation and its guaranteed allocation. If one BSS of a plurality of BSSs has exhausted its guaranteed allocation, then the LD2 procedures are applied to that BSS. If all supported BSSs have exhausted their guaranteed allocation then the LD2 procedures are applied to all BSSs equally and alternately. These procedures being discussed supra in respect of LD2 for a single BSS.

In one scenario, according to an embodiment of the invention, there is a single LD1 threshold for an AP channel. The LD1 threshold would be configured within the Shared Allocation. If a BSS's over-the-air channel utilization exceeds the LD1 threshold, then the LD1 procedures are applied to that BSS. If multiple BSSs exceed the LD1 threshold, then the LD1 procedures are applied to these BSSs equally and alternately. In another scenario there is one LD1 threshold for each BSS where the LD1(1) threshold is configured within the guaranteed allocation of BSS1 and the LD1(2) threshold is configured within the guaranteed allocation of BSS2 and so on for BSSn. Then the LD1 procedures are applied to the BSS that cross their LD1 threshold. These procedures being discussed supra in respect of LD1 for a single BSS.

It would be evident to one skilled in the art that the examples provided supra in respect of a shared partition of multiple BSSs to a common AP channel can be implemented without departing from the scope of the invention. Some examples include making the Data Class non-partitioned in a manner similar to the Shared Allocation, the Shared Allocation may have a limit to the percentage one BSS, the thresholds may be dynamically established, the settings for a BSS may be set to low or high percentages.

Coexistence with Standards-Based Admission Control:

As discussed previously the exemplary embodiments of the invention are intended to simultaneously operate with IEEE 802.11 STAs that have or have not implemented the evolutions of IEEE 802.11 captured in IEEE 802.11e, k, v, etc., including those aspects of the standards based Admission Control using the IEEE 802.11e Tspec (Traffic Specification). We refer to this as coexistence, by which we mean some wireless STAs will use the embodiments of the invention and that other wireless STAs will use the standards based solution at the same time. There are believed to be no interworking issues between the two solutions. This coexistence is shown in FIG. 22 by first and second legacy client stations STA1 and STA N 2210A and 2210C respectively that form part of a BSS with AP 2200 at the same time as an 802.11e compliant client station STA 1 2210B.

Considering how coexistence functions, then in general, the standards-based Admission Control in IEEE 802.11e standard is based upon the four priority traffic classes: Voice (VO), Video (VI), Best-Effort (BE) and Background (BG) which are listed from highest to lowest priority. A STA sends a message to the AP to request bandwidth in a particular traffic class and the requested traffic characteristics are recorded in the Tspec which is appended to the request message. If the AP has over-the-air utilization allocation available, then the AP will send a reply to admit the session. Otherwise, the AP may deny the request.

TABLE 2

Traffic Class Mapping of IEEE 802.11e to Invention

| Traffic Class of Embodiments of Invention | IEEE 802.11e Access Categories |
|---|---|
| Data Class | Best Effort |
|  | Background |
| Real Time Class | Voice |
|  | Video |

Co-existence needs a mapping between the traffic classes, such as that shown above in Table 2 for the two traffic classes defined in this specification according to embodiments of the invention. It would be evident that other mappings would be possible as well as considering more data classes. The work to ensure proper co-existence is done in the Packet Classifier, or optionally a separate block that monitors header data. Traffic which uses Access Categories will be marked with these categories in the header frames. For example, a frame that was sent using Access Category "Video" would have its AC field in the QoS header marked accordingly. The Packet Classifier will need to identify the Access Category if it was applied to the transmission and will then perform the mapping from the Access Category to the Network Classes defined, i.e. Data Class and Real Time Class. When the Packet Classifier passes the frame information to the Measurement Block, it will send the mapped information. For example, the Packet Classifier would map a Video Access Category packet to Real Time Class. It will then send the frame information to the Over-the-air Measurement Block including the Traffic Class as being the Real Time Class. Because of the mapping all other functions would operate with no changes required within the AP.

The recommended mappings of the IEEE 802.11 Access Categories to the 3invoa Networks Classes are as follows. The Voice Access Category and the Video Access Category are mapped to the Real Time Class because they both represent interactive Real Time traffic which typically uses UDP for transport. These traffic types have similar Quality of Service requirements in terms of delay, loss and jitter. The Best-Effort Access Category and Background Access Category map to the Data Class. They have similar Quality of Service requirements and they typically use TCP for transport.

Adjacent-Channel-Interference Mitigation Detailed Description:

Adjacent channel interference occurs when two wireless STAs are in proximity to each other, each STA is using a different RF channel and each STA has active (transmitting and receiving packets) sessions. This scenario can occur for many reasons including people using multiple wireless devices such as a laptop and Smartphone with both being active at the same time e.g., person at their desk is talking on Smartphone while their laptop is sending or receiving a file. Due to one or more reasons, including but not limited to mobility, load balancing, etc, these devices are connected to different APs or different RF channels on the same AP. Another scenario is two people with laptops or other wireless devices who are in close (less than 3 meters) proximity to each other having arrived at this proximity from different directions so that they are connected to different APs.

Figure 20:
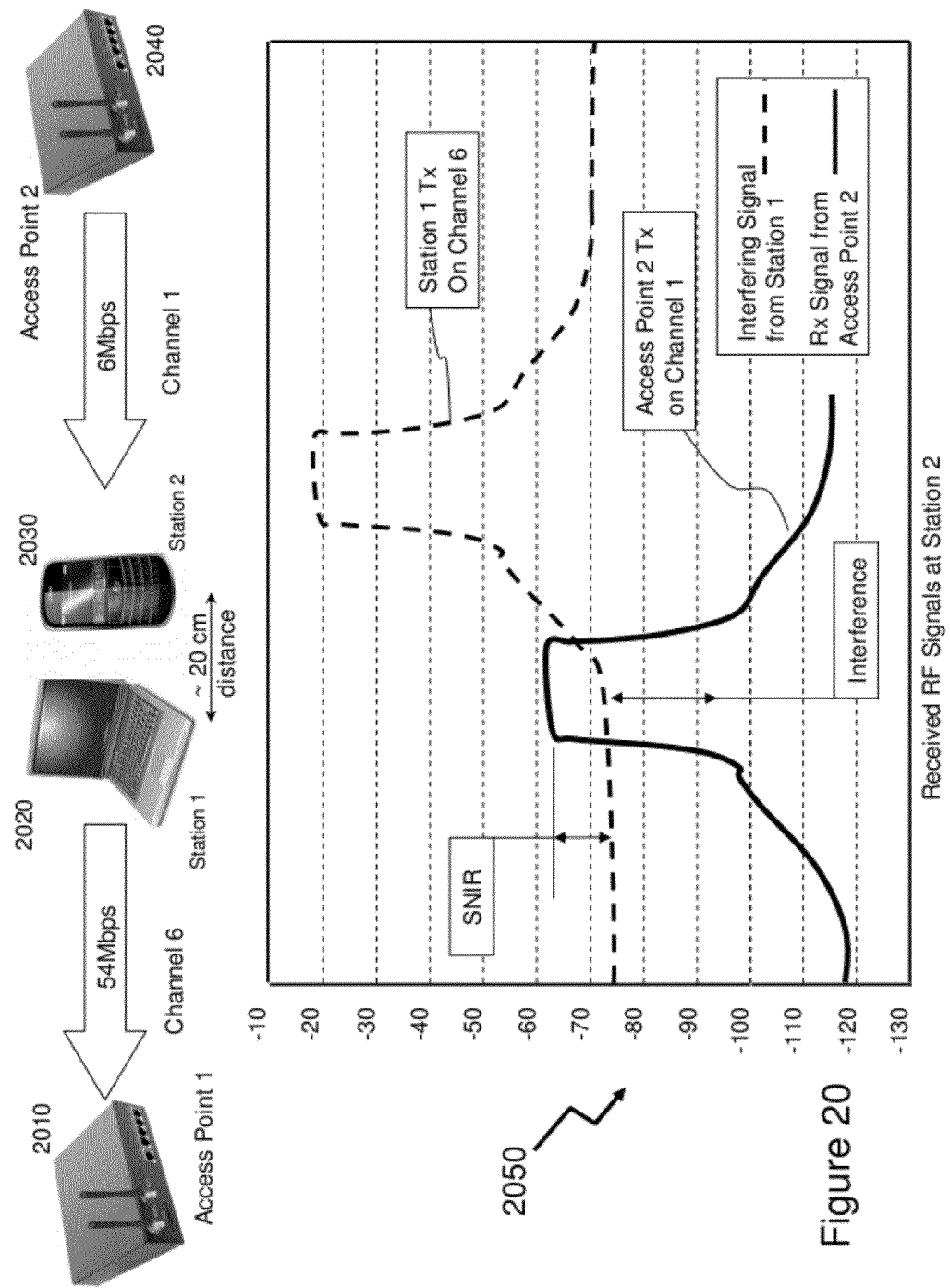
FIG. 20 depicts a deployment scenario and the resulting interference arising therefrom as addressed by an embodiment of the invention.

Referring to FIG. 20 there is depicted a deployment scenario and the resulting interference arising therefrom from such events that is addressed by an embodiment of the invention. Consider two STAs, STA1 2020 and STA2 2030, which are each associated with a different AP, AP1 2010 and AP2 2040 respectively and having an active session. If STA1 2020 is transmitting on channel 6 to AP1 2010, for example, then the main lobe of spectral energy emission will be around 2.437 GHz and at about −18 dBm at station 2 (Station 1 and 2 are close together ~20 centimeters apart). The specification for the transmit filter of IEEE 801.11a/b/g/n transmitters is such that some resulting spectral energy will be emitted far outside of the channel 6 region. Now consider STA2 2030, which is receiving packets from AP2 2040 on channel 1 at 2.412 GHz and accordingly the received signal strength is relatively low, around −62 dBm.

As evident from FIG. 20 the stray energy from channel 6 is interfering with the received signal on channel 1 at STA2 2030, this stray energy being at about −73 dBm for this example. This will result in a reduction in the signal-to-noise-and-interference ratio (SNIR) which in turn results in a reduction of the PHY rate. For example the PHY rate at STA2 may drop from 54 Mb/s to 6 Mb/s, which is a significant reduction in throughput and efficiency thereby significantly lengthening a file transfer time. The interference may in other scenarios be sufficiently severe so as to completely block reception. Of course, the scenario may occur in reverse where STA1 is receiving and STA2 is transmitting.

It is therefore necessary, in seeking to address over-the-air utilization and network efficiency to establish a solution for this interference. At present within IEEE 802.11 and other prior art references the solutions are focused to network design by establishing AP locations, transmitted powers, and channel allocations are computed in order to obtain the best RF coverage at the same time that the sufficient capacity is provided, see for example "Large-Scale Wireless LAN Design" by A. Hills (IEEE Comms Magazine, Vol. 39, No. 11, pp. 98-107, November 2001) and "On the Design and Capacity Planning of a Wireless Local Area Network" by R. C. Rodrigues et al (Network Operations and Management Symposium, NOMS, pp. 335-348, April 2000). In dense deployments, however, additional developments are reported such as enhanced channel planning see for example "New Algorithm for Distributed Frequency Assignments in IEEE 802.11" by E. Garcia Villegas et al (European Wireless 2005), adjusting network configuration such as reported by Aruba Networks with their Adaptive Radio Management remove some APs and establish them as Air Monitors in their terminology, and reducing the output power of the APs and communicating backoff values between the APs to help determine the levels for other APs to backoff, see for example U.S. Pat. No. 7,366,537 entitled "Wireless Network Apparatus and System". These techniques presented supra with respect to the prior art seek to address Co-Channel Interference in the wireless network or Adjacent Channel Interference in AP implementation with two radios. The approaches as described according to embodiments of the invention address Adjacent Channel Interference between STAs (STAs that are in close proximity of each other but are on different channels).

In contrast, the inventors have established an alternate strategy according to embodiments of the invention by moving the affected STA on to different channel, preferably on the same channel that the other STA is using. According to an embodiment of the invention detection that interference is occurring is made by the AP by comparing the receive signal strength from the STA to the actual PHY rate with the STA. If the PHY rate is too low for the received signal strength, then interference including Adjacent Channel Interference is likely present resulting in an increased bit error rate at the STA, i.e. low SNIR. The high error rate will result in the Wi-Fi radios of STAs experiencing interference reducing their PHY rate to a point where errors are eliminated. For example, if the receive power level is >−65 dBm and transmission Data Rate is less than minDataRate (802.11a/g, 24 Mbps; 802.11n 1×1

MIMO, 26 Mbps, 2×2 MIMO 52 Mbps, 3×3 MIMO 78 Mbps, and 4×4 MIMO 104 Mbps; 802.11b, 5.5 Mbps) then the SNIR is less than 16 dB because the STA is experiencing significant RF interference. To achieve high PHY data rates a SNIR of 28 dB or higher is required.

Having determined that interference is occurring embodiments of the invention attempt to resolve this by encouraging one of the STAs experiencing interference to move to another AP or RF channel using the techniques described above in respect of "Invoke Roaming" for the affected STA(s). Ideally, the roam should result in the two STAs being connected to the same AP or RF channel. Given the typical close proximity of the STAs experiencing interference, and assuming sufficient bandwidth is available, this is a likely outcome after roaming. As described above the reason that two STAs may be associated with different channels is that the connections were made at different locations and the STAs were physically moved into sufficient proximity for the interference to result whilst maintaining their original associations.

Exemplary basic algorithms according to embodiments of the invention follow the flow charts 2400 and 2450 in FIG. 24. It would be apparent to one skilled in the art that by applying transmit power reduction procedure defined supra to invoke STA to roam does not require any additional capability over what is in the IEEE 802.11-2007 specification. By contrast, the signaling approach requires a signaling method between AP and the STA to pass additional traffic management information where by AP can request STA to invoke roaming.

As a background process, a software operational task in steps 2405 runs periodically, say every n seconds, in the AP scanning through the Station Statistics Table looking for active STAs in steps 2410 that have RSSI greater than some threshold (i.e., RSSI>−65 dBm). For the next step, the AP checks if the PHY data rate is too low for the signal strength (Method A 2400 step 2415) or checks if the receiver Error Rate is too high for the RSSI (Method B 2450 step 2430). On encountering a STA that meets the above criteria, the AP applies the transmit power reduction procedure to force the STA to roam to an adjacent AP in steps 2420. If after a timeout, i.e. 3 seconds, the STA does not roam away, then the AP restores RF power back to normal power level (not shown for clarity) and returns to steps 2405. Alternatively in steps 2420, the AP may also use Explicit Signaling in which case, the AP signals to the selected STA using the 802.11v standardized protocol or using a proprietary signaling roaming request with optionally specifying the channel/AP with which the selected STA should re-associate. The procedure then waits again in step 2425, i.e. 3 seconds, for the values in the Station Statistics Table to get updated and the procedures continues from the beginning in steps 2405 looking for additional STAs that are experiencing Adjacent Channel Interference.

It would be apparent to one skilled in the art that the determination of adjacent channel interference through PHY or receiver error rate discussed supra in respect of determining whether to trigger a roaming procedure may also be made by the STA as described below in respect of flow charts 2500 and 2550 in FIG. 25 and that the threshold for RSSI may be established at other values than −65 dBm as described supra in respect of FIG. 24. The exemplary algorithms for Adjacent Channel Interference Mitigation in the STA closely follow the Adjacent Channel Interference Mitigation algorithms for the AP. The following are the salient differences. Firstly the STA only needs to test its own RSSI level, PHY rate and error rate to make a decision on whether to roam and does not need any other information relating to the BSS to which it is currently joined. Further, the STA performs its own roaming by performing a channel scan, selecting the best channel and then follows client procedures to disassociate with the current AP and re-associate with the selected AP. If the STAs and APs both support signaling, for example to the 802.11v protocol or a vendor specific signaling protocol, then on detection of adjacent channel interference, the STA may signal information (its performance parameters) to the AP and then the AP instructs the STA to roam to the same channel that the closely located neighbour STA is using. Beneficially the STA does not need to wait before performing the next check, as it knows with certainty whether if it has roamed or not.

As presented supra solutions to the management of QoS for WLANs according to embodiments of the invention are based upon the addition of new functionality added to the network, e.g. the APs or their controllers, and not the client stations (STAs). This functionality consisting of several components which have been discussed supra, namely Virtual Station Priority; Session Admission Control; Load Distribution Control; together with Adjacent Channel Interference Control that are implemented in varying combinations according to embodiments of the invention.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth. The term memory as used herein refers to any non-transitory tangible computer storage medium.

The memory includes machine-readable code segments (e.g. software) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be a computer, a set-top box, a cellular base station, a wireless device, a web appliance, a network router, switch or bridge, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method comprising:
(a) providing an access point supporting at least a communication session of a plurality of communication sessions, each communication session associated with a client station of a plurality of client stations operating according to a first predetermined standard and comprising a plurality of frames, the access point comprising an over-the-air measurement block, a load distribution control block, and a processor;
(b) determining with the over-the-air measurement block for each communication session of the communication sessions at least one load utilization of a plurality of load utilizations, each load utilization associated with at least a predetermined traffic class of a plurality of traffic classes;
(c) determining for each traffic class with the over-the-air measurement block an accumulated load utilization in dependence upon at least the plurality of load utilizations relating to the plurality of communication sessions associated with that traffic class;
(d) determining with the processor whether to establish an enforcement action of a plurality of enforcement actions with the load distribution control block in dependence upon the plurality of load utilizations and a plurality of thresholds, each threshold relating to a predetermined traffic class of a plurality of traffic classes and each enforcement action of the plurality of enforcement actions being established other than by any signaling within a set of devices comprising the access point and a predetermined subset of the plurality of client stations; wherein
each load utilization associated with at least a predetermined traffic class of a plurality of traffic classes is established in dependence upon the current transfer rate of data packets within the predetermined traffic class of a plurality of traffic classes and the maximum data packet transfer rate meeting a quality of service parameter relating to the predetermined traffic class of a plurality of traffic classes; and
the plurality of thresholds comprises:
a first threshold established below a maximum guaranteed level of the predetermined traffic class of the plurality of traffic classes, wherein the load distribution control block initiates early load distribution while the first threshold is exceeded by lowering the access point beacon power;
a second threshold established as the maximum guaranteed level of the predetermined traffic class of the plurality of traffic classes, wherein the load distribution control block initiates more forceful load distribution while the second threshold is exceeded by rejecting new client station associations and reducing the transmit power only for packets to be transmitted by the access point to a first subset of the plurality of client stations, wherein the first subset of the plurality of client stations is less than the plurality of client stations; and
a third threshold established in dependence upon a maximum traffic utilization of the predetermined traffic class of the plurality of traffic classes, wherein the load distribution control block initiates forceful load distribution while the third threshold is exceeded by further reducing the transmit power only for packets to be transmitted by the access point to the first subset of the plurality of client stations to a level below that established when the second threshold was reached.

2. The method according to claim 1 wherein,
determining with the processor whether to establish an enforcement action comprises determining for each traffic class of the plurality of traffic classes whether an enforcement action should be established.

3. The method according to claim 1 wherein,
establishing the enforcement action comprises at least one of:
dropping predetermined frames relating to communications from the plurality of client stations to the access point for a first predetermined subset of the plurality of traffic classes that exceed their respective predetermined thresholds,
delaying predetermined frames relating to communications from the plurality of client stations to the access point for a first predetermined subset of the plurality of traffic classes that exceed their respective predetermined thresholds,
subjecting predetermined frames relating to communications from the plurality of client stations to the access point for a second predetermined subset of the plurality of traffic classes to data transfer rate control, and
performing an action with a predetermined subset of the client stations with the intention of distributing traffic load to another access point.

4. The method according to claim 3 wherein,
at least one of when the enforcement action involves data transfer rate control it is achieved through the use of a traffic shaper and a frame dropper associated with the access point and the enforcement action is performed upon a predetermined subset of the plurality of traffic classes determined in step (d).

5. The method according to claim 1 wherein,
establishing the enforcement action is at least one of:
dropping predetermined frames relating to communications to the plurality of client stations from the access point for a first predetermined subset of the plurality of traffic classes that exceed their respective predetermined thresholds,
subjecting predetermined frames relating to communications to the plurality of client stations from the access point for a second predetermined subset of the plurality of traffic classes to data transfer rate control,
transmitting predetermined frames relating to communications to the plurality of client stations from the access point for the second predetermined subset of the plurality of traffic classes after predetermined frames for the first predetermined subset of the plurality of traffic classes are transmitted, performing with a predetermined subset of the client stations with the intention of distributing traffic load to another access point, and
queuing predetermined frames relating to communications to the plurality of client stations from the access point for the second predetermined subset of the plurality of traffic classes in one or more queues.

6. The method according to claim 5 wherein,
at least one of when the enforcement action involves data transfer rate control it is achieved through the use of a traffic shaper and a frame dropper associated with the access point, when the enforcement action involves queuing predetermined frames into queues these queues support priorities associated with a second predetermined standard, and the enforcement action is performed upon a predetermined subset of the plurality of traffic classes determined in step (d).

7. The method according to claim 1 wherein,
the first predetermined standard is selected from the group comprising IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-2000.

8. An access point comprising:
a communications interface supporting at least a communication session of a plurality of communication sessions, each communication session associated with a client station of a plurality of client stations operating according to a first predetermined standard and comprising a plurality of frames
an over-the-air measurement block;
a load distribution control block;
a non-transitory tangible computer readable medium encoding a computer program, and
a processor for executing the computer process, the computer process comprising:
(i) determining with the over-the-air measurement block for each communication session of the communication sessions at least one load utilization of a plurality of load utilizations, each load utilization associated with at least a predetermined traffic class of a plurality of traffic classes;
(ii) determining for each traffic class with the over-the-air measurement block an accumulated load utilization in dependence upon at least the plurality of load utilizations relating to the plurality of communication sessions associated with that traffic class;
(iii) determining with the processor whether to establish an enforcement action of a plurality of enforcement actions with the load distribution control block in dependence upon the plurality of load utilizations and a plurality of thresholds, each threshold relating to a predetermined traffic class of a plurality of traffic classes and each enforcement action of the plurality of enforcement actions being established other than by any signaling within a set of devices comprising the access point and a predetermined subset of the plurality of client stations; wherein
each load utilization associated with at least a predetermined traffic class of a plurality of traffic classes is established in dependence upon the current transfer rate of data packets within the predetermined traffic class of a plurality of traffic classes and the maximum data packet transfer rate meeting a quality of service parameter relating to the predetermined traffic class of a plurality of traffic classes; and
the plurality of thresholds comprises:
a first threshold established below a maximum guaranteed level of the predetermined traffic class of the plurality of traffic classes, wherein the load distribution control block initiates early load distribution while the first threshold is exceeded by lowering the access point beacon power;
a second threshold established as the maximum guaranteed level of the predetermined traffic class of the plurality of traffic classes, wherein the load distribution control block initiates more forceful load distribution while the second threshold is exceeded by rejecting new client station associations and reducing the transmit power only for packets to be transmitted by the access point to a first subset of the plurality of client stations, wherein the first subset of the plurality of client stations is less than the plurality of client stations; and
a third threshold established in dependence upon a maximum traffic utilization of the predetermined traffic class of the plurality of traffic classes, wherein the load distribution control block initiates forceful load distribution while the third threshold is exceeded by further reducing the transmit power only for packets to be transmitted by the access point to the first subset of the plurality of client stations to a level below that established when the second threshold was reached.

9. An access point according to claim 8 wherein,
determining with the processor whether to establish an enforcement action comprises determining for each traffic class of the plurality of traffic classes whether an enforcement action should be established.

10. An access point according to claim 8 wherein,
establishing an enforcement action comprises at least one of:
dropping predetermined frames relating to communications from the plurality of client stations to the access point for a first predetermined subset of the plurality of traffic classes that exceed their respective predetermined thresholds,
delaying predetermined frames relating to communications from the plurality of client stations to the access point for a first predetermined subset of the plurality of traffic classes that exceed their respective predetermined thresholds,
subjecting predetermined frames relating to communications from the plurality of client stations to the access point for a second predetermined subset of the plurality of traffic classes to data transfer rate control, and
performing an action with a predetermined subset of the client stations with the intention of distributing traffic load to another access point by moving the predetermined subset of the client stations to the other access point.

11. An access point according to claim 10 wherein,
at least one of when the enforcement action involves data transfer rate control it is achieved through the use of a traffic shaper and a frame dropper associated with the access point and the enforcement action is performed upon a predetermined subset of the plurality of traffic classes determined in step (iii).

12. An access point according to claim 8 wherein,
establishing the enforcement action is at least one of:
dropping predetermined frames relating to communications to the plurality of client stations from the access point for a first predetermined subset of the plurality of traffic classes that exceed their respective predetermined thresholds,
delaying predetermined frames relating to communications to the plurality of client stations from the access point for a first predetermined subset of the plurality of traffic classes that exceed their respective predetermined thresholds,
subjecting predetermined frames relating to communications to the plurality of client stations from the access point for a second predetermined subset of the plurality of traffic classes to data transfer rate control,
transmitting predetermined frames relating to communications to the plurality of client stations from the access point for the second predetermined subset of the plurality of traffic classes after predetermined frames for the first predetermined subset of the plurality of traffic classes are transmitted, performing an action with a predetermined subset of the client stations with the intention of distributing traffic load to another access point by moving the predetermined subset of the client stations to the other access point, and queuing predetermined frames relating to communications to the plurality of client stations from the access point for the second predetermined subset of the plurality of traffic classes in one or more queues.

13. An access point according to claim 12 wherein,
at least one of when the enforcement action involves data transfer rate control it is achieved through the use of a traffic shaper and a frame dropper associated with the access point, when the enforcement action involves queuing predetermined frames into queues these queues support priorities associated with a second predetermined standard, and the enforcement action is performed upon a predetermined subset of the plurality of traffic classes determined in step (iii).

14. An access point according to claim 8 wherein,
the first predetermined standard is selected from the group comprising IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-2000.

15. A non-transitory tangible computer readable medium encoding a computer program for execution by a processor, the computer program for executing a computer process comprising:

(i) determining with the over-the-air measurement block for each communication session of the communication sessions at least one load utilization of a plurality of load utilizations, each load utilization associated with at least a predetermined traffic class of a plurality of traffic classes;

(ii) determining for each traffic class with the over-the-air measurement block an accumulated load utilization in dependence upon at least the plurality of load utilizations relating to the plurality of communication sessions associated with that traffic class;

(iii) establishing with the processor an enforcement action of a plurality of enforcement actions with the load distribution control block in dependence upon the plurality of load utilizations and a plurality of thresholds, each threshold relating to a predetermined traffic class of a plurality of traffic classes and each enforcement action of the plurality of enforcement actions being established other than by any signaling within a set of devices comprising the access point and a predetermined subset of the plurality of client stations; wherein each load utilization associated with at least a predetermined traffic class of a plurality of traffic classes is established in dependence upon the current transfer rate of data packets within the predetermined traffic class of a plurality of traffic classes and the maximum data packet transfer rate meeting a quality of service parameter relating to the predetermined traffic class of a plurality of traffic classes; and the plurality of thresholds comprises:

a first threshold established below a maximum guaranteed level of the predetermined traffic class of the plurality of traffic classes, wherein the load distribution control block initiates early load distribution while the first threshold is exceeded by lowering the access point beacon power;

a second threshold established as the maximum guaranteed level of the predetermined traffic class of the plurality of traffic classes, wherein the load distribution control block initiates more forceful load distribution while the second threshold is exceeded by rejecting new client station associations and reducing the transmit power only for packets to be transmitted by the access point to a first subset of the plurality of client stations, wherein the first subset of the plurality of client stations is less than the plurality of client stations; and a third threshold established in dependence upon a maximum traffic utilization of the predetermined traffic class of the plurality of traffic classes, wherein the load distribution control block initiates forceful load distribution while the third threshold is exceeded by further reducing the transmit power only for packets to be transmitted by the access point to the first subset of the plurality of client stations to a level below that established when the second threshold was reached.

16. The non-transitory tangible computer readable medium encoding the computer program for execution by a processor according to claim 15, the computer program for executing the computer process wherein at least one of determining with the processor whether to establish an enforcement action comprises at least one of;

determining for each traffic class of the plurality of traffic classes whether an enforcement action should be established;

determining whether an action should be established based upon the plurality of client stations forming a BSS that is one of plurality of BSSs supported by an access point wherein the total available bandwidth of the access point is partitioned and allocated to the plurality of BSSs according to a predetermined allocation model that defines allocations for each traffic class of the plurality of traffic classes for each BSS of the plurality of BSSs; and the enforcement action comprises at least one of;

dropping predetermined frames relating to communications from the plurality of client stations to the access point for a first predetermined subset of the plurality of traffic classes that exceed their respective predetermined thresholds;

delaying predetermined frames relating to communications from the plurality of client stations to the access point for a first predetermined subset of the plurality of traffic classes that exceed their respective predetermined thresholds;

subjecting predetermined frames relating to communications from the plurality of client stations to the access point for a second predetermined subset of the plurality of traffic classes to data transfer rate control;

dropping predetermined frames relating to communications to the plurality of client stations from the access point for a first predetermined subset of the plurality of traffic classes that exceed their respective predetermined thresholds;

delaying predetermined frames relating to communications to the plurality of client stations from the access point for a first predetermined subset of the plurality of traffic classes that exceed their respective predetermined thresholds;

subjecting predetermined frames relating to communications to the plurality of client stations from the access point for a second predetermined subset of the plurality of traffic classes to data transfer rate control;

transmitting predetermined frames relating to communications to the plurality of client stations from the access point for the second predetermined subset of the plurality of traffic classes after predetermined frames for the first predetermined subset of the plurality of traffic classes are transmitted;

queuing predetermined frames relating to communications to the plurality of client stations from the access point for the second predetermined subset of the plurality of traffic classes in one or more queues;

achieving data transfer rate control through the use of a traffic shaper and frame dropper;

performing the enforcement action upon a predetermined subset of the plurality of traffic classes determined in step (iii); and queuing predetermined frames into queues comprises employing queues supporting priorities associated with a second predetermined standard.

17. A method comprising:
(a) providing an access point supporting at least a communication session of a plurality of communication sessions, each communication session associated with a client station of a plurality of client stations operating according to a first predetermined standard and comprising a plurality of frames, the access point comprising an over-the-air measurement block, a load distribution control block, and a processor;
(b) determining with the over-the-air measurement block for each communication session of the communication sessions at least one load utilization of a plurality of load utilizations, each load utilization associated with at least a predetermined traffic class of a plurality of traffic classes;
(c) determining for each traffic class with the over-the-air measurement block an accumulated load utilization in dependence upon at least the plurality of load utilizations relating to the plurality of communication sessions associated with that traffic class;
(d) determining with the processor whether to establish an enforcement action of a plurality of enforcement actions with the load distribution control block in dependence upon the plurality of load utilizations and a plurality of thresholds, each threshold relating to a predetermined traffic class of a plurality of traffic classes and each enforcement action of the plurality of enforcement actions being established other than by any signaling within a set of devices comprising the access point and a predetermined subset of the plurality of client stations; wherein the plurality of thresholds comprises:
a first threshold established below a maximum guaranteed level of the predetermined traffic class of the plurality of traffic classes, wherein the load distribution control block initiates early load distribution while the first threshold is exceeded by lowering the access point beacon power;
a second threshold established as the maximum guaranteed level of the predetermined traffic class of the plurality of traffic classes, wherein the load distribution control block initiates more forceful load distribution while the second threshold is exceeded by rejecting new client station associations and reducing the transmit power only for packets to be transmitted by the access point to a first subset of the plurality of client stations, wherein the first subset of the plurality of client stations is less than the plurality of client stations; and
a third threshold established in dependence upon a maximum traffic utilization of the predetermined traffic class of the plurality of traffic classes, wherein the load distribution control block initiates forceful load distribution while the third threshold is exceeded by further reducing the transmit power only for packets to be transmitted by the access point to the first subset of the plurality of client stations to a level below that established when the second threshold was reached.

18. An access point comprising:
a communications interface supporting at least a communication session of a plurality of communication sessions, each communication session associated with a client station of a plurality of client stations operating according to a first predetermined standard and comprising a plurality of frames
an over-the-air measurement block;
a load distribution control block;
a non-transitory tangible computer readable medium encoding a computer program, and
a processor for executing the computer process, the computer process comprising:
(i) determining with the over-the-air measurement block for each communication session of the communication sessions at least one load utilization of a plurality of load utilizations, each load utilization associated with at least a predetermined traffic class of a plurality of traffic classes;
(ii) determining for each traffic class with the over-the-air measurement block an accumulated load utilization in dependence upon at least the plurality of load utilizations relating to the plurality of communication sessions associated with that traffic class;
(iii) determining with the processor whether to establish an enforcement action of a plurality of enforcement actions with the load distribution control block in dependence upon the plurality of load utilizations and a plurality of thresholds, each threshold relating to a predetermined traffic class of a plurality of traffic classes and each enforcement action of the plurality of enforcement actions being established other than by any signaling within a set of devices comprising the access point and a predetermined subset of the plurality of client stations; wherein the plurality of thresholds comprises:
a first threshold established below a maximum guaranteed level of the predetermined traffic class of the plurality of traffic classes, wherein the load distribution control block initiates early load distribution while the first threshold is exceeded by lowering the access point beacon power;
a second threshold established as the maximum guaranteed level of the predetermined traffic class of the plurality of traffic classes, wherein the load distribution control block initiates more forceful load distribution while the second threshold is exceeded by rejecting new client station associations and reduces the transmit power only for packets to be transmitted by the access point to a first subset of the plurality of client stations, wherein the first subset of the plurality of client stations is less than the plurality of client stations; and
a third threshold established in dependence upon a maximum traffic utilization of the predetermined traffic class of the plurality of traffic classes, wherein the load distribution control block initiates forceful load distribution while the third threshold is exceeded by further reducing the transmit power only for packets to be transmitted by the access point to the first subset of the plurality of client stations to a level below that established when the second threshold was reached.

19. A non-transitory tangible computer readable medium encoding a computer program for execution by a processor, the computer program for executing a computer process comprising:
 (i) determining with the over-the-air measurement block for each communication session of the communication sessions at least one load utilization of a plurality of load utilizations, each load utilization associated with at least a predetermined traffic class of a plurality of traffic classes;
 (ii) determining for each traffic class with the over-the-air measurement block an accumulated load utilization in dependence upon at least the plurality of load utilizations relating to the plurality of communication sessions associated with that traffic class;
 (iii) establishing with the processor an enforcement action of a plurality of enforcement actions with the load distribution control block in dependence upon the plurality of load utilizations and a plurality of thresholds, each threshold relating to a predetermined traffic class of a plurality of traffic classes and each enforcement action of the plurality of enforcement actions being established other than by any signaling within a set of devices comprising the access point and a predetermined subset of the plurality of client stations; wherein the plurality of thresholds comprises:
 a first threshold established below a maximum guaranteed level of the predetermined traffic class of the plurality of traffic classes, wherein the load distribution control block initiates early load distribution while the first threshold is exceeded by lowering the access point beacon power;
 a second threshold established as the maximum guaranteed level of the predetermined traffic class of the plurality of traffic classes, wherein the load distribution control block initiates more forceful load distribution while the second threshold is exceeded by rejecting new client station associations and reduces the transmit power only for packets to be transmitted by the access point to a first subset of the plurality of client stations, wherein the first subset of the plurality of client stations is less than the plurality of client stations; and
 a third threshold established in dependence upon a maximum traffic utilization of the predetermined traffic class of the plurality of traffic classes, wherein the load distribution control block initiates forceful load distribution while the third threshold is exceeded by further reducing the transmit power only for packets to be transmitted by the access point to the first subset of the plurality of client stations to a level below that established when the second threshold was reached.

* * * * *